United States Patent
Hoyt et al.

(12) 
(10) Patent No.: US 6,419,191 B1
(45) Date of Patent: *Jul. 16, 2002

(54) ELECTRODYNAMIC TETHER CONTROL

(76) Inventors: Robert P. Hoyt, 1917 NE. 143rd St., Seattle, WA (US) 98125; Robert L. Forward, 8114 Pebble Ct., Clinton, WA (US) 98236

(*) Notice: Subject to any disclaimer, the term of this patent is extended or adjusted under 35 U.S.C. 154(b) by 0 days.

This patent is subject to a terminal disclaimer.

(21) Appl. No.: 09/651,557

(22) Filed: Aug. 30, 2000

Related U.S. Application Data

(63) Continuation-in-part of application No. 08/929,271, filed on Sep. 12, 1997, now Pat. No. 6,116,544.

(51) Int. Cl.⁷ .............................................. B64G 1/00
(52) U.S. Cl. .................... 244/158 R; 244/166; 244/172
(58) Field of Search ......................... 244/158 R, 166, 244/172

(56) References Cited

U.S. PATENT DOCUMENTS

| | | | |
|---|---|---|---|
| 4,097,010 A | * | 6/1978 | Colombo et al. ............ 244/167 |
| 4,824,051 A | * | 4/1989 | Engelking ................... 244/172 |
| 4,923,151 A | * | 5/1990 | Roberts et al. .............. 244/172 |
| 6,116,544 A | * | 9/2000 | Forward et al. ............. 244/172 |

* cited by examiner

Primary Examiner—J. Woodrow Eldred
(74) Attorney, Agent, or Firm—Arthur M. Dula

(57) ABSTRACT

The present invention comprises apparatus and methods for using and controlling electrodynamic tethers. The apparatus taught by the present invention uses an interconnected multiwire (compared to the long, narrow single wires of the prior art) conductive tether whose area maximizes electrodynamic drag while simultaneously minimizing the Area-Time-Product swept by the tether during its operating life. The preferred tether length is two kilometers to five kilometers. The preferred tether mass is one percent to five percent of the spacecraft mass. The methods of control taught by the present invention comprise orienting the tether structure at a preferred angle to the local vertical to maximize electrodynamic drag and minimize tether instabilities. The angle of 35.26 degrees to the local vertical line is preferred. The invention also includes useful methods of controlling current flow in an electrodynamic tether to limit tether dynamic instabilities including in plane libration, out of plane libration, transverse instability and skip-rope instability.

51 Claims, 35 Drawing Sheets

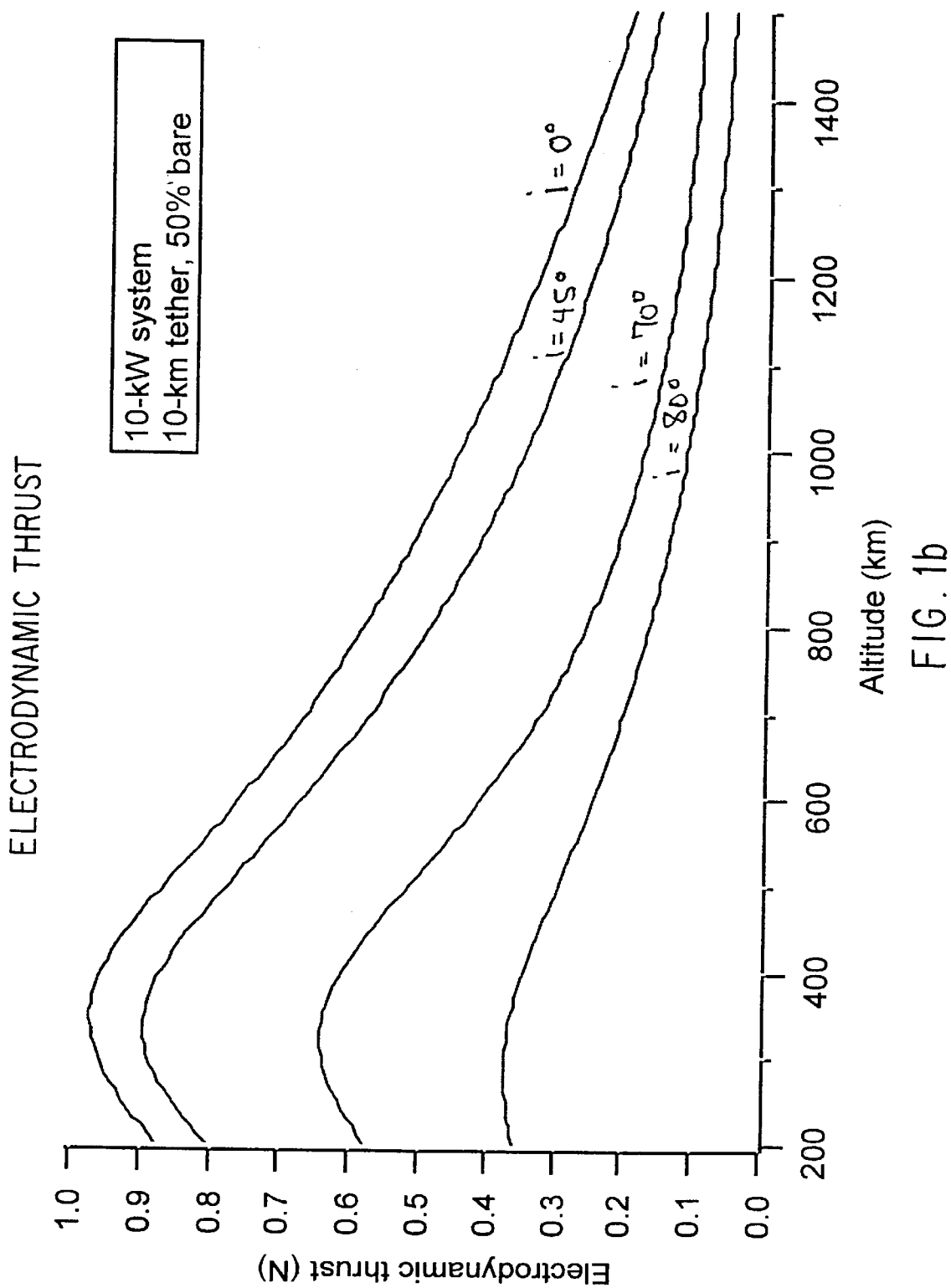

Area-Time Product for Mean and Extremes of Exospheric Temperature
(m = 1000 kg, Cd = 2.0 ; 1% Tether, 1 km x 25 cm; power = 1077 watts)
(5% Tether, 1 km x 25 cm; power =5385 watts)

Conventional Solid Rocket Motor System
Percent Increase in Orbital Mass vs. Altitude and $\lambda$ (Isp = 288 sec)

$\tau = 35.26°$

FIG. 8A & B

FORCES AND TORQUES ON AN UPWARD DEPLOYED CONDUCTING TETHER DUE TO THE MOTION OF THE HOST SPACECRAFT THROUGH THE MAGNETIC FIELD OF THE EARTH.

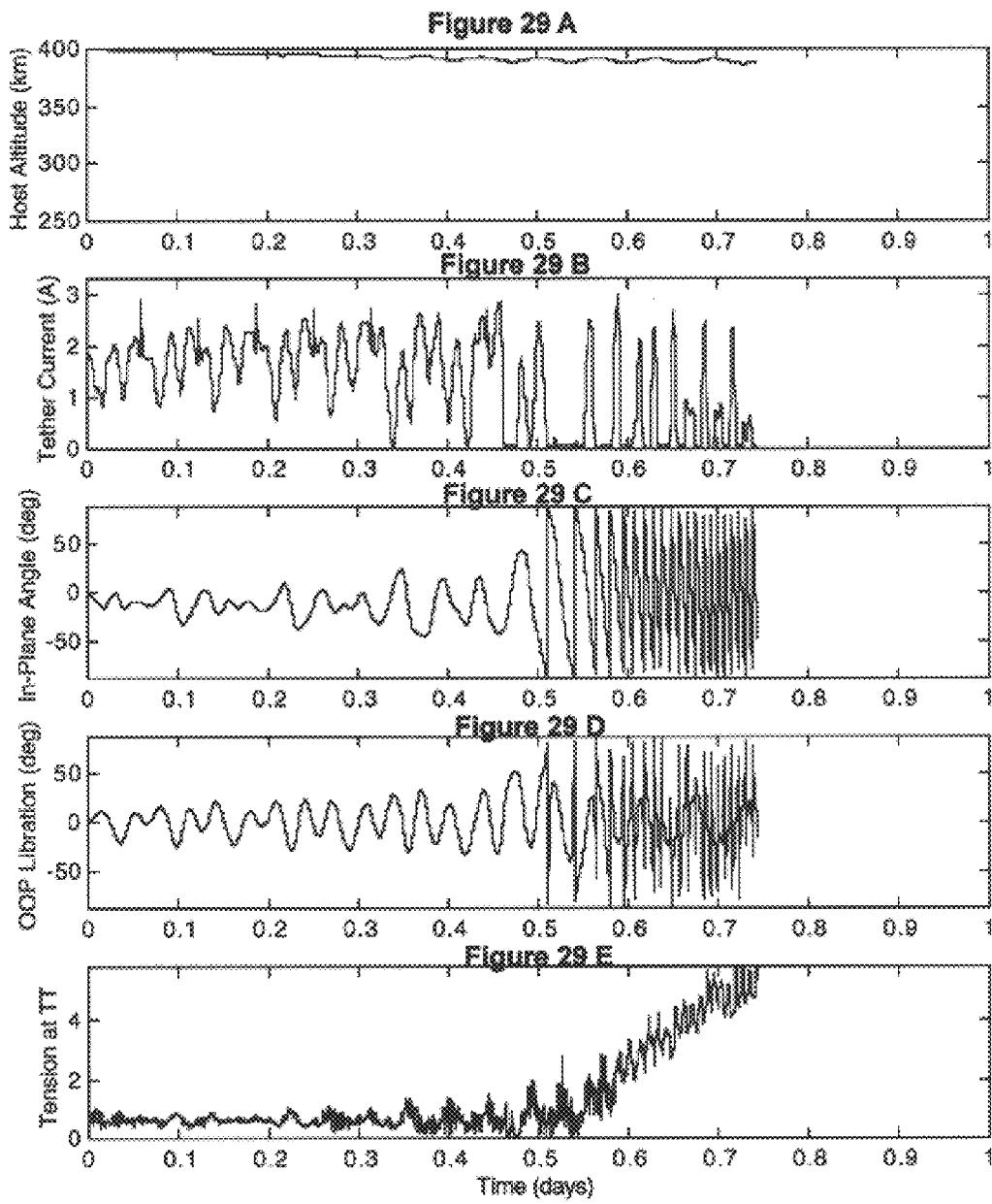
Figure 29. Simulation results with no control on the tether current. Simulation is of deorbit of a 1500 kg satellite from a 400 km, 50° inclination orbit using a 7.5 km, 15 kg tether with a 15 kg endmass.

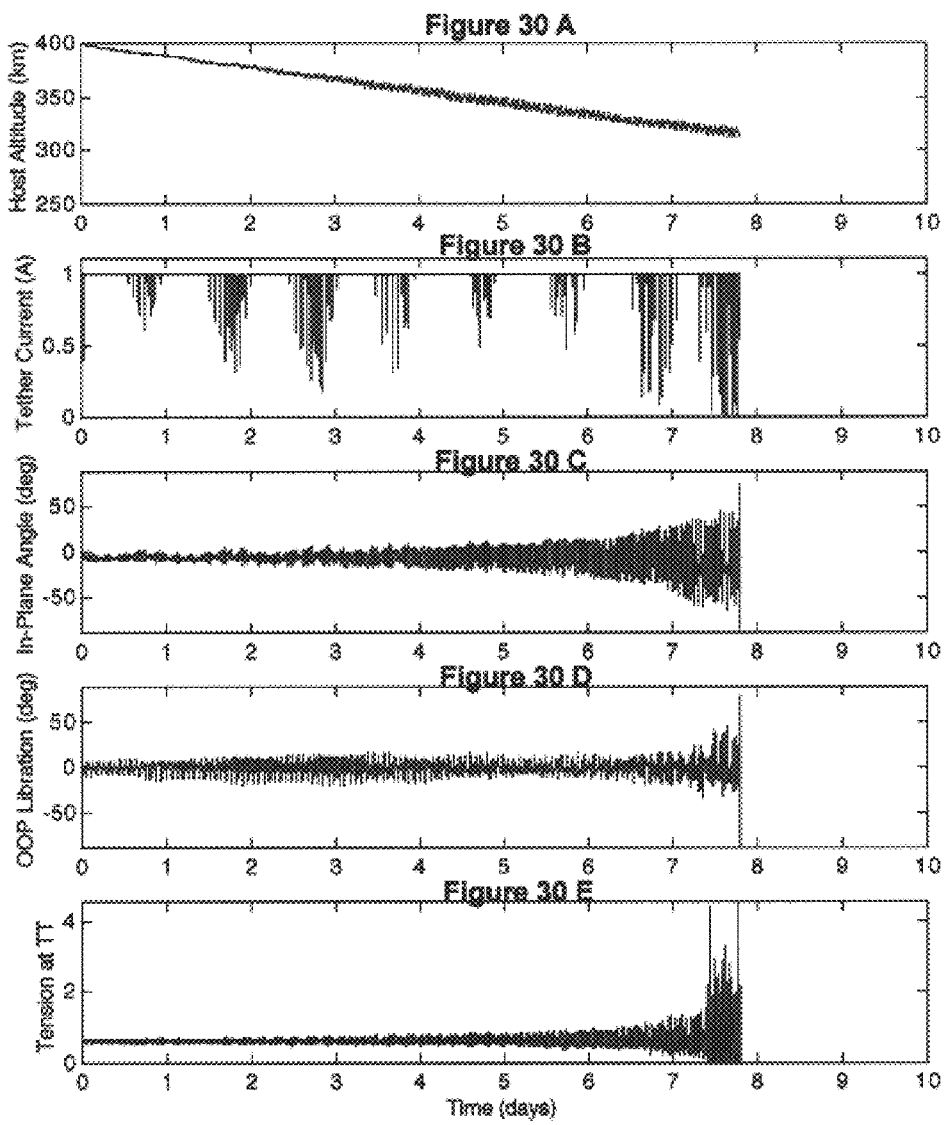
Figure 30. Simulation results with the tether current limited to 1 A. Simulation is of deorbit of a 1500 kg satellite from a 400 km, 50° inclination orbit using a 7.5 km, 15 kg tether with a 15 kg.

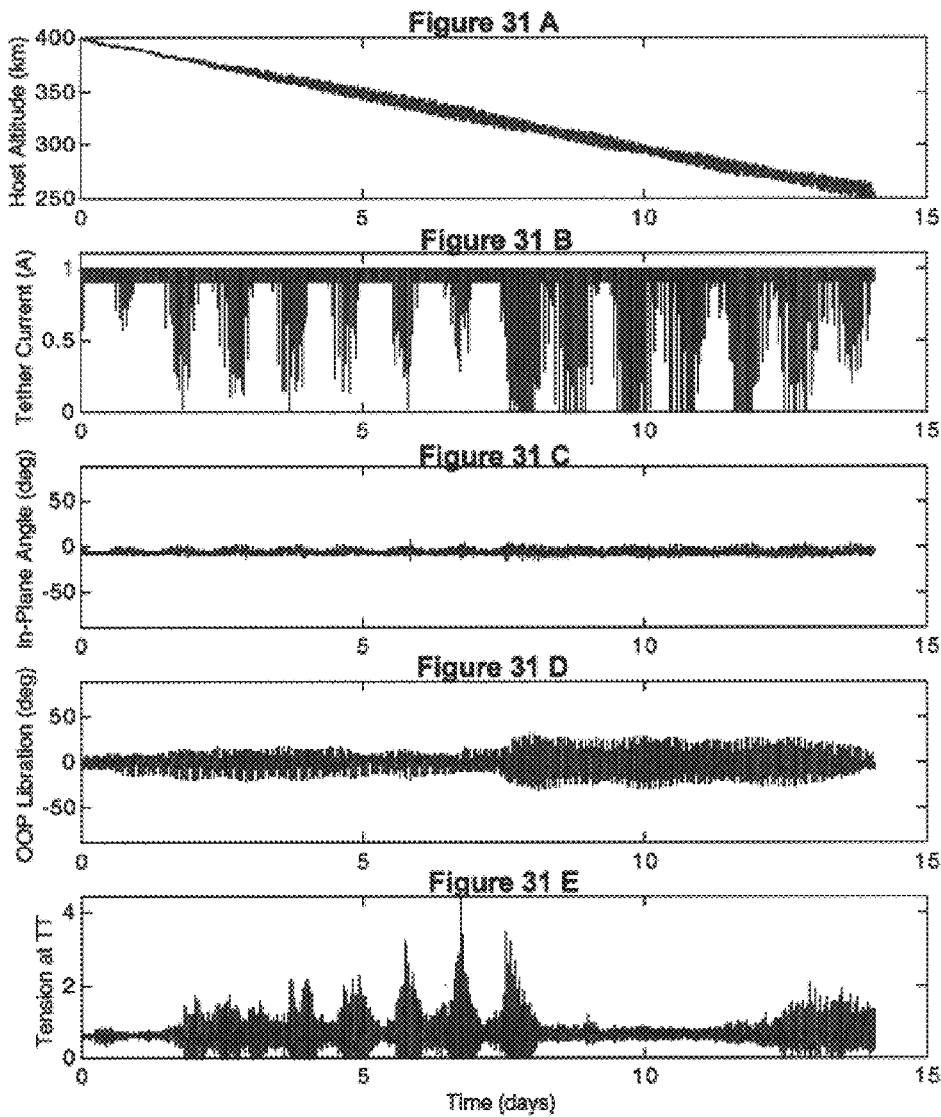
Figure 31. Simulation results with feedback control on the In-Plane Libration. Simulation is of deorbit of a 1500 kg satellite from a 400 km, 50° inclination orbit using a 7.5 km, 15 kg tether with a 15 kg .

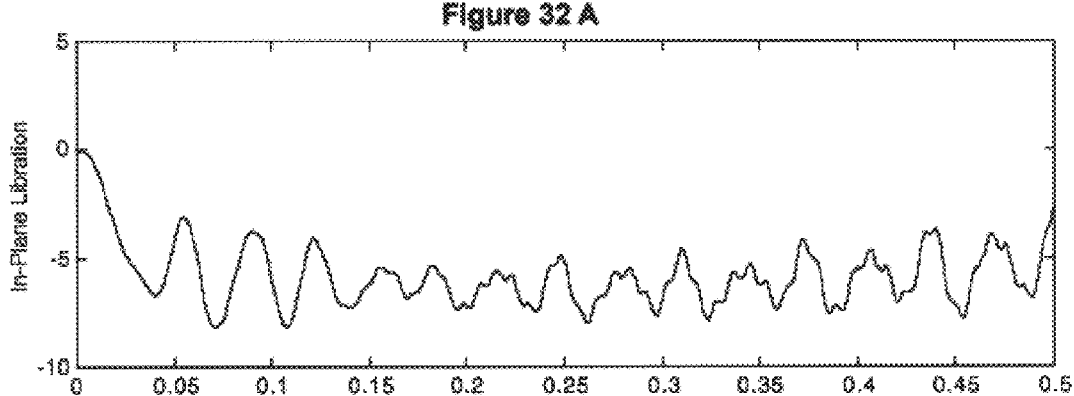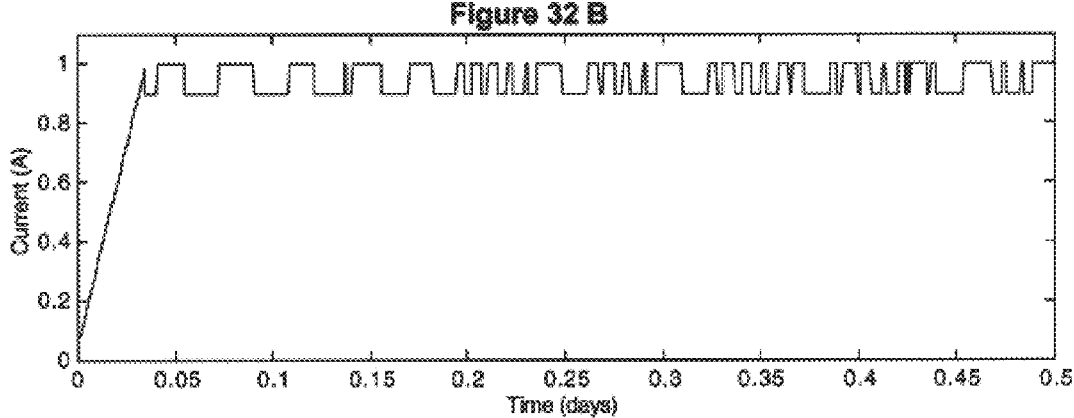
Figure 32. In-Plane Libration and current data for the first half-day of the simulation of the tether with feedback control on the In-Plane-Libration shown in Figure 11.

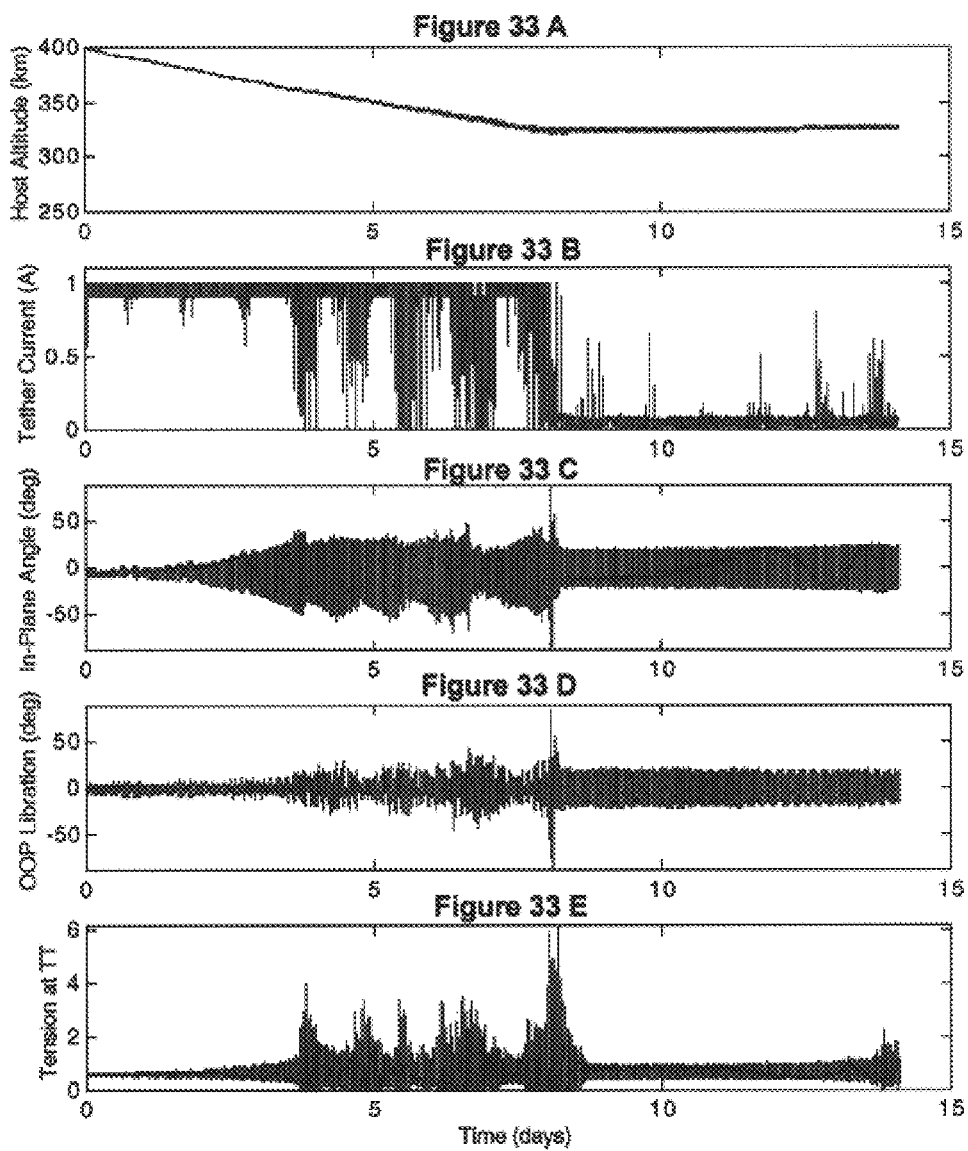
Figure 33. Simulation results with feedback control on the Out-Of-Plane Libration. Simulation is of deorbit of a 1500 kg satellite from a 400 km, 50° inclination orbit using a 7.5 km, 15 kg tether with a 15 kg .

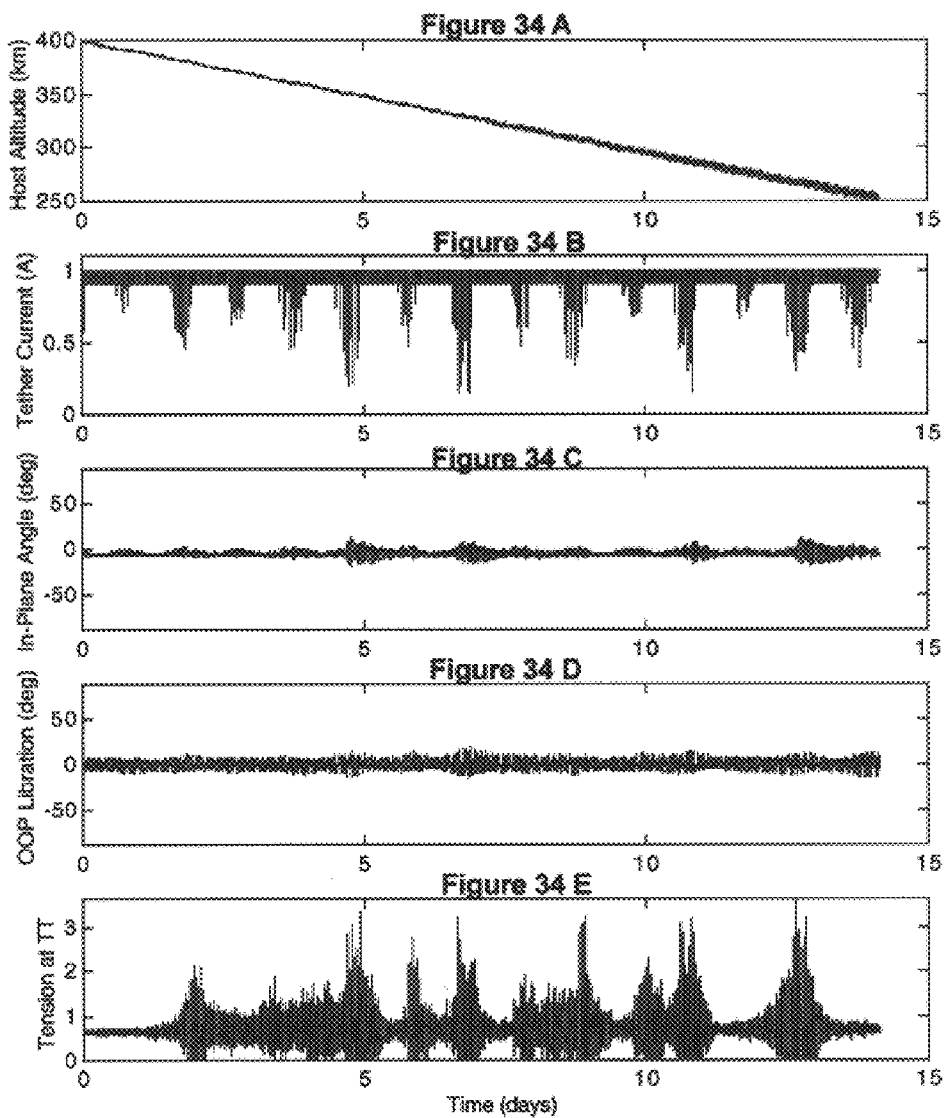
Figure 34. Simulation results with feedback control on both the In-Plane and Out-Of-Plane Librations. Simulation is of deorbit of a 1500 kg satellite from a 400 km, 50° inclination orbit using a 7.5 km, 15 kg tether with a 15 kg.

ELECTRODYNAMIC TETHER CONTROL

CROSS REFERENCE TO RELATED APPLICATIONS

This application is a continuation in part of U.S. patent application Ser. No. 08/929,271 filed Sep. 12, 1997 for "Electrodynamic Tether and Method of Use."

RESERVATION OF RIGHTS

This application is subject to certain rights of the U.S. government as a result of contracts between the U.S. government and the inventors.

TECHNICAL FIELD

This invention relates generally to apparatus and methods useful for changing the state vector of a space object when the space object is moving relative to a magnetic field. More specifically, the present invention relates to an apparatus and method of using a conducting tether to produce an electrodynamic force to change the orbit of a satellite around a celestial body, such as the Earth, which has an associated magnetic field, and still more specifically to deorbit a satellite from its orbit.

BACKGROUND ART

The present invention has its principal utility in outer space, primarily for changing the state vector of a space object, for example deorbiting satellites at the end of their useful life to mitigate the harm and reduce the liability created by the proliferation of space debris. In order to obtain a better understanding of the present invention it is helpful to understand the prior art of space tethers, especially tether dynamics and tether electrodynamics. The present invention may be more readily understood through a review of the experimental prior art and a mathematical analysis of electrodynamic space tethers.

Prior Art Tethers

A tether was originally a rope or chain used to fasten an animal so that it grazed only within certain limits. Tethers have been used for decades in space to attach astronauts to their spacecraft.

In 1974 Professor Guiseppe Colombo, holder of the Galileo chair of astronomy at the University of Padua in Italy, proposed using a long tether to support a satellite from an orbiting platform. U. S. Pat. No. 4,097,010, which issued to Professor Colombo and Mario Grossi on June 27, 1978, teaches a satellite connected by means of a long tether to a powered spacecraft. Colombo actively pursued the design of a tethered satellite system.

Several NASA experiments, such as the two Small Expendable Deployer System (SEDS 1 & 2) experiments and the Plasma Motor Generator (PMG) experiment used tethers in space. SEDS used a nonconducting tether. The PMG used a 500-meter conducting tether. The Tethered Satellite System flights in 1992 and 1996 (TSS-1 & 1R) used a 20,000-meter conducting tether.

On the TSS-1 mission the tether deployed only 260 meters (853 feet) before the deployer failed. On the TSS-1R the tether was deployed 19,500 meters. In the SEDS-2 flight, a 0.8-mm diameter, 20,000-meter long braided single-line tether was deployed to study tether dynamics and lifetime. Orbital debris or a meteoroid severed this tether in less than four days.

In the TSS-1R flight, the conducting single-line tether was severed after five hours of deployment. This failure was caused by an electric arc produced by the 3,500 volts of electric potential generated by the conductive tether's movement through the Earth's magnetic field.

The Tether Physics and Survivability (TiPS) satellite consists of two end masses connected by a 4,000-meter long non-conducting tether. This satellite was deployed on Jun. 20, 1996 at an altitude of 1,022 kilometers (552 nautical miles). Its tether is an outer layer of Spectra™ 1000 braid over a core of acrylic yarn. The yarn will "puff" its outer braid to two millimeters to "give it a larger cross section to improve its resistance to debris and small micrometeoroids", according to the National Reconnaissance Office (NRO), which is a sponsor of the TiPS mission. As of Jun. 21, 2000 the TiPS tether had survived four years.

REFERENCES

1. Joseph A. Carroll, "SEDS Deployer Design and Flight Performance", paper WSEDSA-1 at the $4^{th}$ International Conference on Tethers in Space, Washington, DC, April 1995.
2. James E. McCoy, et. al. "Plasma Motor-Generator (PMG) Flight Experiment Results", pp.57–84, Proceedings of the $4^{th}$ International conference on Tethers in Space, Washington, DC, April 1995.
3. W. John Raitt, et.al. "The NASA.ASI-TSS-1 Mission, Summary of Results and Reflight Plans, pp. 107–118, Proceedings of the $4^{th}$ International conference on Tethers in Space, Washington, DC, April 1995.
4. Joseph C. Anselmo, "NRO Orbiting Spacecraft Studies Tether Survivability", Aviation Week, page 24, Jul. 1, 1996.

These experiments all used single line tethers.

The following reference is illustrative of the current state of the art in space tethers: Paul A. Penzo and Paul W. Ammann. Tethers in Space Handbook—Second Edition. NASA Office of Space Flight, NASA Headquarters, Washington, DC 20546. See also the hundreds of references in the 33 page bibliography at the end of the handbook.

The "Hoytether"™, an Improved, High-Reliability Tether

In 1991, one of the present inventors, Robert Hoyt, invented a lightweight net-like structure that provides many redundant load-bearing paths. A number of primary load bearing lines running the length of the structure are connected periodically by diagonal secondary lines. The disclosed embodiment of this invention has the secondary lines firmly connected by knots to the primary lines. The secondary lines are connected only to the primary lines. At either end of the disclosed structure, a support ring enforces the cylindrical spacing between the primary lines. The secondary lines are designed with a small amount of slack. These secondary lines are only put under load if a primary line fails. This specific tether structure was disclosed to the public in 1992 (Forward, R. L., "Failsafe Multistrand Tether Structures for Space Propulsion", AIAA paper 92–3214, $28^{th}$ Joint Propulsion Conference, Nashville, Tenn., 1992 (hereinafter "1992 Hoytether structure"). This structure was named a "Hoytether". The term "Hoytether" is used throughout the remainder of this specification for this type of tether structure.

The present invention uses an improved Hoytether, which was invented by the same inventors as the present invention. This improved Hoytether is the subject of a copending PCT application. The Hoytether is discussed briefly in this specification to aid understanding of the present invention.

The 1992 Hoytether design teaches that the normally slack secondary lines have half the cross-section (0.707 the diameter) of the primary lines. There are twice as many secondary lines as primary lines, thus the mass of the secondary lines is equal to the mass of the primary lines. In an undamaged Hoytether, the primary lines carry the entire load, while none of the secondary lines are under load.

While the survival probability of a single-line tether decreases exponentially with time, the Hoytether can maintain a high, i.e. greater than 99 percent, survival probability for periods of months or years (Forward and Hoyt, "Failsafe Multiline Hoytether Lifetimes", Paper AIAA 95–2890, $31^{st}$ Joint Propulsion Conference, July 1995).

REFERENCES

1. Robert L. Forward, Failsafe Multistrand Tethers for Space Propulsion, Forward Unlimited, P.O. Box 2783, Malibu, Calif. 90265, July 1992, Final Report on NASA Contract NAS8-39318 SBIR 91-1 Phase I.
2. Robert L. Forward and Robert P. Hoyt, Failsafe Multistrand Tether SEDS Technology Demonstration, Final Report on NAS8-40545 with NASA/MSFC (Jun. 14, 1995).
3. Robert L. Forward and Robert P. Hoyt, "High Strength-to-Weight Tapered Hoytether for LEO to GEO Payload Transfer" Final Report on contract number NAS8-40690 with NASA/MSFC (Jul. 10, 1996).

The Hoytether is essentially a tri-axial net structure, with 'primary' lines running along the length of the tether and two sets of 'secondary' lines connecting these primaries diagonally. They can be made by hand and connected with knots as is taught by the 1992 Hoytether structure. Because knotted connections severely limit the strength of a structure, it is desirable to use a knotless fabrication technique to achieve interconnections that have strengths approaching the limits of the constituent material. As these tethers may be many kilometers long; fast and inexpensive mechanical methods are required for their practical fabrication.

Hoytethers may be made by mechanical braiding, i.e. three-dimensional braiding, such as 3-D rotation braiding using braiding machines such as those developed by the Herzog Company in Germany (August Herzog Maschinenfabrik GmbH & Co., Postfach 2260.26012, Oldenburg, Germany. The specialized loom developed by the Nichimo Company of Japan (Nichimo Company Ltd., 2-6-2 Ohtemachi, Chiyoda-Ku, Tokyo, Japan) is used to produce "Ultracross" knotless fishing nets in which the individual strands are braided as a 4-braid line, and the strands are interbraided where they cross. This produces netting that has slipless interconnections that are very strong, approaching the maximum capability of the fiber. Such a loom could, with some modifications, produce the present invention's structure. Only two such machines exist, one in Japan, the other in Washington State. Unfortunately neither can work with the small line diameters needed to practice the preferred embodiment of the present invention. See generally, Ko, F. K., "Braiding", in Engineered Materials Handbook, Vol. 1., Composites. ASM International, Metals Park, Ohio, 1957. Pp. 519–528.

The most common 3-dimensional braiding machines are 4-step braiders based upon the designs of Maistre (German Patent P230-16986, issued 1973) and Forentine (U.S. Pat. 4,312,261, issued 1982). Braiding is accomplished by using pneumatics or solenoids to push the parts of the braiding machine to the proper positions. This is a slow process and making a Hoytether kilometers long with these machines would be very time consuming and expensive. The composites division of Albany International (Albany International Research Company, 777 West Street, Mansfield, Mass.) also produces a 3-D braiding machine. This machine uses modular braiding components that are assembled breadboard fashion on a large wall.

Although braiding is the preferred technique, alternate fabrication methods such as Raschel knitting and crocheting can be used successfully. Multikilometer long Hoyththers are presently being produced for the inventors by the vendors Culzean Fabrics and Flemings Textiles using an electronically controlled crochet machine produced by Comez in Italy.

Space Tether Systems

The prior art teaches the use of tethers in space applications. U.S. Pat. No. 5,163,641, issued on Apr. 9, 1990 to Yasaka, teaches the use of a powered spacecraft connected by a tether to a satellite. This tether is disconnected to change the state vector of the satellite. The state of the art of energy and momentum transfer using space tethers is discussed in Ivan Beckey's article "Tethering, a new Technique for Payload Deployment", Aerospace America, March 1997, at pages 36–40. Beckey concludes, "Tethers can perform the same functions as propulsive upper stages of direct payload injection, but at lower weight and cost per pound." U.S. Pat. 4,923,151, issued Mar. 1, 1988 to Roberts, Wilkinson and Webster, teaches a tether power generator for earth orbiting satellites. U.S. Pat. 4,580,747, issued Mar. 15, 1983 to Pearson, teaches use of a long tether extending downward into the atmosphere from a satellite. The state vector of the satellite is changed by forces acting on a lifting body connected to the end of the tether. U.S. Pat. 4,824,051, issued Jan. 12, 1987 to Engelking, teaches passing an electric current through a conductive tether attached to a satellite to provide propulsive force to alter the orbit of the satellite. U.S. Pat. 5,082,211, issued Jan. 21, 1992 to Werka, teaches use of a tether to deorbit space debris. U.S. Pat. 4,727,373, issued Mar. 31, 1986 to Hoover, teaches an orbiting stereo imaging radar system having two spacecraft in synchronous parallel orbits connected by a tether.

Tether Dynamics

In order to understand the forces that cause a tethered satellite to move upward and away from an orbiting satellite, for example, it is first necessary to explain briefly how a satellite remains in orbit. An orbiting satellite is acted on by the force of gravity, which pulls it toward Earth, and by a centrifugal force, which pushes it away from Earth. The centrifugal "force" (actually inertia) results from the motion of the satellite around its circular orbit. This is the same force that one can experience by swinging a ball around on the end of a string. A satellite is maintained in its orbit when it travels at the natural speed for its altitude and, as a result, the centrifugal force is equal to the gravitational force.

At the typical orbital altitude of 250 kilometers for a low-Earth orbit satellite, for example, a speed of approximately 7.6-km per second is required to create sufficient centrifugal force to balance gravitational attraction on the satellite. If the altitude is changed, the two opposing forces will no longer be in balance unless the satellite also changes its speed. A higher orbital altitude requires a slightly lower speed so the satellite will take longer to complete an orbit. Because of this, if two free-flying satellites are in orbits at different altitudes, the lower satellite will circle the Earth in less time than the satellite in the higher orbit.

If two satellites, at different altitudes, are connected to each other by a tether, they are forced to travel around their orbits together—in the same period of time, which is longer than the natural period of the lower satellite but shorter than that of the upper satellite. The lower satellite will, therefore, slow down below the natural speed for its orbit and will tend to fall to a lower orbit because the centrifugal force will now be less than the gravitational attraction of the Earth. An upward force in the tether that makes up the difference between centrifugal and gravitational forces holds it in place, however.

Correspondingly, the upper satellite will be accelerated above its natural orbiting speed (increasing its centrifugal force above the gravitational attraction) and will tend to move to a higher orbit. It, too, is held in place by an additional force (downward) in the tether. In other words, the net force downward on the lower satellite is balanced, through the tether, by the net force upward on the upper satellite. The effect of unbalanced forces on the two satellites is, therefore, to create tension in the tether. During the TSS-1 & 1R experiments, the inertia of the tethered satellite causes the satellite to rise above the orbiter as the tether is reeled out. Very close to the orbiter, there is little difference in the two orbits, and the tension force is insufficient to overcome friction in the deployer mechanism; therefore, until the satellite reaches a separation of approximately 1000-meters, the tension is augmented by small tether-aligned thrusters on the satellite. Beyond this point, the tension in the tether is the only force required.

By experimenting with a ball hung on a piece of elastic cord (a paddleball, for example) it is possible to simulate all the different types of oscillations that are possible on a space-based tether system. The elastic cord, representing the tether, may compress and stretch, causing the ball to bounce up and down (longitudinal oscillation). It also may move in a circular (skip-rope) motion or may develop wave-like motions (transverse oscillations). Even if the string itself remains straight, it is possible to get the ball swinging back and forth about its attachment point on the paddle like a child on a swing rope (pendulous motion).

Each type of motion occurs with a particular frequency, which depends on the length and tension of the tether. When the frequencies are different, the motions do not interact; however, at some tether lengths, the frequencies of two or more types of oscillation can become very close. At this point, energy can be transferred from one type of motion to another, a phenomenon known as resonance. For instance, the transverse oscillations in the tether may cause the satellite to swing back and forth in pendulous motion.

Many different factors may cause oscillations; the movements of the satellite or Shuttle are but two of these. For an electrodynamic tether, the skip-rope and pendulous oscillations are of particular interest. If a current is passed through a tether, the current will interact with Earth's magnetic field, resulting in a force that may produce skip-rope and pendulous oscillations. Because it is necessary to maintain control of the satellite, much study has gone into identifying the different types of possible motions and the methods used to control them.

One way to control the magnitude of those motions that cause a change in tension or transverse motion at the end of the tether is to have an end mass connected to the Hoytether that maintains a controlled tension on the tether, working much like a spring-loaded 'dog leash'. This may be as simple as a coiled spring, or as complex as an active control system that measures the tension and transverse forces on the tether and adjusts the applied tension according to a local or remotely operating algorithm.

Electrodynamic Effects of Conductive Tethers

Electric potential is generated across a conductive tether by its motion through the Earth's magnetic field. Electromagnetic forces acting on a conductive tether in orbit can make the tether system behave like an electric motor or generator, thereby exerting a useful force to alter the state vector of the tether and any mass attached to it.

Electrodynamic tether propulsion is unlike most other types of space propulsion in use or being developed for space application today—there is no hot gas expelled to provide thrust. Instead, the environment of near-Earth space is being utilized to propel a spacecraft or upper stage via electrodynamic interactions.

A charged particle moving in a magnetic field experiences a force that is perpendicular to its direction of motion and the direction of the field. When a current flows through a long, conducting tether the electrons flowing through the tether experience this force due to the fact that they are moving along the wire in the presence of Earth's magnetic field. The current induced force is perpendicular to the tether. This force is transferred to the tether and to whatever the tether is attached (like a spacecraft, satellite, space station or upper stage). It can be an orbit-raising thrust force or orbit-lowering drag force, depending upon the direction of current flow. Operation in one mode allows boost from LEO to higher orbit while reversing the current flow provides negative thrust for deboost. The principle is much the same for an electric motor; reverse its operation and it acts as a generator. Current is obtained from the ionosphere with collection and emission occurring on opposite ends of the tether.

The PMG experiment demonstrated that a conducting tether can be used as both a motor and a generator. The TSS experiments, specifically TSS-1R, showed that very large voltages (about 3500 volts) can be generated by a sufficiently long tether.

Uses of an electrodynamic tether as its orbit raising and lower propulsion system has many advantages over competing systems:

a. It is nearly propellantless. Most other systems expel hot gases and require extensive resupply. To emit current, the electrodynamic tether propulsion system will likely use plasma contactors developed as a part of the International Space Station Program. These contactors consume less than 20 kg of xenon gas per year with a 50% duty cycle.

b. It can change both altitude and inclination. The Earth's magnetic field is non-uniform and can therefore provide both in- and out-of-plane forces for inclination changes as well as altitude changes. This is of particular interest to payloads requiring polar orbits in that they can be launched on a small launch vehicle into a lower inclination orbit and have it raised in space by the proper phasing of current through the tether.

A demonstration of the propulsive capabilities of electrodynamic tethers was recently approved for flight in 1999. The Propulsive SEDS mission, or ProSEDS, will fly as a secondary payload on a Delta II launch vehicle and deploy a 5-km conducting tether using the existing SEDS deployer concept. The ProSEDS experiment will be followed by the Electrodynamic Tether Upper Stage (EDTUS) experiment that will demonstrated the use of electrodynamic forces to change both the altitude and inclination of the experimental spacecraft. FIGS. 1b and 1c show, respectively, the calculated electrodynamic thrust at several inclinations and the reentry time sensitivity of the ProSEDS tether.

One application for long-life conducting electrodynamic tethers with is as a "Terminator Tether™" for removing from orbit, unwanted Earth orbiting spacecraft at the end of their useful lives. When the mission of the satellite is completed, the Terminator Tether™, weighing a small fraction of the mass of the satellite, would be deployed. The electrodynamic interaction of the conducting tether with the Earth's magnetic field will induce current flow in the tether conductor. The resulting energy loss from the heat generated by the current flowing through the ohmic resistance in the conducting tether will remove energy from the spacecraft, eventually causing it to deorbit, thus reducing the amount of orbital space debris that must be coped with in the future.

In 1995, M. Grossi presented a paper published in the Proceedings of the 4th International Conference on Tethers in Space. In two paragraphs he briefly mentions the use of tethers as an "emergency brake" for a spacecraft. However, Grossi's article contains no details of either the mechanism or the method by which this could be accomplished.

In the following analysis, it is shown that the amount of energy loss generated by an electrodynamic tether is essentially independent of its length or area, and instead is primarily proportional to the tether mass and the physical properties of the conductor metal chosen. In the typical example calculated, a 1000-kg spacecraft can be deorbited from a 1000-km high Earth orbit by a 10-kg mass tether in a month, while a 1-kg tether can deorbit a 1000-kg spacecraft in less than a year.

To the knowledge of the inventors, Joseph P. Loftus of NASA/JSC first proposed the general concept of using an electrodynamic tether to deorbit spent satellites. In order to show that the Loftus deorbit concept was not obvious to those skilled in the art of electrodynamic tethers one of the present inventors, Forward contacted the leading expert on space tethers, Joseph Carroll, of Chula Vista, Calif., who built and participated in the flight test of the PGM. After being told of the Loftus concept in a telephone conversation, his reply in an Email message dated August 5, 1996, was "such a system would be feasible . . . by it is still not obvious to me that it would be useful . . . "

Loftus was considering the use of electrodynamic drag from a conducting tether to achieve this goal of bringing the unwanted spacecraft down from its high orbit (where atmospheric drag is negligible) to a 200-km orbit, where atmospheric drag would rapidly finish off the task of removing the unwanted spacecraft from orbit. The tether Loftus was considering was a single-line, conducting tether, typically 1-mm in diameter, 1-km long, and, if made of aluminum, 2-kg in mass. He would include means at the ends of the tether to contact the ambient space plasma around the Earth to complete the current loop.

Unfortunately it is probable that space impactors would sever the 1-mm diameter, 1-km long single-line tether proposed by Loftus within a 1/e lifetime of four months. This would produce orbital debris rather than removing it. The motivation for this work is the NASA Safety Standard NSS 1740.14 "Guidelines and Assessment Procedures for Limiting Orbital Debris." The relevant portion of the Standard starts on page 6-3: General Policy Objective—Postmission Disposal of Space Structures. Item 6-1: "Disposal for final mission orbits passing through LEO: A spacecraft or upper stage with perigee altitude below 2000 km in its final orbit will be disposed of by one of three methods." The method of interest is the atmospheric reentry option, Option a: "Leave the structure in an orbit in which, using conservative projections for solar activity, atmospheric drag will limit the lifetime to no longer than 25 years after completion of mission. If drag enhancement devices are to be used to reduce the orbit lifetime, it should be demonstrated that such devices will significantly reduce the area-time product of the system or will not cause the spacecraft or large debris to fragment if a collision occurs while the system is decaying from orbit."

The NASA standard applies only to NASA spacecraft and even then only to completely new spacecraft designs. New versions of existing designs are to make a "best effort" to meet the standard, but will not be required to change their design to do so. The Department of Defense has adopted the NASA standard with the same provisos. An Interagency Group report has recommended that the NASA standard be taken as a starting point for a national standard. It is NASA's recommendation to the Interagency Group that the safety requirement be phased in only as spacefaring nations reach consensus internationally, which is being done through the International Debris Coordination Working Group whose members are Russia, China, Japan, ESA, UK, India, France, Italy, and the US.

Thus, although the NASA Safety Standard in its present form is not the "Law", the existence of the standard means that some time in the future a similar requirement may be imposed on all spacecraft. This could result in major growth in future space tether business, with a sale to every non-geostationary spacecraft being "mandated" by government safety regulations, somewhat as the sale of seat belts and airbags for every car are mandated.

In fact, three of the companies planning to set up "constellations" of low to medium orbit communications: Teledesic, Iridium and Odessey have have committed their companies to abide by the spirit of NASA Safety Standard 1740.14 by using one means or another to deorbit their spacecraft fefore they reach end of life.

Problems with Prior Art Tethers

All electrodynamic tether designs proposed by the prior art teach that the tether should be operated at a right angle to the magnetic field through which the tether is moving and moving in a direction that sweeps across the largest area of magnetic field lines. When the magnetic field is horizontal to the surface of the Earth, as is near the equator, this is accomplished by having the tether length vector oriented along the local vertical or perpendicular to the direction of spacecraft motion, the state vector of the spacecraft. This is a problem because the electrodynamic force acting on the tether causes the tether to align itself with the state vector of the spacecraft rather than perpendicular to it. To overcome this problem the prior art teaches the use of a large ballast mass attached to the end of the tether and/or use of a very long (tens to hundreds of kilometers) tether. The large ballast mass is expensive to take to orbit because it replaces useful payload. The long tether sweeps a larger Area-Time-Product during its useful life and thus is more likely to impact other space objects, either debris or another spacecraft.

Another problem common to all proposed prior art tethers is tether instability. If the tether produces a large electrodynamic drag force, which is desirable because a large drag force will cause the satellite to deorbit quickly, then the tether will be dynamically unstable. This instability can cause the tether to lose its effectiveness, act uncontrollably and even wrap around the satellite or otherwise malfunction. Experts skilled in the art of tether design have opined that this dynamic instability is inherently unavoidable in any electrodynamic tether system. The prior art solution, such as that presently being used in the ProSEDS experiment, has been to use a large ballast mass to increase the stabilizing gravity-gradient force and/or to limit the electrodynamic drag of the tether to less that the maximum that could be produced. In the ProSEDS experiment, the conducting electrodynamic tether is five kilometers long. To insure stability, it will be augmented by a 20–35 kilometer long non-conducting tether, which to further have stability will have a 40 kilogram ballast end mass.

Yet another problem of all proposed prior art electrodynamic tether systems is how to radiate away the energy produced by the tether's operation. A satellite moving at an orbital velocity of 18,000 miles per hour has a kinetic energy of over 10,000 calories per gram. To put this amount of energy in an understandable perspective, it may be noted that when nitroglycerine explodes it produces about 1,500 calories per gram. Prior art designs of electrodynamic drag tethers teach the use of the electrical energy generated by the tether to charge batteries or operate electronics, with the excess energy being converted into heat by a resistive load. This excess heat must be radiated to the space environment or it will melt the resistive load. Thus the resistive load, and/or its associated radiator structures, must be massive and replace useful payload.

DISCLOSURE OF THE INVENTION

The present invention comprises an electrodynamic tether structure and a method of use. The principal industrial utility of the present invention is to deorbit satellites in Earth orbit at the end of their useful life. This embodiment of the present invention is sometimes referred to in this specification as a "Terminator Tether™" because it terminates the orbital lifetime of the host spacecraft. The structure of the tether taught by the present invention is a short, wide (compared to the long single wires of the prior art) conductive Hoytether whose area maximizes electrodynamic drag while simultaneously minimizing the Area-Time-Product swept by the tether during its operating life. The preferred tether length is two to five kilometers. The preferred tether mass is one to five percent (1%–5%) of the spacecraft mass. The method of operation comprises orienting the tether structure at a 35.26-degree trailing angle to the local vertical to maximize electrodynamic force on the tether while avoiding tether instability and allowing use of a small tether end mass.

The present invention also teaches that the satellite-tether system may be rotated around its common center of mass to centrifugally produce tension force in the tether structure to oppose forces causing tether instability. The angle of the conductive tether structure of the present invention with respect to the velocity vector of the host spacecraft may be controlled by the method of the present invention so it interacts with the encountered magnetic field to induce a maximum current flow in the tether. This produces maximum electrodynamic drag. All or a portion of this electric power may be stored and then controllably applied to the conductive tether to produce an induced electrodynamic force. This induced electrodynamic force may by used to enhance the drag force, to rotate the tether-satellite system and/or to provide satellite propulsion, i.e. to change the state vector of the satellite for any useful purpose, e.g. to avoid collision or to change the host spacecraft's orbit to an orbit more favorable for more rapid deorbiting.

The present invention also teaches a tether structure that also functions as a thermal radiator and/or plasma contactor. An embodiment of the present invention using conducting elements of the satellite, e.g. the solar arrays, as electrodynamic tether structures is also disclosed.

The present invention also teaches a method for stabilizing electrodynamic space tethers. Electrodynamic tethers are known to suffer a dynamical instability under operation with constant current or uncontrolled current.[i] The tether librations, however, can be kept within acceptable bounds by performing feedback control on the tether current.

The key aspects of the method of this embodiment of the present invention are:

Feedback is performed on the in-plane libration (swinging of the tether in the plane defined by the orbital velocity vector and the radius vector).

Feedback is performed by observing the direction of the tether swing. If the tether is swinging in the same direction as the electrodynamic forces, the current in the tether is reduced slightly. A 10% reduction is sufficient. If the tether is swinging in the direction opposite to the electrodynamic forces, the current can be allowed to flow freely.

The control algorithm does not need to know the direction of the electrodynamic force or the magnetic field. All it needs to know is if the tether is performing drag or propulsion. If it is performing drag, then the current is damped when the in-plane swing of the tether is opposite to the orbital motion. If performing propulsion, the current is damped slightly when the tether is swinging forward.

The direction of the tether swing can be deduced from sensor observations on the tether endmass, the host spacecraft, or along the tether itself. One possible method is to use a Global Positioning Satellite receiver to measure and record the velocity of the endmass over time. Periodic variations in the velocity due to tether libration can be observed to determine the direction of tether swing. A second method would be to use accelerometers to observe the acceleration of either the endmass or the host spacecraft. A third method would be to observe the attitude of the endmass or the host spacecraft to deduce the tether libration angle.

The feedback does not eliminate the tether librations. It merely prevents them from growing out of control.

This method is described in more detail and is analyzed in numerical simulations below.

BRIEF DESCRIPTION OF THE DRAWINGS

The present invention may be better understood with reference to the following drawings:

FIG. 1b is a graph showing the level of electrodynamic thrust for a 10 kilometer, 10 kilowatt tether at various altitudes and inclinations;

FIG. 13 is a diagram of a tether electrodynamic drag deorbit system with generic electron collectors and emitters, no specific deployer mechanism;

FIGS. 29a, 29b, 29c, 29d and 29e show the results of the computer simulation of the present invention used to deorbit a 1500 kg satellite orbiting from 400 km, 50 degree inclination orbit using a 7.5 km, 15 kg tether with a 15 kg end mass without control on the tether current;

FIGS. 30a, 30b, 30c, 30d and 30e show the graphical results of the computer simulation of the present invention used to deorbit a satellite as in FIGS. 29a thru 29e, but with feedback control taught by the current state of the art of limiting the current flow in the tether; FIGS. 31a, 31b, 31c, 31d and 31e, show the deorbit graphical simulation results with feedback control as taught by the present invention on the in-plane libration;

FIGS. 32a and 32b show in plane libration and tether current data for the first half day of the simulation of the tether with feedback control as taught by the present invention on the in plane libration that was shown in FIGS. 31a through 31e;

FIGS. 33a, 33b, 33c, 33d and 33e show the graphical satellite deorbit simulation results with feedback control as taught by the present invention on the out of plane libration;

FIGS. 34a, 34b. 34c, 34d and 34e, show the graphical simulation results for the deorbit of the satellite using the methods of the present invention to control both the in plane libration and the out of plane libration;

Figure 1A:
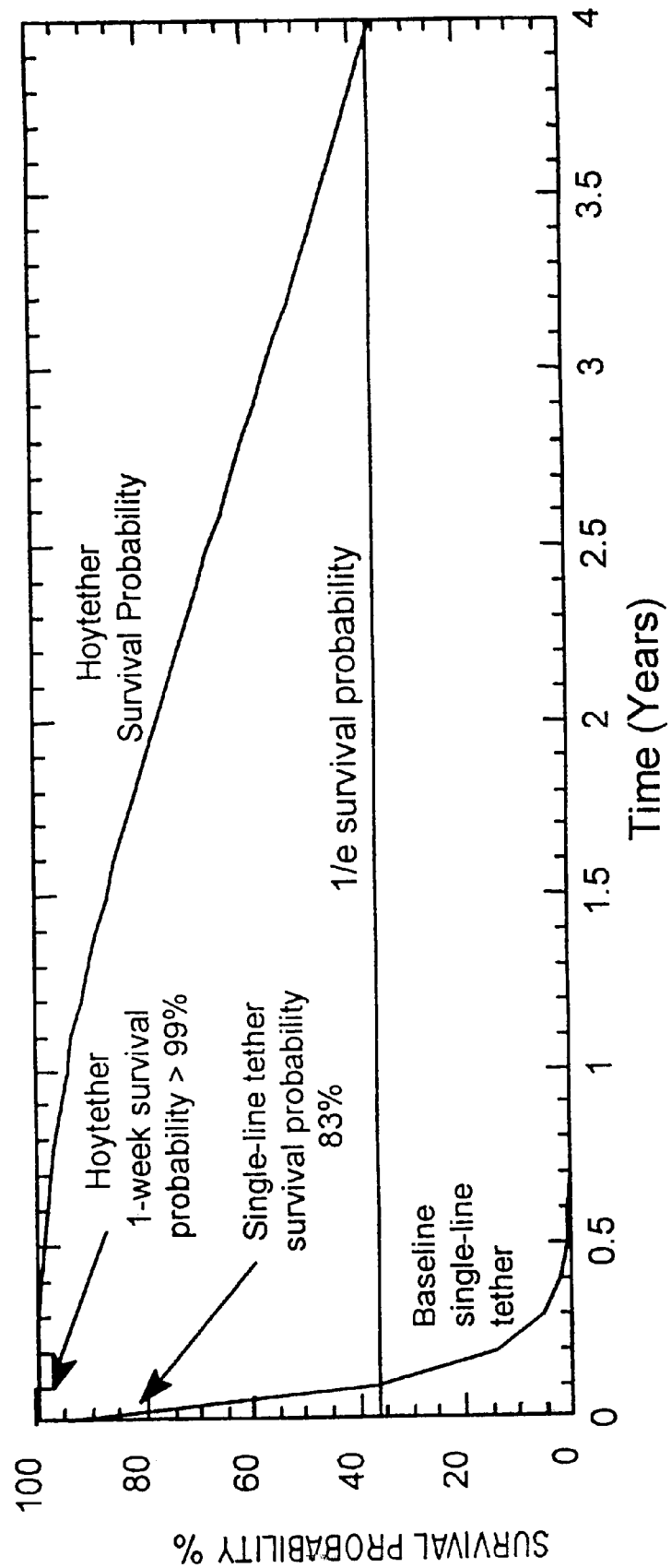
FIG. 1a is a graph comparing the survival probability of a single line tether as taught by the prior art to the Hoytether used by the present invention.

The principal industrial utility of the present invention is the deorbiting of satellites in Earth orbit, which necessarily can happen only in outer space. Until the present invention is reduced to actual practice by use with satellites in outer space and a body of practical experience is thereby obtained, the present invention can only be constructively reduced to practice, such as by this written specification and its associated drawings, diagrams and graphs. And by reference to electric measurements made on conducting tethers in space by the PMG and TSS experiments. The inventors provide herein a detailed discussion of the theory of the present invention to help those skilled in the art of aerospace and tether engineering to understand the present invention and to make and use the best embodiment of the present invention known to the inventors at the time this specification was prepared, without undue experimentation.

Although the present invention is discussed in this specification in its preferred embodiment as a means of deorbiting satellites, it must be emphasized that discussion of this specific use in no way limits the broad scope of the present invention. The present invention can be used to change the direction and speed, i.e. the state vector, of any space object providing that object is in motion relative to any magnetic field. This magnetic field may be that of the Earth or of any other celestial body, for example Jupiter or the sun.

There are significant near term uses for the present invention. These include, but are not limited to:

Space Station Reboost: The Boeing Company is currently studying the application of electrodynamic tethers for reboost or stationkeeping of the International Space Station. A previous study led by NASA/MSFC concluded that electrodynamic reboost of the space station could save over $ 1,000,000,000 in reboost costs over a ten-year period.

Microsatellite Propulsion: Tethers Unlimited is investigating the use of small electro-dynamic tether systems for performing stationkeeping and formation flying maneuvers for microsatellites. Current market projections predict that several dozen microsatellites will be deployed every year over the next decade.

Tether Boost Facilities for Propellantless In-Space Transport: Tethers Unlimited and Boeing are collaborating under funding from NASA's Institute for Advanced Concepts to develop designs for Momentum-Exchange/Electrodynamic-Reboost (MXER) tether facilities to boost payloads from LEO to GTO, the Moon, and Mars. These facilities will use electrodynamic propulsion to restore the orbital momentum and energy of the tether system after each payload has been boosted to its destination.[ii].

Earth-To-Orbit Launch Systems: Boeing and TUI are also collaborating on the development of the HASTOL system, in which a hypersonic airplane or other reusable launch vehicle will carry a payload up to the top of the atmosphere, where a Momentum-Exchange/Electrodynamic-Reboost tether will pick the payload up and boost it into orbit or toss it to escape. Analyses to date indicate that use of a tether as a "second stage" in the launch system may enable current hypersonic airplane technology to provide significant payload fractions to orbit. In addition, TUI and Andrews Space Technology are collaborating on a similar system in which a MXER tether would pick payloads up from a suborbital Gryphon™ launch system and boost them into orbit.

Orbital Tug: NASA and other companies have proposed the development of an electrodynamic upper stage for satellite deployment.

All of these potential commercial applications of electrodynamic tether technologies will require control of the tether dynamics to ensure that the tether remains stable and performs with optimum efficiency. The Tether Control System taught by the present invention will enable each of these systems to operate reliably.

Tethers Unlimited, Inc. is also pursuing a potential terrestrial spin-off application of tether technologies in collaboration with Mirada, Inc. and Veritech, in which tethered unmanned gliders will be used to provide high-angle and over-the-horizon sensing for commercial applications such as the fishing industry and law enforcement. A component of this technology will be methods to control the dynamics of a multi-kilometer tether in a complex aerodynamic environment. The present invention may aid this spin-off application.

In this specification the material forming the structure of the electrodynamic tether is specified as being a conductor. For example, a metal, such as copper or aluminum wire could be used. Likewise, nonmetallic conductor, such as carbon nanotubes, or a conductive polymer could form the conductive structure of the tether.

FIG. 1a shows the survival curve for a Hoytether as used by the present invention vs. the survival curve of a prior art single line tether. The survival probability curve of the Hoytether as a function of time does not conform to the well known "1/e decay" shape of a single-line tether. The Hoytether can maintain a high level of survival probability, above 99 percent, until it nears its 'lifetime'. Its survival probability then drops rapidly to zero. A detailed mathematical analysis of the difference between Hoytether and single tether survival probabilities is given in Appendix E "Small Impactor Survival Probabilities of Hoytethers" and Appendix F "Large Orbital Debris Survival Probabilities of Hoytethers", both contained in the Final Report of NASA Contract NAS8-40545. The resulting cut probability with time for the Hoytether has a pure "bingo curve" shapes. In a bingo game, at least five numbers must be called before anyone can win, and usually many numbers have to be called before one of the bingo cards gets five in a row. In the Hoytether at least four cuts must happen at the same level (two primary lines and two secondary lines) before any failure occurs, and many cuts have to be made before any one of the levels has all four lines cut. The bingo curve has the property that the probability of survival stays very high for periods short compared to the lifetime. The probability of survival is greater than 99.9% for periods shorter than 10% of the lifetime. This is much better performance than the 1/e curve of a single line tether, where the probability of survival is only 90% at 10% of the 1/e lifetime.

FIG. 1b shows the calculated level of electrodynamic thrust, in Newtons, produced by a ten kilowatt, ten kilometer single conductor tether at altitudes between 200 and 1400 kilometers and at orbital inclinations between zero degrees and eighty degrees.

Figure 1C:
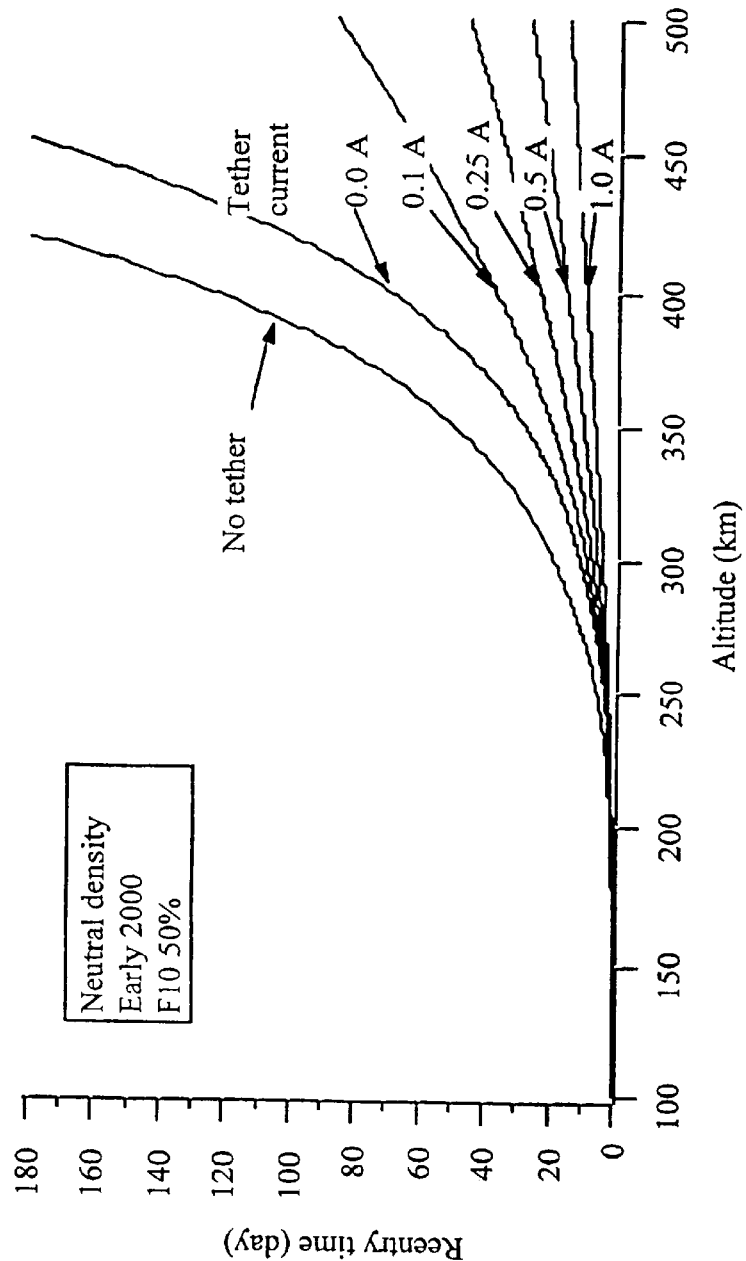
FIG. 1c is a graph showing reentry time sensitivity of a five kilometer ProSEDS tether for several conditions of current flow in the electrodynamic tether.

FIG. 1c is a graph showing the reentry time sensitivity calculated for a five kilometer ProSEDS single conductor tether at altitudes between 200 and 500 kilometers with current flow in the tether between zero and one ampere.

FIGS. 1b and 1c are the work of Enrico Lorenzini of the Smithsonian Astrophysical Observatory from his study "Performance Evaluation of the Electrodynamic Tether Tug", NASA/MSFC Grant NAG8-1303 (Nov. 12, 1966) and by "Failsafe Multiline Hoytether Lifetimes", Paper AIAA 95-2890, 31$^{st}$ Joint Propulsion Conference, Jul. 1995. They show that experts in the field believe that the present invention will have industrial utility, as the current flow of one ampere in FIG. 1c decreases the deorbit time for the calculated case from more than 180 days to less than 20 days.

Figure 2C:
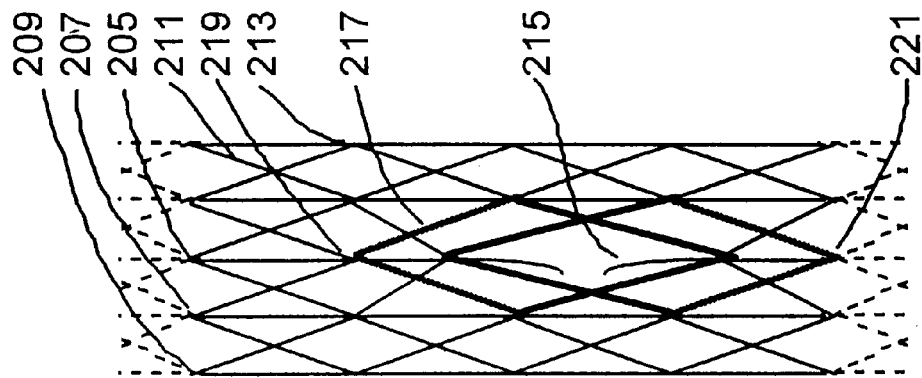
FIGS. 2a, 2b and 2c show the Hoytether structure used by the preferred embodiment of the present invention.
Figure 2B:
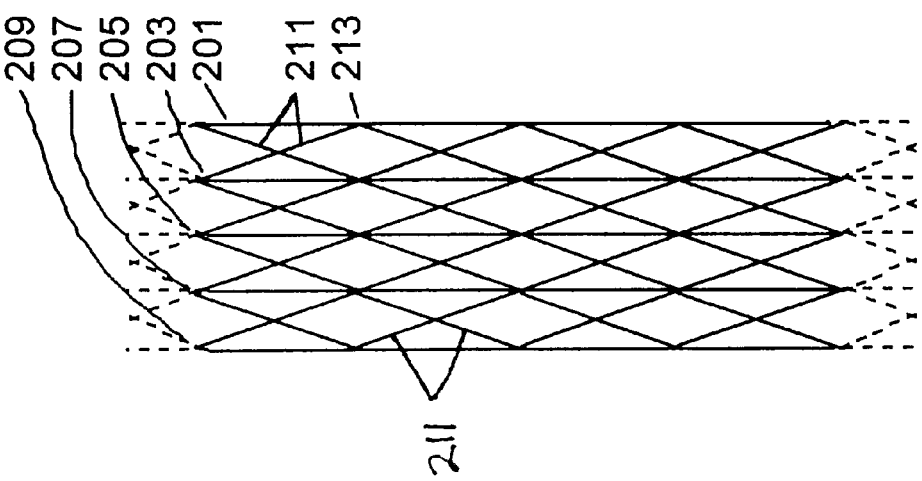
Figure 2A:
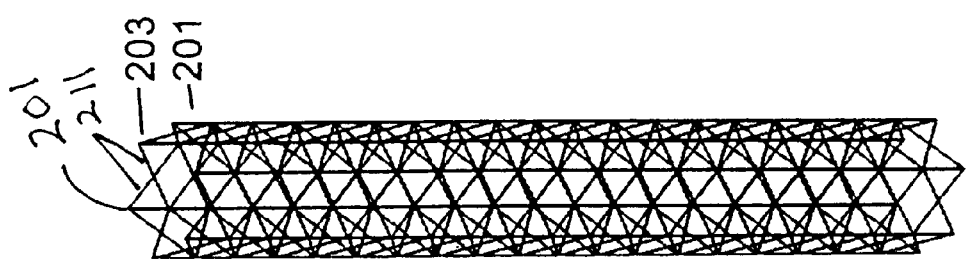

FIG. 2a is an isometric drawing showing the generally cylindrical structure of the Hoytether. In FIG. 2a, primary lines 201 and 203 are shown connected via two secondary lines 211. In FIG. 2b, which is a schematic illustration of the structure shown in FIG. 2a, primary lines 201, 203, 205, 207 and 209 are connected, each to their respective adjacent primary lines, by a plurality of secondary lines 211. These connections, for example as shown at interconnection 213, are made by knotless, slipless interconnections, such as Soutache braiding of twisted connections.

FIG. 2c shows the Hoytether structure of FIG. 2b but with a severed primary line 205 at breakpoint 215. The second level of secondary lines 217, shown as bold lines in FIG. 2c, redistribute the load from the severed primary line 215 at point 217 back to line 205 at points 219 and 221, above and below the break, respectively.

For the electrodynamic tether, a perferred embodiment would be to unroll the tuular Hoytether™ into a flat Hoytape™.

Figure 3:
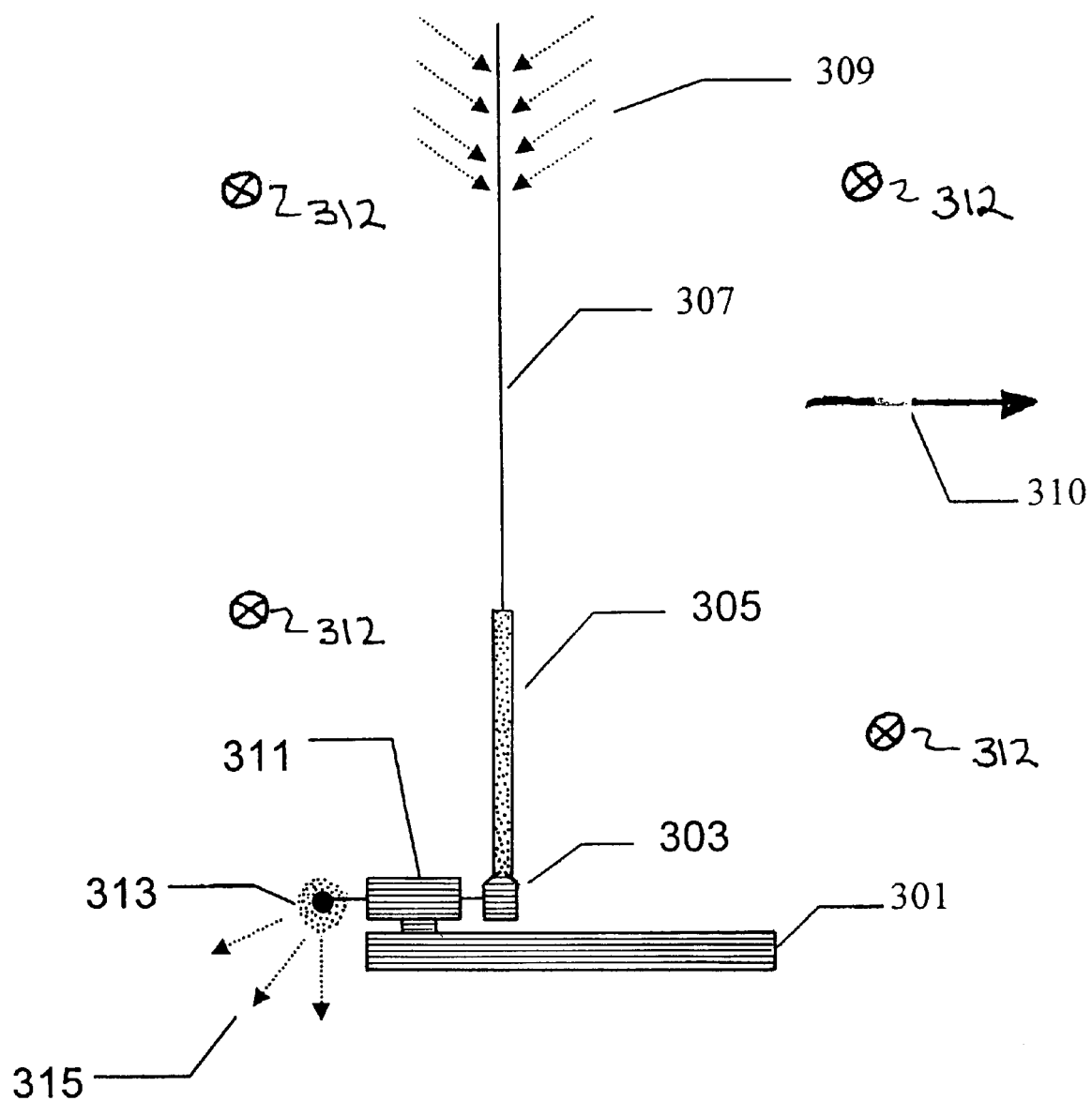
FIG. 3 is a block electrical diagram of an electrodynamic tether system.

FIG. 3 generally shows the arrangement of functional elements of an electrodynamic tether system. Of course such a system must have a means of attachment to the spacecraft, a deployer, the tether itself, some form of space plasma cathode contactor, some form of space plasma anode contactor, a power dissipation system, and a communication and control system. Each of these individual elements are known in some form to those skilled in the art of aerospace engineering. Thus the present inventors do not feel it is necessary to describe them in detail in this specification.

In FIG. 3, a space object 301, i.e. a satellite in Earth orbit, or any other space object either natural or man made, is physically connected to the tether system. The tether system comprises a deployer 303 from which extends upward a conductive Hoytether 305 having an insulated segment 306 near the space object and a bare segment 307 which extends upward from the insulated segment 306. The positively biased anode end 309 of tether 305 collects electrons from the ionosphere as space object 301 moves in direction 310 across the Earth's magnetic field. These electrons flow through the conductive structure of the Hoytether to the power system interface 311, where it supplies power to an associated load, not shown. The electrons then flow to the negatively biased cathode 313 where electrons are ejected into the space plasma 315, thus completing the electric circuit.

In order to allow those skilled in the art to better appreciate the broad scope of the present invention, the inventors will now provide an example using specific tether and system values to compare the Terminator Tether™ to prior art means, i.e. a rocket, for deorbiting a satellite.

Terminator Tethers™

When an Earth orbiting conducting space tether moves through the magnetic field of the Earth, an electromotive force (emf) per unit length e is generated in the tether that is proportional to the velocity of the conductor, the magnetic field strength of the Earth, and the angle between the conducting tether and the magnetic field lines. From data obtained during the various electrodynamic experiments that have been conducted in space to date, such as the PMG, TSS-1, and TSS-1R experiments, a typical value of the generated emf per unit length of tether of E=100–200 Volts/kilometer can be assumed. The electric potential E developed at the ends of a tether of length L is then V=EL. For a tether of length L=10 km, the electric potential developed is V=1000 volts. For calibration, the 20-km long TSS-1R tether, at the moment of failure, was developing a potential of 3500 V, which was produced by an emf of 175 V/km.

The mass of a conducting tether of length L, cross-sectional area A, and density d is given by m=dLA. Typical values for the density are d=2700 kg per cubic meter for aluminum and 8900-kg per cubic meter for copper. For a typical aluminum tether of mass m=10 kg and length L=10 km, the cross-sectional area will be A=m/(dL)=0.37 mm squared. If this were a solid-wire single-line tether, the diameter of the wire would be D=0.69 mm (21.5 gauge). If this were an 18 line tubular Hoytether, the diameter of the lines in the Hoytether would be D=0.16 mm (34 gauge).

The resistance of a conducting tether of length L and cross-sectional area A is given by $R=rL/A=rdL^2/m$, where r is the resistivity of the conductor in nano-ohm-meters (mΩ-m). Typical values for the resistivity are r=27.4-Ω-m for aluminum and 17.0-nΩ-m for copper. For our m=10 kg aluminum tether of length L=10 km and cross-sectional area A=0.37 mm squared at 20 degrees C., the end-to-end resistance is 750Ω. This value of resistance is the essentially the same whether the conductor area is concentrated into a single-line tether or divided up into many lines as in a multiline Hoytether.

The current I generated in the conducting tether by the electric potential V between the ends of the tether applied across the tether resistance R is $I=V/R.=Vm/rdL^2=Em/rdL$. For the 10 kg mass aluminum tether of length L=10 km subjected to an electric field of E=100 v/m, the electric potential is V=EL=1000 volts, and resistance R=750106 , the current is I=V/R=1.33 Amps. Currents near these values were seen in the TSS-1R experiment at the time of failure. At the time of failure of the TSS-1R tether, none of the plasma contactors on the Space Shuttle or the Italian Satellite were operating. Thus the current was being collected by the conductive surface area of the Space Shuttle and the Italian Satellite at the two ends of the tether. The Space Shuttle area is quite large, so it was not the limiting factor in current collection. The diameter of the Italian Satellite was 1.6 m, which would give it an effective plasma contact area of about 8 square meters. This shows that, if the plasma contact area of the ends of a conductive space tether can be make large enough, then ampere level currents can be extracted from the ambient space plasma.

The power dissipated as ohmic heating in the tether is given by $P=IV=V^2/R=mE^2/rd$. Thus the power dissipated does not depend upon the length or the area of the tether (within reason), but only the mass of the tether m, the resistivity r and density d of the tether material, and the emf per unit length e generated by the motion of the conductor through the Earth's magnetic field. For an aluminum tether of mass m=10 kg, resistivity r=27 nΩ-m, and density d=2700 kg/cubic meter, subjected to an electric field of E=100 V/m, the power dissipated in the ohmic losses of the conductor is P=1330 Watts. For a 1 kg mass tether, it would be still a considerable 133-Watts of dissipation.

There will no doubt be additional dissipation of energy in plasma ohmic losses, plasma wave generation, and plasma ion acceleration, but the ohmic losses in the conducting tether alone are sufficient for the task of deorbiting an unwanted spacecraft massing 100 to 1000 times more than the tether.

The decay time of a metric ton spacecraft moving from a 1000 km orbit to a 200 km altitude orbit with an energy difference of dU=3.3 GJ, when its energy is being dissipated at a power of P=1330 W by an aluminum tether massing just 10 kg, or 1% the mass of the spacecraft, is about one month. This is a remarkably short time, and indicates that the concept of using a conductive tether to deorbit a spacecraft is indeed feasible. If the aluminum tether massed only 1 kg, or ¹⁄₁₀₀₀th the mass of the spacecraft it was deorbiting, then the decay time would rise to 10 months, still a reasonable value.

In reality, of course, the actual decay time will be longer than this. If the electrodynamic drag force is very large, and becomes larger than the gravity gradient forces pulling on the ends of the tether (which force is proportional to the mass of the tether), then the tether will tend to align itself along the magnetic field lines instead of across them, and the drag force will decrease because of the small angle between the conductor length and the magnetic field lines. The tether will then settle into an angle determined by the balance between these two forces.

Is the Terminator Tethers™ theoretically a better means than atmospheric drag or a rocket engine for deorbiting satellites at the end of their useful life?

In the formula for da/dt (change in altitude per change in time), using the assumptions of near-circular spiral trajectories, the Area-Time-Product (Z), the criteria by which NASA judges compliance with Safety Standard 1740.14, is given by:

Z is equal to:

$$A \int dt = -\frac{m}{C_D} \int \frac{da}{\rho(a)\sqrt{\mu a}},$$

where p(a) is simply the density as a function of semi-major axis. Thus, for a static atmosphere, the problem of area-time product is reduced to quadrature. Note that the area-time product depends only on the density profile and the ratio of spacecraft mass to drag-coefficient and is linearly related to that ratio.

The basic altitude-dependence of the atmospheric density, represented here by p(a) can be expressed in a low-order power series of ln(density)=f(ln(altitude)), so that it will be possible to develop a representation of the log-log relationship between altitude and density. The three static levels of atmospheric density are modeled as 5th order polynomials in the natural log of the altitude and are representative of well known atmosphere models, for example, Jacchia, L. G., "Thermospheric Temperature, Density, and Composition: New Model," SAO Special Report 375, March 1977. 2. Anon., Marshall Space Flight Center, "Long-Range Statistical Solar Activity Estimation," Atmospheric Sciences Division, 1989.) The values of exospheric temperature are reasonable (about 2-sigma) high and low solar activity values of 1400 and 800 kelvins respectively. The mean value is taken to be 1100 kelvins.

Figure 4:
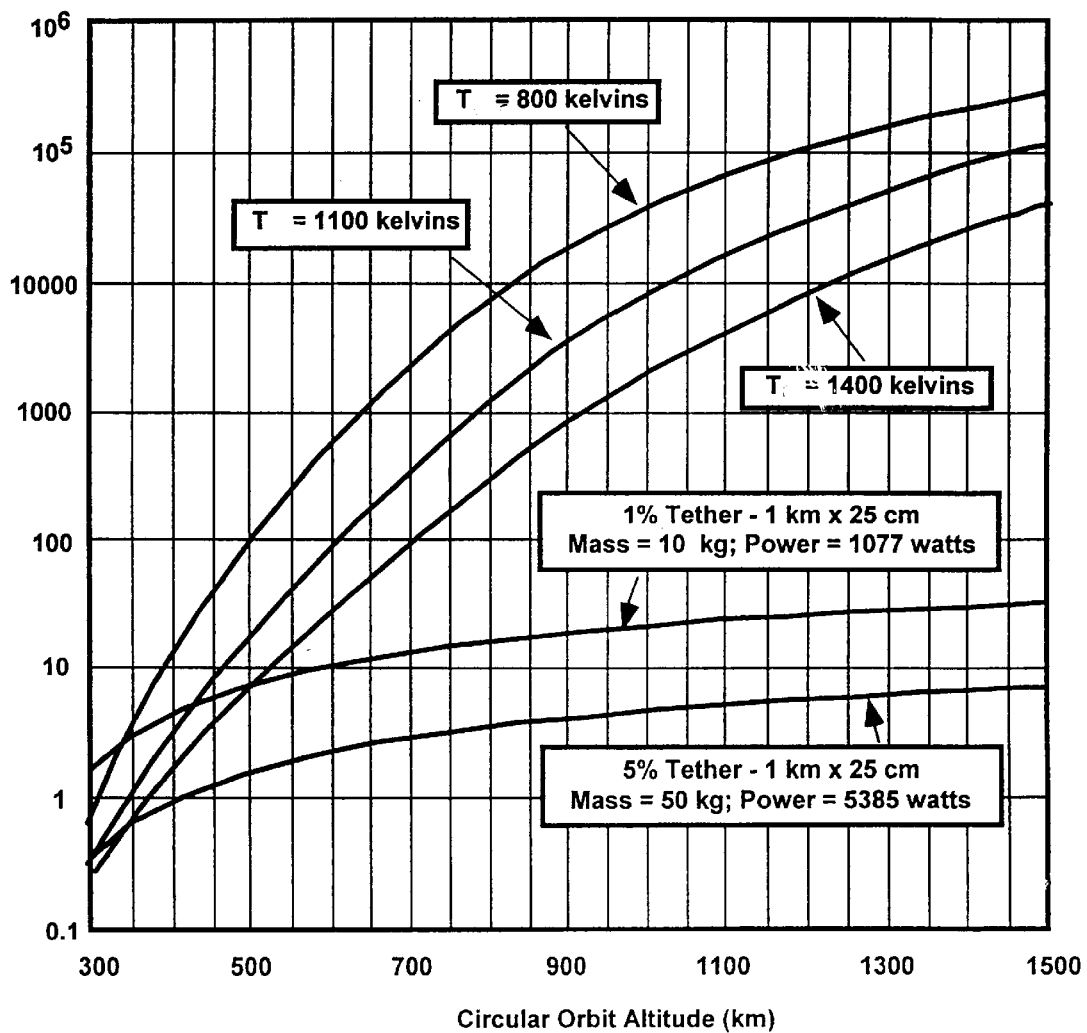
FIG. 4 is a graph showing a graph of the Area-Time product for three separate levels of exospheric temperature (for neutral drag calculations) and for two separate assumptions regarding tether mass and power drawn from the ambient plasma (for the Terminator Tether™ calculations)

FIG. 4 shows a graph of the Area-Time product for three separate levels of exospheric temperature (for neutral drag calculations) and for two separate assumptions regarding tether mass and power drawn from the ambient plasma (for the Terminator Tether™ calculations). The density profiles for the three values of exospheric temperature represent the extremes and mean values to be expected during the next several decades. The exospheric temperature goes through a cycle of about an 11 year period with maximum about 1400 kelvins and minimum about 800 kelvins.

The tether calculations include an inherent assumption that the Terminator Tether™ transfers all the energy extracted from the ambient space plasma into drag that decreases the orbital energy of the spacecraft at a rate given by the power drawn by the tether. Thus, the change in energy for a spacecraft of mass m at an initial altitude h is given by the expression:

$$\Delta E = -m \left\{ \frac{\mu}{2(R_e + h)} - \frac{\mu}{2(R_e + 250)} \right\},$$

and the time required to effect this change in energy of the mass, m, is just $$\Delta t = \Delta E / P,$$

where P is the power drawn by the tether from the ambient plasma charge.

The curves for 1% and 5% tethers do not include the effects of atmospheric drag because the electrodynamic drag is orders of magnitude greater than the neutral atmospheric drag. At altitudes greater than about 700 km, the electrodynamic drag is 200 to 3000 times greater than the neutral drag forces.

It is clear, from FIG. 4 that the Terminator Tether™ concept is far superior to neutral drag in removing spacecraft from orbit, no matter how much additional area is added to the passive spacecraft to increase the atmospheric drag. The analyst should note that FIG. 4 is proportional to mass; that is, the Area-Time-Product values should be multiplied by the mass of the spacecraft and divided by 1000 kg. This is true for the neutral drag and Terminator Tether™ curves alike. The power levels assumed for the 1% and 5% tethers are only 80% of their theoretical values. This is done to provide a 20% margin on the power available from the ambient plasma and electrodynamic gradient.

Conventional rocket mechanisms can remove spacecraft from orbit, but this mechanism is apparently not viable from mass considerations when these factors are compared with the capabilities of the Terminator Tether™. A satellite owner may decide to satisfy the NASA safety requirements by adding a small solid motor and the associated hardware, software, sensors and structure to make the package independent, to be used to deorbit the spacecraft in case the main spacecraft power, attitude, or propulsion system fails.

The requirements of such a rocket motor system are more stringent than those attributed to ordinary spacecraft. The rocket motor deorbit system must operate when some or all other systems of the spacecraft have failed. These more stringent requirements are balanced by lesser requirements of performance. The backup system must simply deorbit the spacecraft; it does not have to perform all the other duties of the spacecraft. But the backup system must know when to fire under all kinds of anomalous situations, including tumbling, offset of center of mass (because of loss of parts due to collisions), and lack of knowledge of the orbital position.

Figure 5:
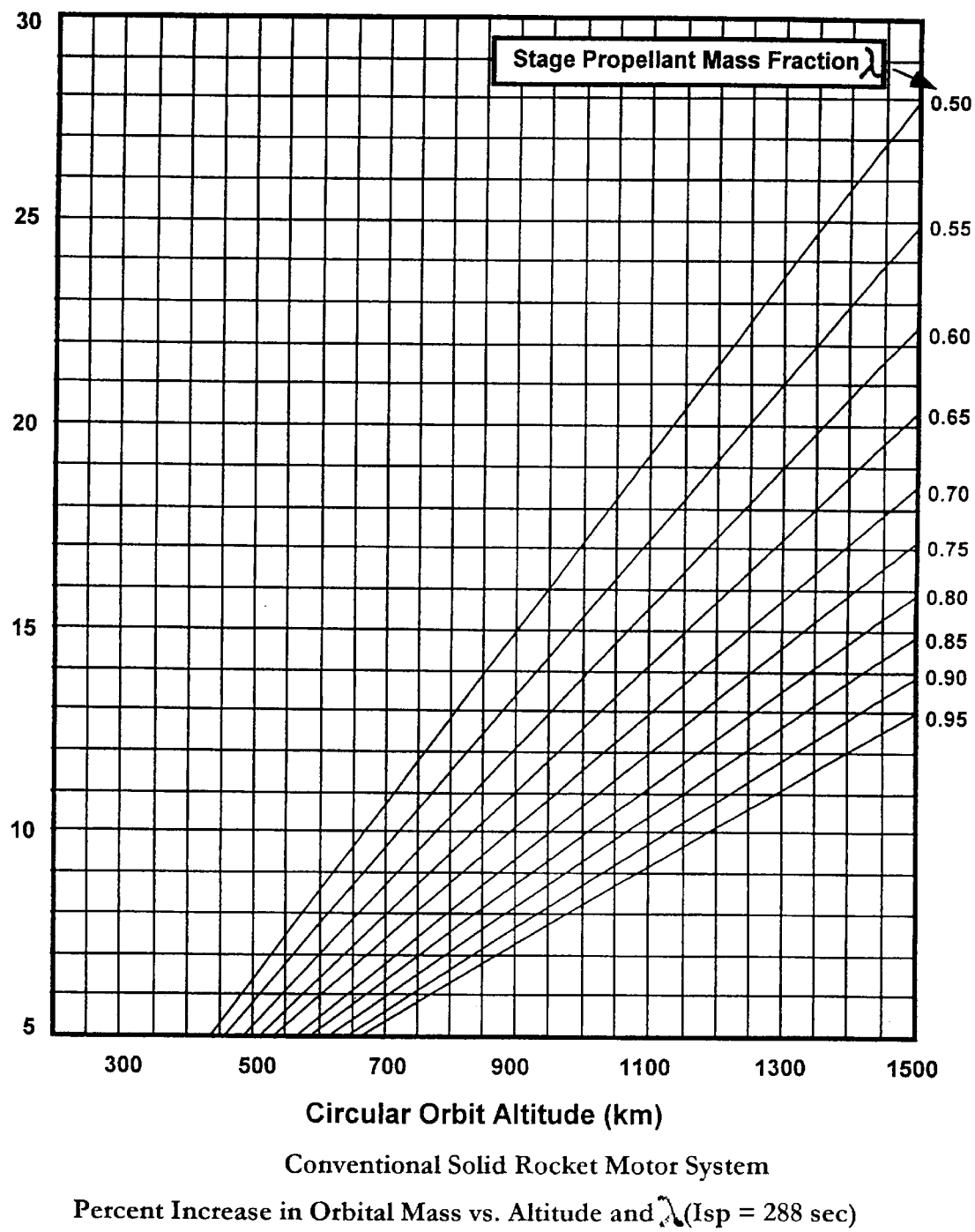
FIG. 5 is the percent additional mass required in orbit to drop the perigee of a circular orbit at altitude, at, to a value of 200 kilometers using standard chemical rocket as taught by the prior art for deorbiting unwanted spacecraft.

FIG. 5 shows the percent additional mass required in orbit to drop the perigee of a circular orbit at some initial perigee altitude to a value of 200 km. The atmospheric drag at this 200 km perigee altitude will remove any spacecraft (in the range considered) from orbit in a few revolutions.

The stage propellant mass fraction, $\lambda$, is a key stage performance parameter that describes the ratio of the mass of propellant to the mass of the stage. That is $\lambda = m_p / (m_p + m_I)$, where $m_p$ is the mass of the propellant and $m_I$ is the mass of everything else in the stage (not including the payload or any stages above or below the stage being considered). Typical independent small rocket stages have values of $\lambda$ from 0.60 to 0.75. The curves of stage propellant mass fraction are shown as straight lines (a minor approximation) and are included only from 0.5 to 0.95, the extremes of reasonable design practice.

The contours of constant stage propellant mass fraction, $\lambda$, range from low values of 0.5 through reasonable values of 0.65 to 0.7, up to the values associated with the best solid motors ($\lambda \sim 0.93$) without adding any extra hardware to the emergency stage. An effective, independent stage to provide a retro ?V of from 50 to 325 m/s will almost certainly have a $\lambda$ of the order of 0.6 to 0.75. If the emergency stage is required to perform its own attitude determination, the stage propellant mass fraction may be as low as 0.55 or 0.50. Note that the additional mass, shown in FIG. 5, must also be lofted to orbit in the first place, to provide the mass on orbit for the originally intended service.

These calculations that show, beyond any reasonable doubt, that the Terminator Tether (tm) concept is far superior to conventional mechanisms such as drag enhancement devices or small rocket deorbit propulsion systems. The superiority is measured in terms of Area-Time-Product, NASA's measure of the likelihood of collision with other spacecraft in the path of the descending spent member of a constellation. Tether calculations were made using conservative assumptions that the power extractable from the ambient plasma and electrodynamic gradient is only 80% of the theoretical power available to a perfect tether crossing the magnetic field lines at a right angle, i.e. normally.

The following analysis is presented by the inventors to help those skilled in the art to better understand the present invention when it is used as a Terminator Tether™ for removing from orbit unwanted non-geostationary Earth-orbiting spacecraft at the end their useful lives. The primary result of that analysis is that the electrical power P in the tether that is converted into heat by the resistance of the tether and radiated away into space will remove energy from the spacecraft, causing it to rapidly deorbit, thus reducing the amount of orbital space debris that must be coped with in outer space. Tether electric power P is given by:

$$P=(vB)^2m/2rd$$

where m is the mass of the conducting tether, r and d are the resistivity and density of the conducting material, and v is the velocity of the spacecraft's motion through the Earth's magnetic field B. For a m=10 kg tether of aluminum with resistivity of r=27.4 nΩ-m and density d=2700 kg/m$^3$, moving at a velocity v=7037 m/s relative to the Earth's horizontal magnetic field B=26.5 µT, the power dissipated is P=2350 W! This energy loss in the form of heat must necessarily come out of the kinetic energy of the host spacecraft. For a typical example, a 1000 kg spacecraft in a 1000 km high orbit subjected to an energy loss of 2350 J/s from a 10 kg tether (1% the mass of the host spacecraft) will be deorbited in a few weeks.

Power levels of the magnitude estimated in the previous paragraph have been measured in a real orbital space experiment, the TSS-1R mission carried out on the Shuttle Orbiter in 1995. In that experiment, a large Italian spacecraft, 1.6 m in diameter, was deployed upward from the Shuttle Orbiter at the end of a conducting copper wire tether covered with electrical insulation. As the tether was slowly deployed upwards, a series of measurements were made of the open circuit voltage induced in the tether by its motion through the Earth's magnetic field. The voltage between the end of the tether and the Orbiter ground varied from zero volts at the start to 3500 V when the amount of tether deployed approached its maximum length of 20 km. Periodically, the end of the tether was connected either to one of two different electron guns, which supplied contact to the surrounding space plasma, or to the Orbiter ground. The bare surfaces of the Shuttle Orbiter proved to be a surprisingly good plasma contactor via a combination of ion collection and secondary electron emission. The current flow through the tether was deliberately limited by control circuits and the current capacity of the electron guns to about 0.5 amperes, but power levels of 1800 Watts were reached.

The tether was intended to have a fully deployed length of 20 km, but at a deployed length of 19.5 km, when about 3500 V was being induced at the end of the tether inside the Orbiter reel mechanism, a flaw in the insulation allowed an electrical spark to jump in an uncontrolled manner from the tether to the Orbiter ground. With no control circuits to keep the current level down to 0.5 amperes, the current flow jumped to 1.1 amperes, and the total power generated was P=3850 Watts Most of this energy went into the electrical arc, which burned through the tether, causing it to break and halting the experiment. This experiment showed that large areas of bare conducting material, such as that provided by the 8.5 square meter area of the Italian spacecraft at one end of the tether and the very large surface area of the Shuttle Orbiter spacecraft at the other end of the tether can collect and emit amperes of current, while thousands of volts of potential can be generated by sufficiently long tethers moving at orbital speeds.

Thus, both theory and experimental data collected in the space environment indicate that significant amounts of electrodynamic drag force can be obtained from a low mass conducting tether attached to a host spacecraft, provided the ends of the conductor can exchange sufficient numbers of electrons with the surrounding space plasma.

Experimental data from the TSS-1R data also produced the amazing result that the efficiency of a bare metal surface in "contacting" the space plasma is many times better than the standard theory would predict. The 8 square meters of bare surface area of the Italian spacecraft were sufficient to collect the 1.1 A of electron current. This amount of area is easily replicated by a few hundred meters of bare wire, considering that the effective collection diameter around the wire is the Debye length, which is a few centimeters at the typical values for space plasma density and temperature.

Because of this result, that a bare wire can easily collect electrons, Les Johnson, Nobie Stone, Chris Rupp, and others at NASA Marshall Space Flight Center have formed a team, which includes the present inventors, which is embarked on a new flight experiment. The experiment is scheduled for a piggy-back flight on a Delta II launch of an AF Global Positioning Satellite in early 2000. The goal of the experiment is to demonstrate that electrodynamic drag from a wire moving at orbital speeds through the Earth's magnetic field will create a large enough electrodynamic drag force to deorbit the Delta II second stage, whose mass is greater than 1000 kilograms, in a few weeks. This is essentially a demonstration of the Loftus electrodynamic drag deorbit concept and the first step in the development of a Terminator Tether™.

The ProSEDS (Propulsion Small Expendable-tether Deployer System) mission will use a 5 km long copper wire massing 18 kg, a 20–35 km long nonconducting tether, and a 25–40 kg ballast mass on the end of the tether. The total of 25–40 km of tether length and the 25–40 kg ballast mass on the end will provide enough gravity gradient force to keep the tether aligned near the zenith, so that the direction of the current in the tether is at right angles to both the direction of the spacecraft motion in the nominal EW direction and the Earth's near-equatorial magnetic field in the nominal NS direction.

An important feature of the ProSEDS experiment is that it is designed to be completely self-powered. It uses a battery to initiate deployment and to power up the plasma contactor, but once current is flowing through the tether, some of the power is tapped off and used to recharge the battery. The battery, in turn, powers the current control electronics, the telemetry system, and the plasma contactor. The ProSEDS mission will not be designed to allow ground control changes in operation, primarily because of the increase in complexity and cost associated with that option.

The present invention is the use of a small, low-mass deployer/controller package containing a large collecting area, short length, multiline space tether, such as a Hoytape mesh [made of aluminum wire, as a "Terminator Tether™ "for a constellation spacecraft. The Terminator Tether™ would be deployed when the host spacecraft is no longer working or no longer wanted. The electrodynamic drag from the Terminator Tether™ would rapidly remove the unwanted spacecraft from the constellation and a few weeks later complete the deorbit of the host spacecraft from space by burnup in the upper atmosphere of the Earth. For a Terminator Tether™ to be of maximum usefulness for constellation spacecraft, it would be desirable to minimize the mass and the length of the tether. A lower added mass means more mass for revenue producing transponders, while a shorter tether length means a lower collision cross-section Area-Time Product during deorbit.

Figure 6:
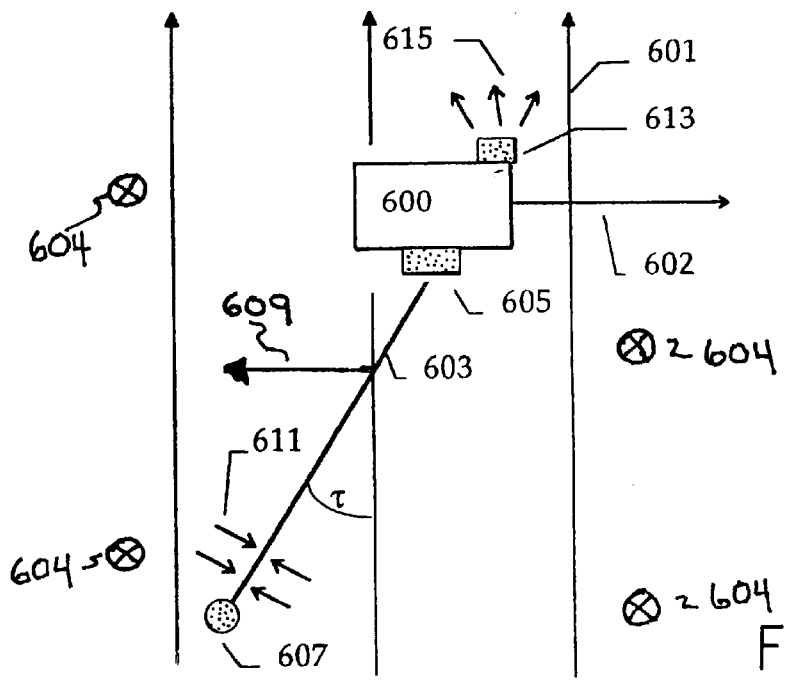
FIG. 6 is a deorbit tether system shown operating with its electrodynamic tether at a trailing 35.26-degree angle to the local vertical lines, as is taught by the preferred embodiment of the present invention.

FIG. 6 shows a spacecraft 600 having a state vector 602 that causes the spacecraft to move across the local vertical lines 601 and the magnetic field lines 604 that are shown in FIG. 6 going into the plane of the drawing. Spacecraft 600 has a conductive tether 603 attached to it by tether deployer and control system 605. The outer end of tether 603 is attached to tether end mass 607. Spacecraft 600 also has an attached electron emitter means 613.

In FIG. 6, spacecraft 600 has a velocity and direction defined by state vector 602. As spacecraft 600 moves it causes conductive tether 603 to cut magnetic field lines 604 shown going into the plane of the drawing. As this happens the distal end of the conductive tether collects electrons, shown as arrows 611, from the space plasma. Electrons 611 move through the conductive tether 603, are passed through a resistive load, not shown, in control system 605, and are emitted back into the space plasma as electrons 615 from electron emitter 613. This produces an electrodynamic drag force in the direction shown by arrow 609.

As is discussed in detail in the electrodynamic drag analysis below, especially in that sections of the analysis titled "Optimization of Tether Angle", the maximum electrodynamic drag of the tether is achieved when the angle, shown as the Greek letter τ in FIG. 6, is 35.26 degrees, trailing, to the direction of the local vertical lines 601. This angle may be maintained by a feedback control circuit that maximizes the electrodyamic drag of the tether system, as is discussed in detail below. The tether structure 603 is a Hoytether having a length of about 2 to 5 kilometers. The use of the 35.26-degree angle to the local vertical reduces the tether instability while maximizing the electrodynamic drag force 609, allowing the use of a short tether that will have a small Area-Time-Product. This will minimize the possibility that the tether will impact another space object during its use.

Figure 7:
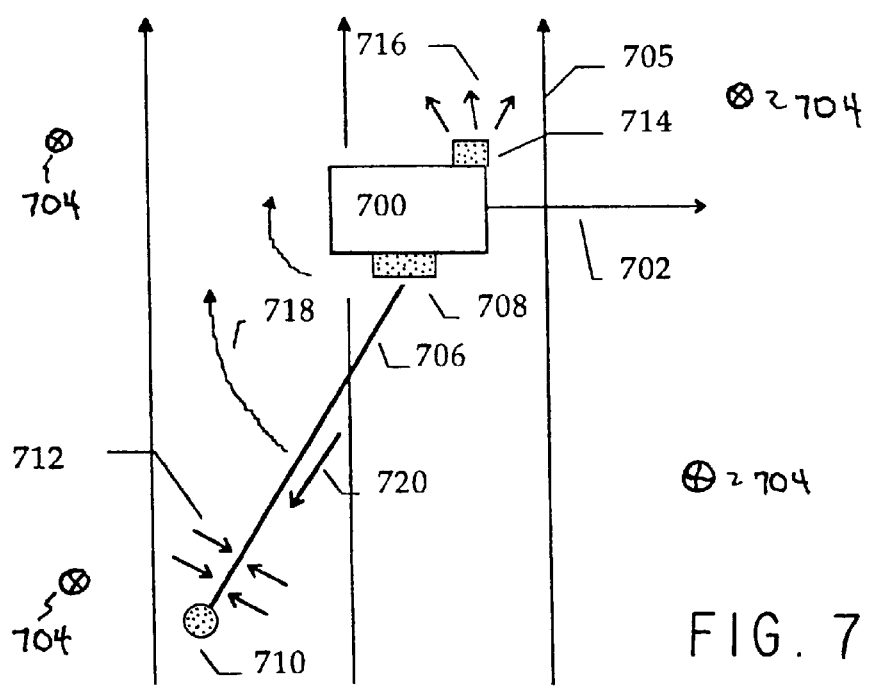
FIG. 7 shows an embodiment of the present invention in which the electrodynamic tether—satellite system is rotated about its center of mass to avoid tether instability.

In FIG. 7, spacecraft 700 has a state vector 702 across magnetic field lines 704 and local vertical lines 705. Conductive tether 706 is attached to spacecraft 700 by tether deployer and control system 708. The distal end of tether 706 is attached to a tether end mass 710. Spacecraft 700 has an electron emitter means 714.

Functionally, electrons 712 flow from the space plasma into conductive tether 706, are passed through a resistive load in contol unit 708 and are emitted into the space plasma by electron emitter 714 as free electrons 716. As is discussed in detail in the analysis below, this produces an electrodynamic drag on satellite 700, which causes it to deorbit.

In FIG. 7, spacecraft 700 is rotating with an angular velocity indicated by arrow 718. This rotation causes a centrifugal force 720 to place tension on conductive tether 706. This force 720 places tension on the tether 706 in a direction that counters tether instability. The Tether 706 may be at any angle normal to the rotation axis while the rotation of the tether-satellite system is producing this useful tension. FIG. 7 shows the angle to be 35.26 degrees from the normal to the rotation axis, but any angle will work.

Figure 8:
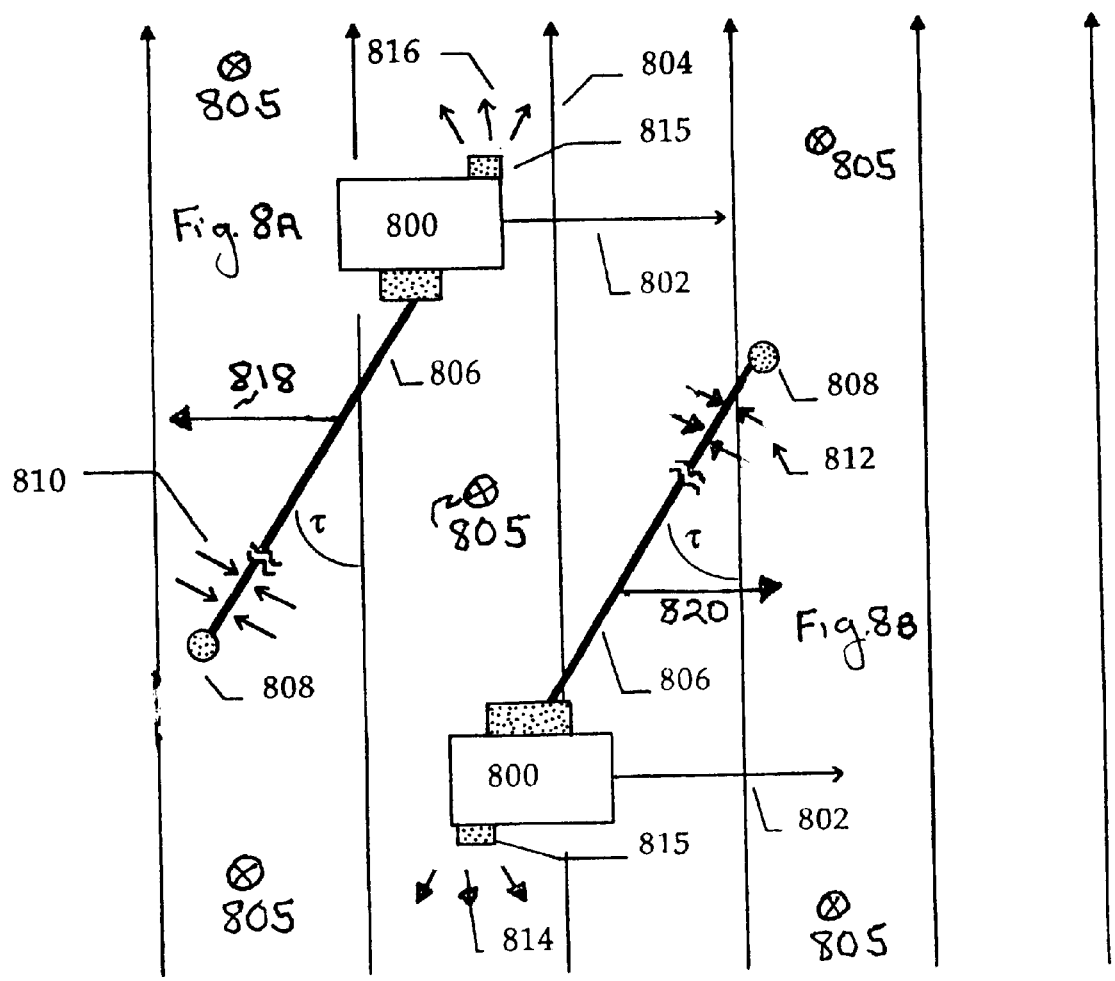
FIG. 8 shows an embodiment of the present invention wherein the tether is powered to provide induced electrodynamic force.

FIGS. 8a and 8b show a powered Terminator Tether™. In FIG. 8a the spacecraft 800 has a state vector 802 that causes it and its associated conductive tether 806 to move across magnetic field lines 805 shown going into the plane of the drawing and local vertical lines 804. Tether 806 has an end mass 808 that is proximate a plasma contactor 810. Just as was discussed in the embodiment of the present invention shown in FIG. 6 and FIG. 7, an electric current moves through the circuit formed by the space plasma, with the electrons 810 being collected by the bare wire of the conductive tether 805, through the conductive tether 806, and the electron emitter 815, thence back into the space plasma as electrons 816. This creates an electrodynamic drag on the tether in the direction shown by arrow 818, which causes the tether to lag behind the spacecraft by the angle τ with respect to the local vertical lines 804. The optimum angle is 35.26 degrees.

In FIG. 8b, similar numbers indicate similar structures. In FIG. 8b, however, an electric power source, not shown, in spacecraft 800 provides electrical potential to push electrons through conductive tether 806. The electrons 812 are collected from the space plasma by the bare wire end of tether 806, move through the tether 806 and spacecraft 800, and then electrons 814 are emitted back into the space plasma by contactor 815, thus completing the electric circuit. The result is an electrodynamic force on tether 806, and therefore on spacecraft 800, in the direction show by arrow 820, which causes the tether to lead the spacecraft by the angle τ with respect to the local vertical lines 804. The optimum angle again is 35.25 degrees.

Spacecraft 800 in FIG. 8b may be rotated as is taught in the embodiment of the invention shown in FIG. 7, above, to allow the control system to time the application of electric current to the tether 806 to cause force 820 to be exerted in any desired direction along the circle made by the rotating tether. This allows the state vector of the spacecraft to be modified to raise or lower the spacecraft's orbital altitude, or to otherwise usefully change its orbital elements.

Figure 9:
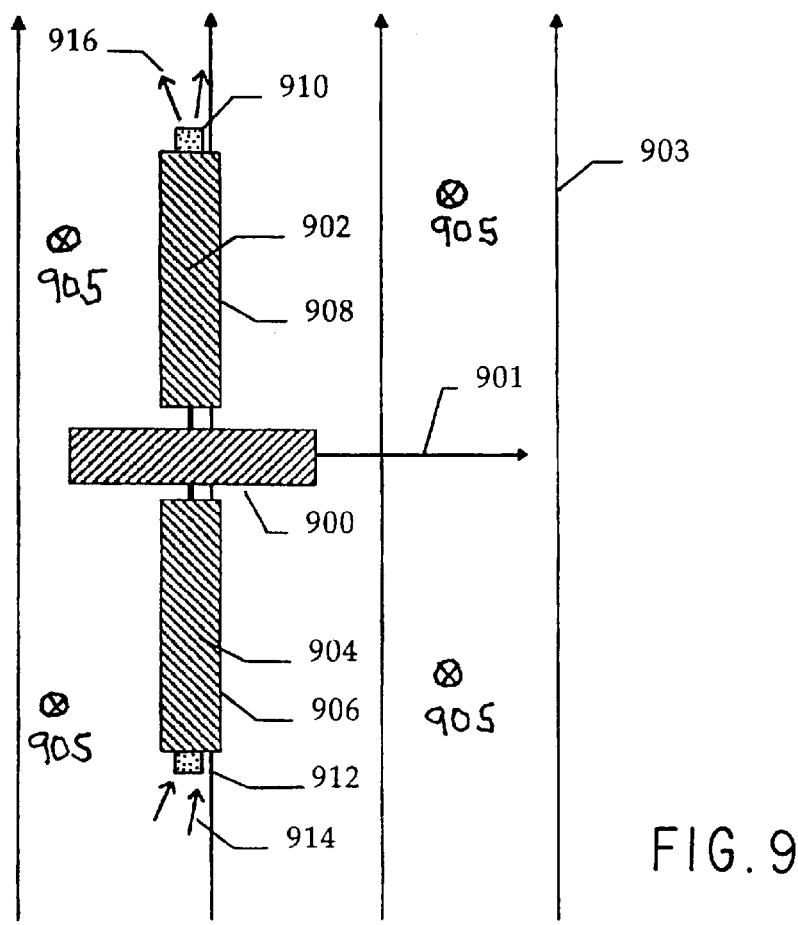
FIG. 9 shows an embodiment of the present invention wherein the solar power system structure of the satellite is used as an electrodynamic tether.

FIG. 9 shows an embodiment of the present invention wherein the conductive structure of a satellite is used as the tether. In FIG. 9, a spacecraft 900 which has a state vector 901 and is moving across magnetic field lines 905 shown going into the plane of the drawing, an local vertical lines 903, has two attached solar panels, 902 and 904. Solar panels 902 and 904 have conductive aluminum frames 908 and 906, respectively. Frame 906 is electrically and mechanically connected to plasma contactor 912. Frame 908 is electrically and mechanically connected to electron emitter 910. As spacecraft 900 moves across magnetic field 903, electrons from the space plasma 914 flow through contactor 912 and frame 906 to the body of spacecraft 900, where the current flows through a resistive load, not shown, and then into frame 908 and electron emitter 910 to the space plasma 916, thus completing the circuit. This creates an electrodynamic drag on spacecraft 900. If the power output from solar panels 902 and 904 was directed to flow into the frames, 906 and 908, then the electrodynamic interaction with the space plasma would cause a useful force to be impressed on spacecraft 900, as was discussed in connection with FIG. 8 above. The spacecraft may be rotated and/or oriented to a desired angle, as was also discussed above.

Figure 10:
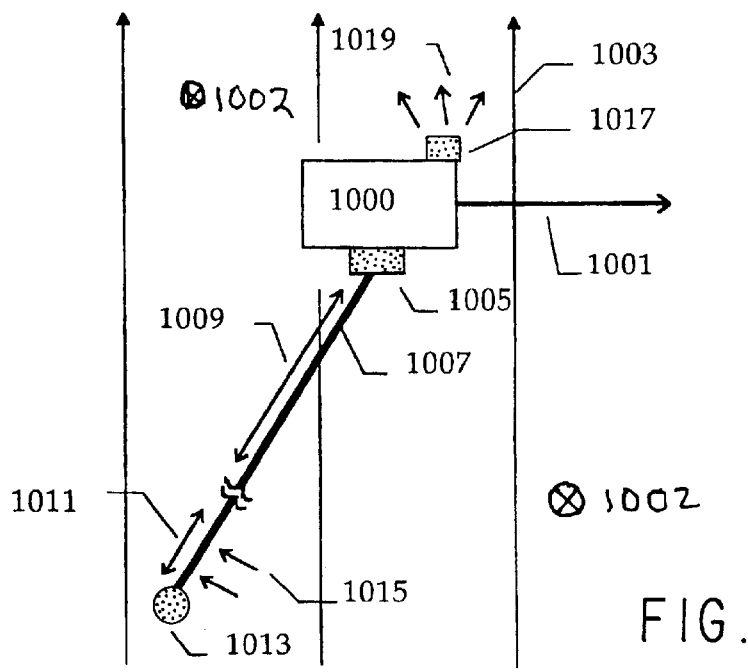
FIG. 10 shows the use of a portion of the tether structure as a thermal radiator and plasma contactor.

FIG. 10 shows an embodiment of the present invention wherein the plasma contactor and the resistive load are structurally part of the conductive tether. In FIG. 10 spacecraft 1000 has a state vector 1001 that causes it to pass across magnetic field lines 1002, shown going into the plane of the drawing in FIG. 10 and across local vertical lines 1003. Spacecraft 1000 has a tether control and deployment system 1005 that is connected to a conductive tether 1007 having an end mass 1013. A contactor portion 1015 of the conductive tether 1007 near end mass 1013 is adapted to contact the space plasma so as to receive or emit electrons. This may be the bare wire strands of a wide Hoytether, or it may be any other plasma contactor means that can be conveniently made electrically part of the Hoytether structure, such as points or metal fuzz. A second resistive portion 1009 of tether structure 1007 is adapted to be a resistive load. This may be done by making a portion of the tether structure from a material, such as nichrome steel wire, that has suitable electrical resistance. The large surface area of the Hoytether provides an excellent radiator structure into the three degree Kelvin radiation sink of outer space.

Figure 11:
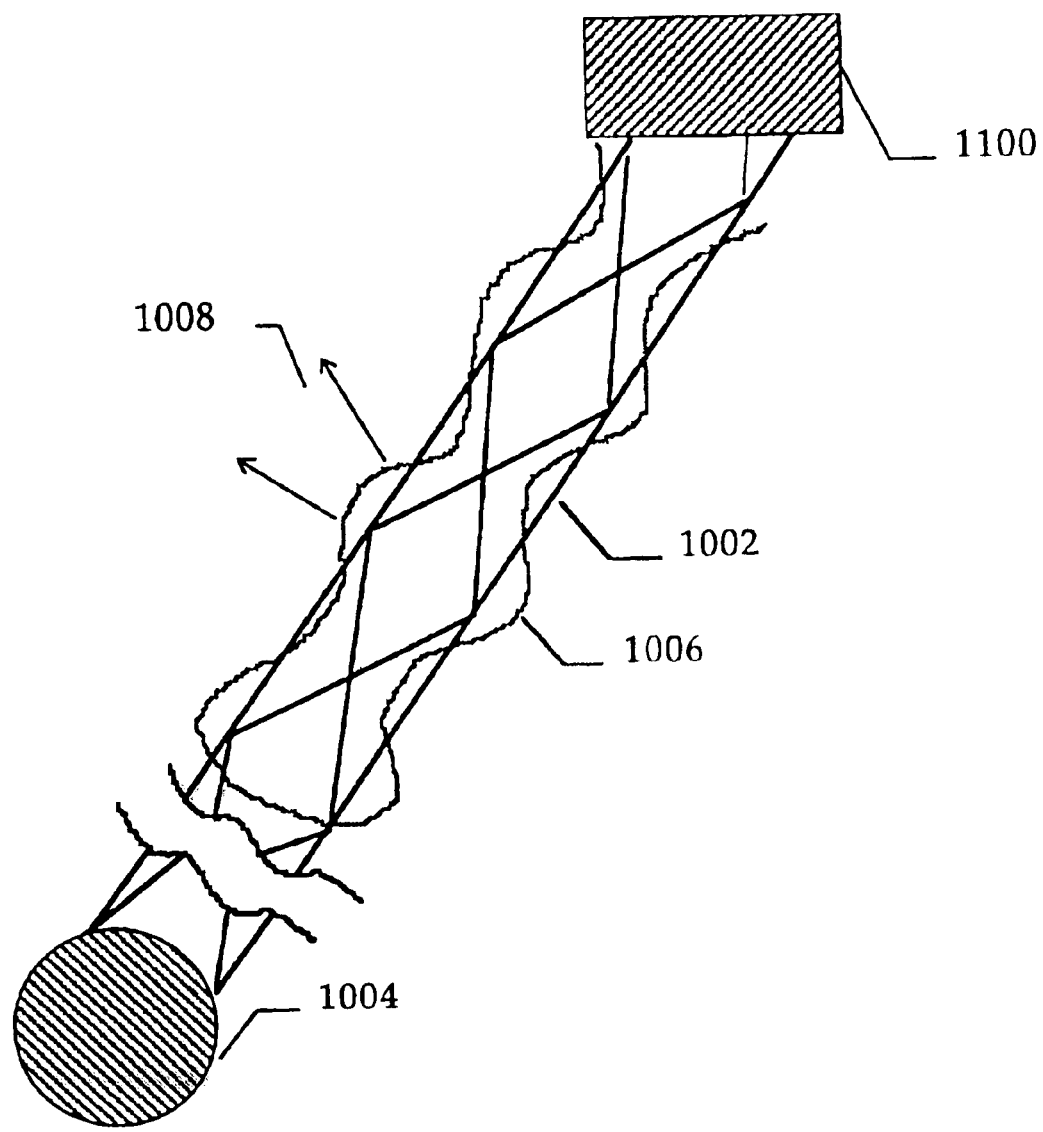
FIG. 11 shows the braiding of an ohmic resistive load into the tether structure.

FIG. 11 shows an alternative embodiment of the load resistance/radiator structure of the present invention. In FIG. 11, a biline Hoytether 1002 is attached to its control and deployer system 1100 on a spacecraft, not shown, and to a tether end mass 1004. A resistive load, 1006 is woven into the Hoytether structure, whereby this load 1006 and the section of the Hoytether 1002 into which it is woven act together as a thermal radiator allowing photons 1008 to radiate into the thermal sink of outer space.

Figure 12:
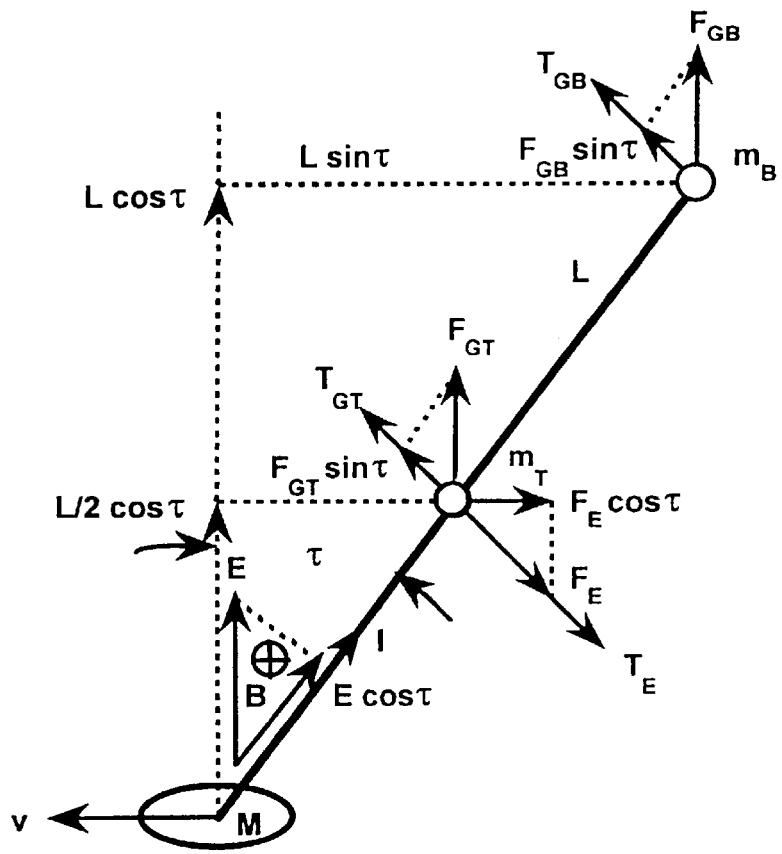
FIG. 12 is a force diagram showing the forces and torques on an upward deployed conducting tether due to the motion of the host spacecraft through the magnetic field of the Earth.

FIG. 12 is a force diagram showing the forces and torques on an upward deployed conducting tether due to the motion of the host spacecraft through the magnetic field of the Earth.

FIG. 12 is the correct scientific description of all the forces and torques acting on a system consisting of a spacecraft connected to an electrodynamic tether. FIG. 12, however, is a scientific drawing. It does not specifically call out all the components that make up the system. It also has many force and torque arrows that are superfluous to the understanding of how the method of the invention works. The following FIGS. 13–28 are meant to explain and amplify on the meaning and implications of FIG. 12.

Figure 13:
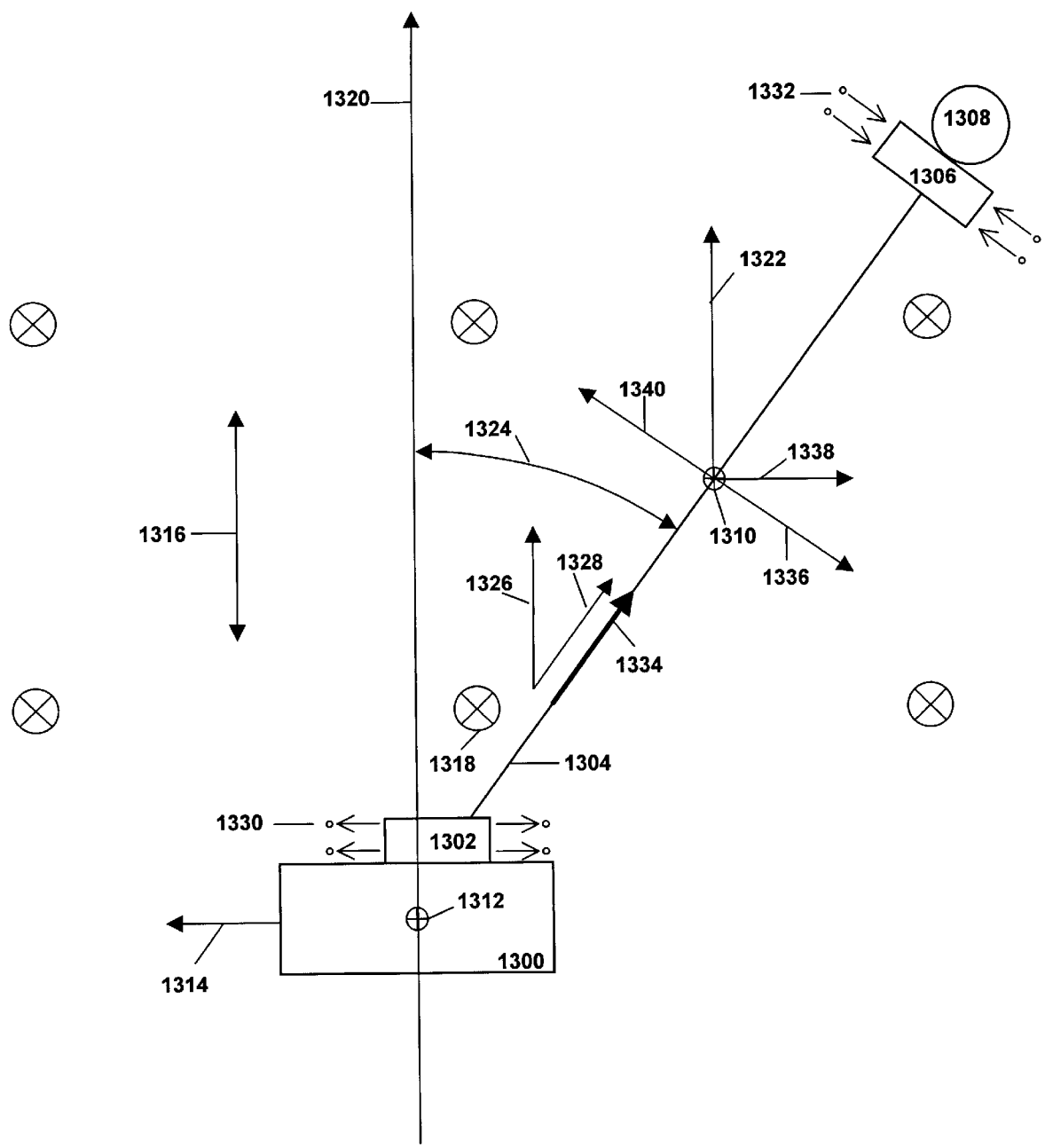
FIG. 13 is similar to the scientific diagram in FIG. 12.

FIG. 13 is meant to be a direct conversion of the scientific drawing of FIG. 12 into a patent drawing, showing the patent-relevant components of the whole system (which components include the gravity, magnetic and plasma fields produced by the nearby celestial body), the patent-relevant forces on the system, and the method by which those forces are controlled to optimize the performance of the system, in this case, for achieving rapid deorbit of the spacecraft with a minimum Area-Time-Product.

FIG. 13 shows a space system consisting of an orbiting spacecraft 1300, a spacecraft tether-current-control-device 1302, a conductive tether 1304 with a near end and a far end, an endmass tether-current-control-device 1306, and an endmass 1308. Components 1302, 1304, 1306 and 1308 comprise the Terminator Tether™ spacecraft deorbit device for the deorbit of spacecraft 1300. The spacecraft 1300 is connected to the near end of the conductive tether 1304 through the spacecraft tether-current-control-device 1302. (The near end of the conductive tether 1304 can be connected directly to the spacecraft 1300, provided the structure of spacecraft 1300 provides an electrically conductive connection between the near end of the conductive tether 1304 and the spacecraft tether-current-control-device 1302.) The far end of the conductive tether 1304 is attached to the endmass tether-current-control-device 1306 and thence to endmass 1308. (The interconnection order of the endmass tether-current-control-device 1306 and the endmass 1308 can be interchanged provided the structure of the endmass 1308 includes an electrically conductive connection between the endmass tether-current-control-device 1306 and the far end of the conductive tether 1304.)

The conductive tether 1304, the endmass tether-current-control-device 1306, and the endmass 1308 have a combined center-of-mass, the effective-total-tether-center-of-mass 1310. The sum of any forces on the conductive tether 1304, the endmass tether-current-control-device 1306, and the endmass 1308 can be assumed to be applied at the effective-total-tether-center-of-mass 1310.

In FIG. 13, the spacecraft 1300 plus the spacecraft tether current control device 1302 has a center-of-mass 1312, and a velocity and direction defined by a spacecraft state vector 1314 produced by the orbital motion of the spacecraft center-of-mass 1312 about a celestial body (not shown). The celestial body produces in the region of space around the spacecraft and tether a gravity gradient tensor field 1316, a magnetic vector field 1318 (shown 6 times in this drawing), and an electrically conductive ionized plasma (not shown). The gravity gradient tensor field 1316 of a typical spherical celestial body is a tension field, shown in FIG. 13 as a double-headed arrow in approximately the same orientation as the local vertical 1320, defined as the radial direction from the center-of-mass of the celestial body through the spacecraft center-of-mass 1312. The magnetic vector field 1318 of a typical celestial body is typically oriented along the local vertical near the magnetic poles of the celestial body and at right angles to the local vertical near the magnetic equator of the celestial body. In FIG. 13 the magnetic vector field 1318 is shown going into the page, and oriented at right angles to both the local vertical 1320 and the state vector 1314 of the spacecraft 1300, since it is this component of the total magnetic vector field that produces the desired electrodynamic forces on the total space system.

The magnitude of the gravity gradient tensor field 1316 is given by the equation $\Gamma = 3GM/R^3$, where G is Newton's Gravitational Constant, M is the mass of the celestial body and R is the distance from the celestial body. The gravity gradient tensor field 1316 thus varies with the distance R from the center of mass of the celestial body. In FIG. 13, the effective-total-tether-center-of-mass 1310 is at a greater radial distance from the center-of-mass of the celestial body than the spacecraft center-of-mass 1312. The gravity gradient tensor field 1316 thus produces a gravity gradient force 1322 on the effective-total-tether-center-of-mass 1310, which tends to orient the system along the local vertical 1320. This is the well-know "gravity gradient stabilized" mode of spacecraft orientation, used by the Space Shuttle Orbiter and many operational spacecraft. There are two possible stable configurations: The first orientation has the spacecraft 1300 above the conductive tether 1304. This orientation will be shown in FIG. 14. The second orientation, shown in FIG. 13, has the spacecraft 1300 below the conductive tether 1304.

In normal orbital spacecraft operation, the state vector 1314 is oriented at approximately a right angle to the local vertical 1320. Maintaining this orientation of the spacecraft state vector at approximately at a right angle to the local vertical and at a sufficient speed, keeps the spacecraft orbiting the celestial body despite the attraction of the gravitational field of the celestial body upon the spacecraft center-of-mass 1312. The conductive tether 1304 is oriented at some tether angle 1324 with respect to the local vertical 1320. The teaching of the invention is how to continuously maintain the tether angle 1324 at or near some optimum value for best system performance.

As the spacecraft 1300 moves through the magnetic field vector 1318, the relative motion of the spacecraft with respect to the magnetic field vector 1318 produces an electric field vector 1326 in space in the reference frame of the moving spacecraft. The electric field vector 1326 is given by the equation $E = -v \times B = -vB$, where v is the spacecraft state vector 1314 and B is the magnetic field vector 1318. The direction of the electric field vector 1326 is at a right angle to both the spacecraft state vector 1314 and the magnetic field vector 1318. The electric field vector 1326 has a component, the tether-parallel electric field vector 1328 that lies along the conductive tether 1304 as shown. If the spacecraft tether-current-control-device 1302 is activated to cause electrons 1330 to be emitted from the near end of the conductive tether 1304 into the space plasma of the celestial body, while at the same time the endmass tether-current-control-device 1306 is activated to cause electrons 1332 to be collected from the space plasma of the celestial body, then an electric current vector 1334 will flow in the conductive tether 1304 in the direction of the tether-parallel electric field vector 1328. The magnitude of the current flow can be controlled by either the endmass tether-current-control-device 1306 or the spacecraft tether-current-control-device 1302.

The flow of the electric current 1334 through the conductive tether 1304 in the presence of the magnetic field vector 1318 will induce an electrodynamic force vector 1336 on the tether. The electrodynamic force vector 1336 is given by the equation F=J×B, where J is the tether electric current vector 1334, and B is the magnetic field vector 1318. The direction of the electrodynamic force vector 1336 on the conductive tether 1304 is at a right angle to both the tether electric current vector 1334 and the total magnetic field vector generated by the celestial body. In FIG. 13, where we have assumed that the magnetic field vector 1318 is pointed into the page, the electrodynamic force vector 1336 is in the plane of the page and acting on the total-tether-center-of-mass 1310. The electrodynamic force vector 1336 has a component along the spacecraft state vector 1314, the motion-parallel electrodynamic force vector 1338. The motion-parallel electrodynamic force vector 1338 opposes the motion of the spacecraft, causing the spacecraft to deorbit faster than normal. This is a desirable result that will reduce the "Time" component of the Area-Time-Product and minimize the possibility that the tether will impact another space object during its use.

The electrodynamic force vector 1336 also causes a torque on the effective-total-tether-center-of-mass 1310 that will cause the tether angle 1324 to increase. The gravity gradient force 1322 on the effective-total-tether-center-of-mass 1310 has a component at right angles to the tether, the gravity gradient torque force 1340, which produces a torque on the effective-total-tether-center-of-mass 1310 that will cause the tether angle 1324 to decrease. As discussed in the section "Force and Torque Balance Analysis" it is the balance between these two torques that determines the tether angle 1324. As is well known, and as shown in the analysis, if the tether angle 1324 is allowed to exceed 45 degrees, the tether will become unstable and will trail behind the spacecraft, producing negligible drag force. Thus the amount of electrodynamic force must be controlled to maintain the tether at some angle less than 45 degrees. The teaching of the invention is how to maximize the motion-parallel electrodynamic force vector 1338 and thus the deorbit drag on the total system, while at the same time not allowing the tether to become unstable, by controlling the tether angle 1324 through controlling the tether current 1334.

As is discussed in detail in the electrodynamic drag analysis, especially in those sections of the analysis titled "Optimization of Tether Angle", it is shown that the maximum electrodynamic drag of the tether is achieved when the tether angle 1324 is 35.26 degrees, trailing, to the direction of the local vertical. This angle many be maintained, and any oscillations of the tether about this angle controlled, by tether current feedback control as discussed in detail below.

The preferred conductive tether structure is a Hoytether having a length of about 2 to 5 kilometers. The use of the 35.26-degree angle of the tether to the local vertical reduces the tether instability while maximizing the drag force, allowing the use of a short tether. This will decrease the "Area" component of the Area-Time-Product and minimize the possibility that the tether will impact another space object during its use.

Figure 14:
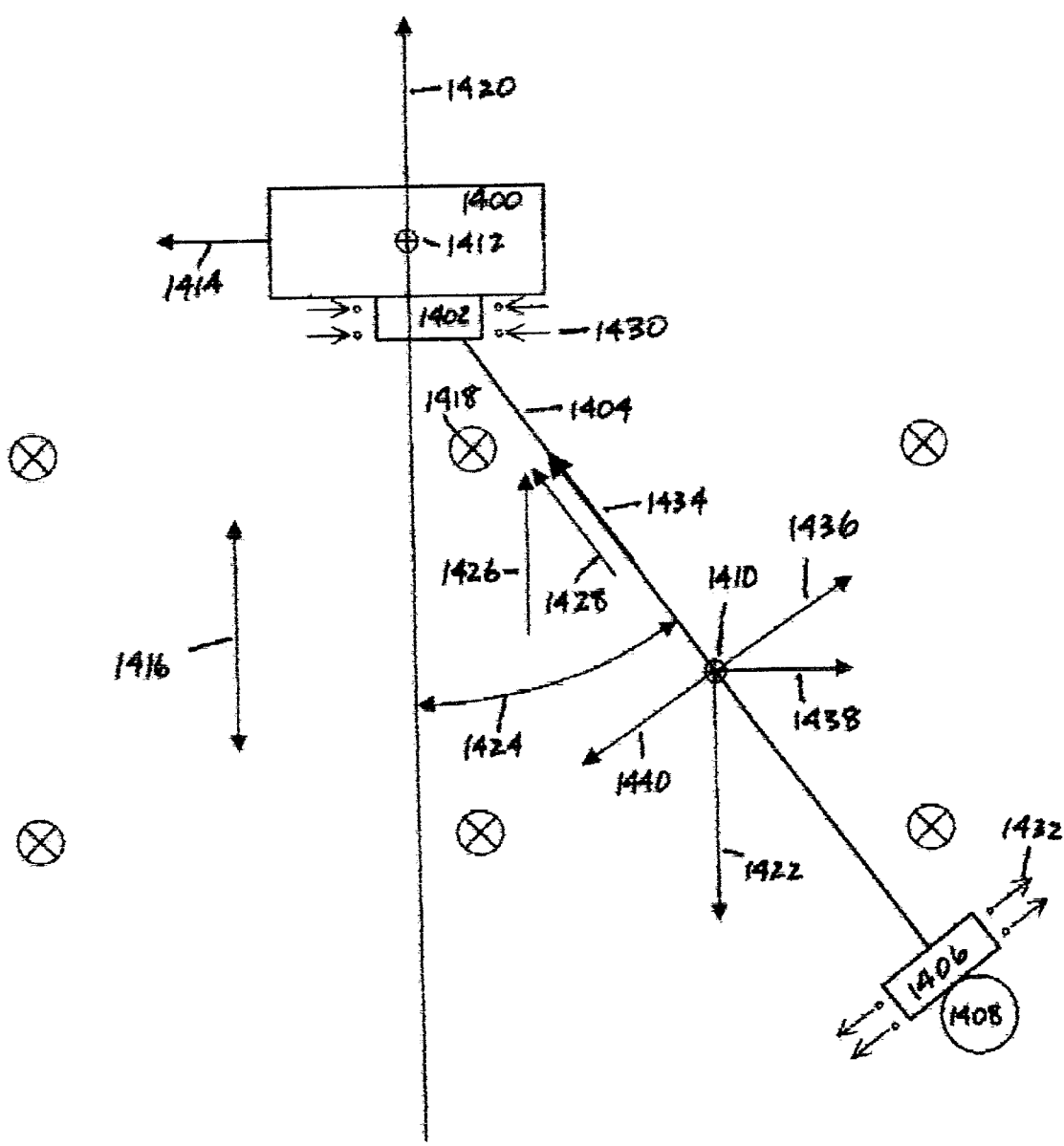
FIG. 14 is similar to FIG. 13 except that tether is hanging down from the spacecraft.

FIG. 14 is similar to FIG. 13, but in FIG. 14 the system is oriented with the spacecraft below the tether, one of the two stable orientations of the system in the gravity gradient field of the celestial body. In FIG. 14, because of the relative orientation of the spacecraft and tether, the current in the tether is directed toward the spacecraft instead of away from the spacecraft as in FIG. 13. The direction of electron flow in the tether current control devices are similarly reversed.

FIG. 14 shows a space system consisting of an orbiting spacecraft 1400, a spacecraft tether-current-control-device 1402, a conductive tether 1404 with a near end and a far end, an endmass tether-current-control-device 1406, and an endmass 1408. The spacecraft 1400 is connected to the near end of the conductive tether 1404 through the spacecraft tether-current-control-device 1402. The far end of the conductive tether 1404 is attached to the endmass tether-current-control-device 1406 and thence to endmass 1408. The conductive tether 1404, the endmass tether-current-control-device 1406, and the endmass 1408 have a combined center-of-mass, the effective-total-tether-center-of-mass 1410.

In FIG. 14, the spacecraft 1400 plus the spacecraft tether current control device 1402 have a center-of-mass 1412, and a velocity and direction defined by a spacecraft state vector 1414 produced by the orbital motion of the spacecraft center-of-mass 1412 about a celestial body (not shown). The celestial body produces in the region of space around the spacecraft and tether a gravity gradient tensor field 1416, a magnetic vector field 1418, and an electrically conductive ionized plasma (not shown). The celestial body also defines the local vertical 1420, defined as the radial direction from the center-of-mass of the celestial body through the spacecraft center-of-mass 1412.

The gravity gradient tensor field 1416 produces a gravity gradient force 1422 on the effective-total-tether-center-of-mass 1410, which tends to orient the system along the local vertical 1420. The conductive tether 1404 is oriented at some tether angle 1424 with respect to the local vertical 1420. The teaching of the invention is how to continuously maintain the tether angle 1424 at or near some optimum value for best system performance.

As the spacecraft 1400 moves through the magnetic field vector 1418, the relative motion of the spacecraft with respect to the magnetic field vector 1418 produces an electric field vector 1426 in space in the reference frame of the moving spacecraft. The direction of the electric field vector 1426 is at a right angle to both the spacecraft state vector 1414 and the magnetic field vector 1418. The electric field vector 1426 has a component, the tether-parallel electric field vector 1428 that lies along the conductive tether 1404 as shown. If the spacecraft tether-current-control-device 1402 is activated to cause electrons 1430 to be collected from the space plasma by the near end of the conductive tether 1404, while at the same time the endmass tether-current-control-device 1406 is activated to cause electrons 1432 to be emitted into the space plasma, then an electric current vector 1434 will flow in the conductive tether 1404 in the direction of the tether-parallel electric field vector 1428. The magnitude of the current flow can be controlled by either the endmass tether-current-control-device 1406 or the spacecraft tether-current-control-device 1402.

The flow of the electric current 1434 through the conductive tether 1404 in the presence of the magnetic field vector 1418 will induce an electrodynamic force vector 1436 on the tether. The electrodynamic force vector 1436 has a component along the spacecraft state vector 1414, the motion-parallel electrodynamic force vector 1438 opposes the motion of the spacecraft 1400, causing the spacecraft to deorbit faster than normal.

The electrodynamic force vector 1436 also causes a torque on the effective-total-tether-center-of-mass 1410 that will cause the tether angle 1424 to increase. The gravity gradient force 1422 on the effective-total-tether-center-of-mass 1410 has a component at right angles to the tether, the gravity gradient torque force 1440, which produces a torque on the effective-total-tether-center-of-mass 1410 that will cause the tether angle 1424 to decrease. The teaching of the invention is how to maximize the motion-parallel electrodynamic force vector 1438, while at the same time not allowing the tether to become unstable, by controlling the tether angle 1424 through controlling the tether current 1434.

Figure 15:
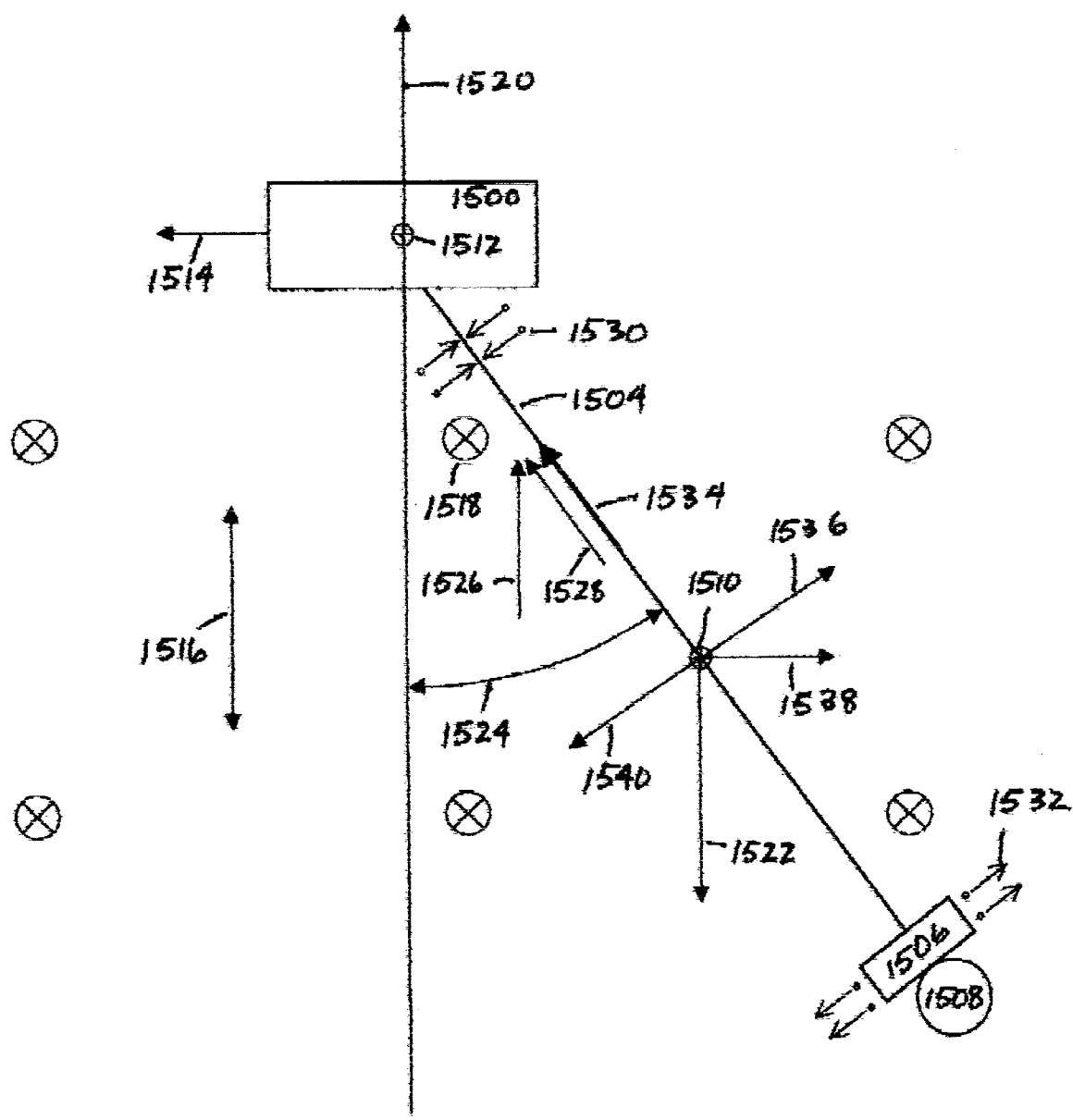
FIG. 15 is similar to FIG. 14 except that the electron collector is shown at the positive end of the tether as the bare tether wire itself.

FIG. 15 is similar to FIG. 14 except that the spacecraft tether current control device is replaced by the bare end of the conductive tether, resulting in a simpler, lower-mass, lower-cost Terminator Tether™ device.

FIG. 15 shows a space system consisting of an orbiting spacecraft 1500, a conductive tether 1504 with a near end and a far end, without insulation at the near end of the tether, an endmass tether-current-control-device 1506, and an endmass 1508. The spacecraft 1500 is connected to the near end of the conductive tether 1504. The far end of the conductive tether 1504 is attached to the endmass tether-current-control-device 1506 and thence to endmass 1508. The conductive tether 1504, the endmass tether-current-control-device 1506, and the endmass 1508 have a combined center-of-mass, the effective-total-tether-center-of-mass 1510.

In FIG. 15, the spacecraft 1500 has a center-of-mass 1512, and a velocity and direction defined by a spacecraft state vector 1514 produced by the orbital motion of the spacecraft center-of-mass 1512 about a celestial body (not shown). The celestial body produces in the region of space around the spacecraft and tether a gravity gradient tensor field 1516, a magnetic vector field 1518, and an electrically conductive ionized plasma (not shown). The celestial body also defines the local vertical 1520, defined as the radial direction from the center-of-mass of the celestial body through the spacecraft center-of-mass 1512. The gravity gradient tensor field 1516 produces a gravity gradient force 1522 on the effective-total-tether-center-of-mass 1510, which tends to orient the system along the local vertical 1520. The conductive tether 1504 is oriented at some tether angle 1524 with respect to the local vertical 1520.

As the space craft 1500 moves through the magnetic field vector 1518, the relative motion of the spacecraft with respect to the magnetic field vector 1518 produces an electric field vector 1526 in space in the reference frame of the moving spacecraft. The direction of the electric field vector 1526 is at a right angle to both the spacecraft state vector 1514 and the magnetic field vector 1518. The electric field vector 1526 has a component, the tether-parallel electric field vector 1528 that lies along the conductive tether 1504 as shown. The tether-parallel electric field vector 1528 will cause the near end of the tether to become positively charged. The positive charged bare conducting ether will attract electrons 1530 from the space plasma. If at the same time the endmass tether-current-control-device 1506 is activated to cause electrons 1532 to be emitted into the space plasma, then an electric current vector 1534 will flow in the conductive tether 1504 in the direction of the tether-parallel electric field vector 1528. The magnitude of the current flow can be controlled by the endmass tether-current-control-device 1506.

The flow of the electric current 1534 through the conductive tether 1504 in the presence of the magnetic field vector 1518 will induce an electrodynamic force vector 1536 on the tether. The electrodynamic force vector 1536 has a component along the spacecraft state vector 1514, the motion-parallel electrodynamic force vector 1538 opposes the motion of the spacecraft, causing the spacecraft to deorbit faster than normal.

The electrodynamic force vector 1536 also causes a torque on the effective-total-tether-center-of-mass 1510 that will cause the tether angle 1524 to increase. The gravity gradient fore 1522 on the effective-total-tether-center-of-mass 1510 has a component at right angles to the tether, the gravity gradient torque force 1540, which produces a torque on the effective-total-tether-center-of-mass 1510 that will cause the tether angle 1524 to decrease. The teaching of the invention is how to maximize the motion-parallel electrodynamic force vector 1538, while at the same time not allowing the tether to become unstable, by controlling the tether angle 1524 through controlling the tether current 1534.

Figure 16:
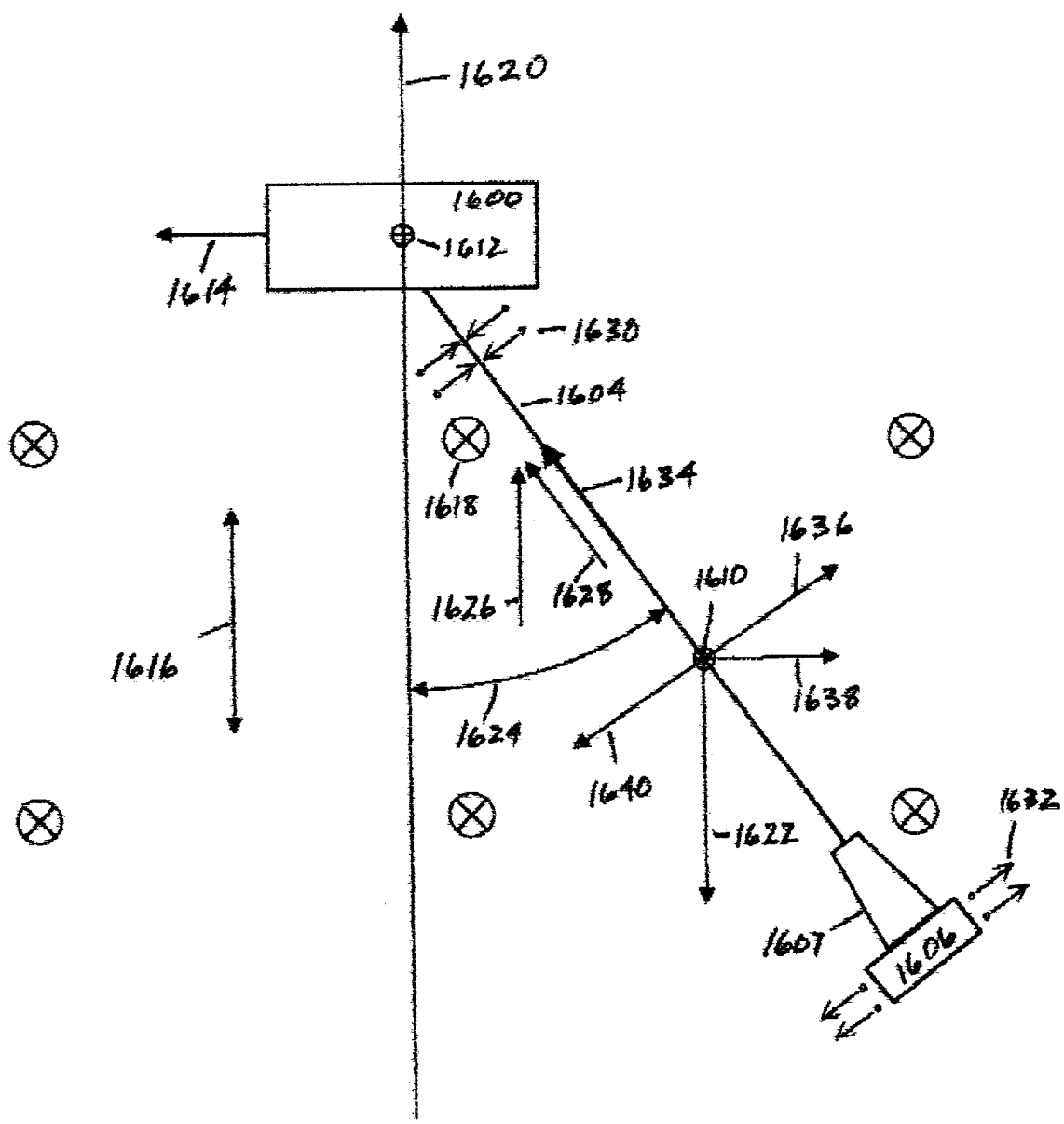
FIG. 16 is a deorbit tether system similar to that shown in FIG. 15, but showing a tether deployer with the electron emitter/tether current control device as a package at the end of the tether where the deployer can do act as ballast mass

FIG. 16 is similar to FIG. 15, except that the endmass is replaced with a tether deployer, and the endmass tether-current-control-device is attached to the deployer rather than being between the tether and the endmass. This is the preferred embodiment of the Terminator Tether™.

FIG. 16 shows a space system consisting of an orbiting spacecraft 1600, a conductive tether 1604 with a near end and a far end, without insulation at the near end of the tether, a tether deployer 1607 acting as both a deployer and an endmass, and an endmass tether-current-control-device 1606. The spacecraft 1600 is connected to the near end of the conductive tether 1604. The far end of the conductive tether 1604 is attached to the deployer 1607 and thence to the endmass tether-current-control-device 1606. The deployer 1607 provides both a mechanical and an electrical connection between the conducting tether 1604 and the endmass tether-current-control-device 1606. The conductive tether 1604, the endmass tether-current-control-device 1606, and the deployer 1607 have a combined center-of-mass, the effective-total-tether-center-of-mass 1610.

In FIG. 16, the spacecraft 1600 has a center-of-mass 1612, and a velocity and direction defined by a spacecraft state vector 1614 produced by the orbital motion of the spacecraft center-of-mass 1612 about a celestial body (not shown). The celestial body produces in the region of space around the spacecraft and tether a gravity gradient tensor field 1616, a magnetic vector field 1618, and an electrically conductive ionized plasma (not shown). The celestial body also defines the local vertical 1620, defined as the radial direction from the center-of-mass of the celestial body through the spacecraft center-of-mass 1612. The gravity gradient tensor field 1616 produces a gravity gradient force 1622 on the effective-total-tether-center-of-mass 1610, which tends to orient the system along the local vertical 1620. The conductive tether 1604 is oriented at some tether angle 1624 with respect to the local vertical 1620.

As the spacecraft 1600 moves through the magnetic field vector 1618, the relative motion of the spacecraft with respect to the magnetic field vector 1618 produces an electric field vector 1626 in space in the reference frame of the moving spacecraft. The direction of the electric field vector 1626 is at a right angle to both the spacecraft state vector 1614 and the magnetic field vector 1618. The electric field vector 1626 has a component, the tether-parallel electric field vector 1628 that lies along the conductive tether 1604 as shown. The tether-parallel electric field vector 1628 will cause the near end of the tether to become positively charged. The positive charged bare conducting tether will attract electrons 1630 from the space plasma. If at the same time the endmass tether-current-control-device 1606 is activated to cause electrons 1632 to be emitted into the space plasma, then an electric current vector 1634 will flow in the conductive tether 1604 in the direction of the tether-parallel electric field vector 1628. The magnitude of the current flow can be controlled by the endmass tether-current-control-device 1606.

The flow of the electric current 1634 through the conductive tether 1604 in the presence of the magnetic field vector 1618 will induce an electrodynamic force vector 1636 on the tether. The electrodynamic force vector 1636 has a component along the spacecraft state vector 1614, the motion-parallel electrodynamic force vector 1638. The motion-parallel electrodynamic force vector 1638 opposes the motion of the spacecraft 1600, causing the spacecraft to deorbit faster than normal.

The electrodynamic force vector 1636 also causes a torque on the effective-total-tether-center-of-mass 1610 that will cause the tether angle 1624 to increase. The gravity gradient force 1622 on the effective-total-tether-center-of-mass 1610 has a component at right angles to the tether, the gravity gradient torque force 1640, which produces a torque on the effective-total-tether-center-of-mass 1610 that will cause the tether angle 1624 to decrease. The teaching of the invention is how to maximize the motion-parallel electrodynamic force vector 1638, while at the same time not allowing the tether to become unstable, by controlling the tether angle 1624 through controlling the tether current 1634.

Figure 17:
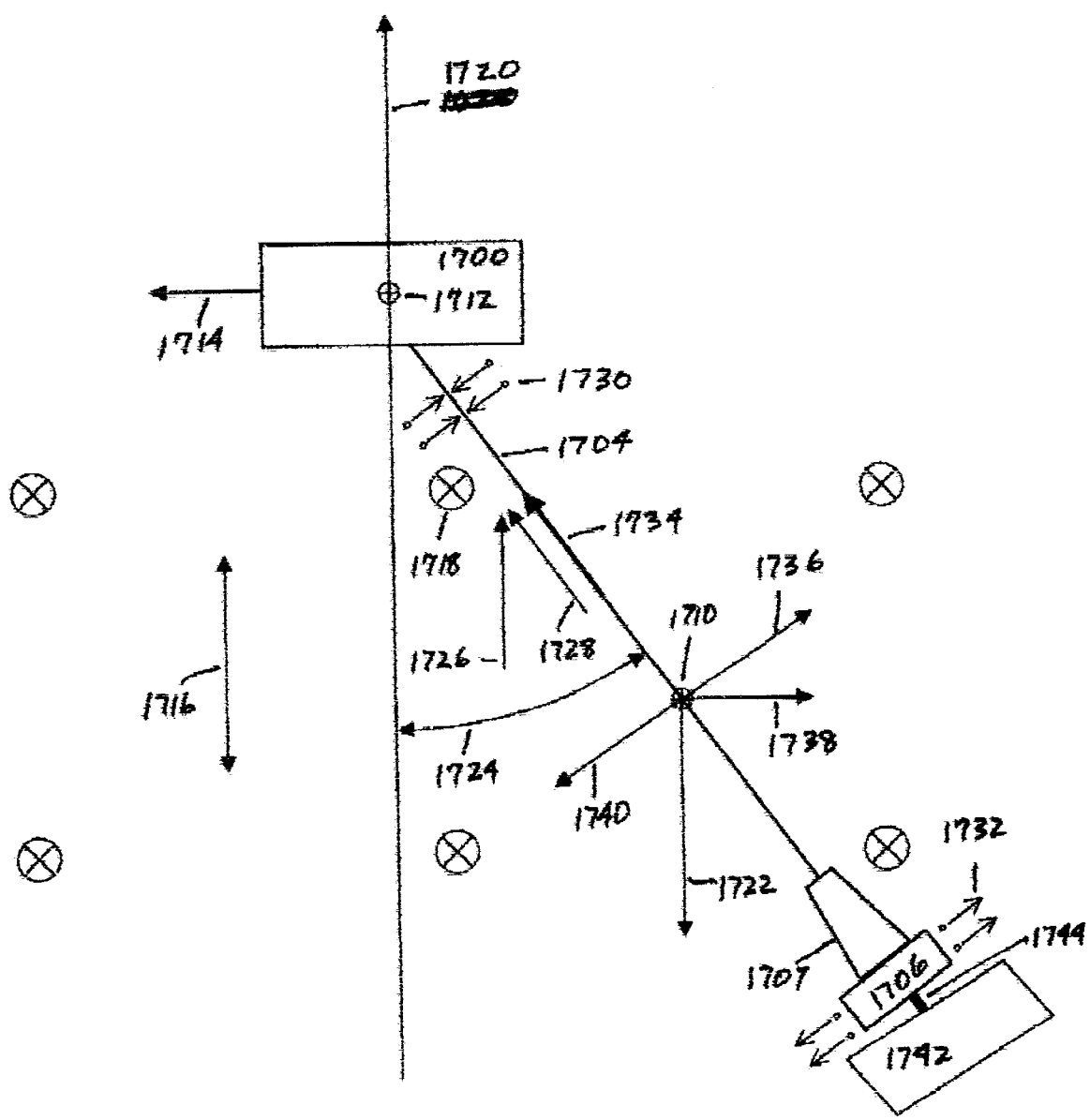
FIG. 17 shows a power-supply augmented electrodynamic drag deorbit system.

FIG. 17 is similar to FIG. 16, except that an electrical power supply has been added to augment the electrical power generated in the tether by the motion of the spacecraft through the magnetic field of the celestial body. The additional electrical power increases the drag force, resulting in a more rapid deorbit of the spacecraft. The power supply is shown attached to the end of the tether. It could be placed anywhere along the tether. The power supply is shown as a solar photovoltaic array with a rotating joint. It could be a battery or other type of power supply, and the joint may or may not be needed.

FIG. 17 shows a space system consisting of an orbiting spacecraft 1700, a conductive tether 1704 with a near end and a far end, without insulation at the near end of the tether, a tether deployer 1707 acting as both a deployer and an endmass, an endmass tether-current-control-device 1706, a power supply 1742, and a power supply connector joint 1744. The spacecraft 1700 is connected to the near end of the conductive tether 1704. The far end of the conductive tether 1704 is attached to the deployer 1707 and thence to the endmass tether-current-control-device 1706. The power supply 1742 is connected to the endmass tether-current-control-device 1706 by the power supply connector joint 1744. The deployer 1707 provides both a mechanical and an electrical connection between the conducting tether 1704 and the endmass tether-current-control-device 1706. The conductive tether 1704, the endmass tether-current-control-device 1706, the deployer 1707, the power supply 1742 and the power supply connector joint 1744 have a combined center-of-mass, the effective-total-tether-center-of-mass 1710.

In FIG. 17, the spacecraft 1700 has a center-of-mass 1712, and a velocity and direction defined by a spacecraft state vector 1714 produced by the orbital motion of the spacecraft center-of-mass 1712 about a celestial body (not shown). The celestial body produces in the region of space around the spacecraft and tether a gravity gradient tensor field 1716, a magnetic vector field 1718, and an electrically conductive ionized plasma (not shown). The celestial body also defines the local vertical 1720, defined as the radial direction from the center-of-mass of the celestial body through the spacecraft center-of-mass 1712. The gravity gradient tensor field 1716 produces a gravity gradient force 1722 on the effective-total-tether-center-of-mass 1710, which tends to orient the system along the local vertical 1720. The conductive tether 1704 is oriented at some tether angle 1724 with respect to the local vertical 1720.

As the spacecraft 1700 moves through the magnetic field vector 1718, the relative motion of the spacecraft with respect to the magnetic field vector 1718 produces an electric field vector 1726 in space in the reference frame of the moving spacecraft. The direction of the electric field vector 1726 is at a right angle to both the spacecraft state vector 1714 and the magnetic field vector 1718. The electric field vector 1726 has a component, the tether-parallel electric field vector 1728 that lies along the conductive tether 1704 as shown. The tether-parallel electric field vector 1728 will cause the near end of the tether to become positively charged. The positive charged bare conducting tether will attract electrons 1730 from the space plasma. If at the same time the endmass tether-current-control-device 1706 is activated to cause electrons 1732 to be emitted into the space plasma, then an electric current vector 1734 will flow in the conductive tether 1704 in the direction of the tether-parallel electric field vector 1728. The power supply 1742 can augment the strength of the positive electric charge on the near end of the tether causing more electrons 1730 to be collected from the space plasma, thus augmenting the electron current vector 1734. The magnitude of the current flow can be controlled by either or both the endmass tether-current-control-device 1706 and the power supply 1742.

The flow of the electric current 1734 through the conductive tether 1704 in the presence of the magnetic field vector 1718 will induce an electrodynamic force vector 1736 on the tether. The electrodynamic force vector 1736 has a component along the spacecraft state vector 1714, the motion-parallel electrodynamic force vector 1738 opposes the motion of the spacecraft 1700, causing the spacecraft to deorbit faster than normal.

The electrodynamic force vector 1736 also causes a torque on the effective-total-tether-center-of-mass 1710 that will cause the tether angle 1724 to increase. The gravity gradient force 1722 on the effective-total-tether-center-of-mass 1710 has a component at right angles to the tether, the gravity gradient torque force 1740, which produces a torque on the effective-total-tether-center-of-mass 1710 that will cause the tether angle 1724 to decrease. The teaching of the invention is how to maximize the motion-parallel electrodynamic force vector 1738, while at the same time not allowing the tether to become unstable, by controlling the tether angle 1724 through controlling the tether current 1734.

Figure 18:
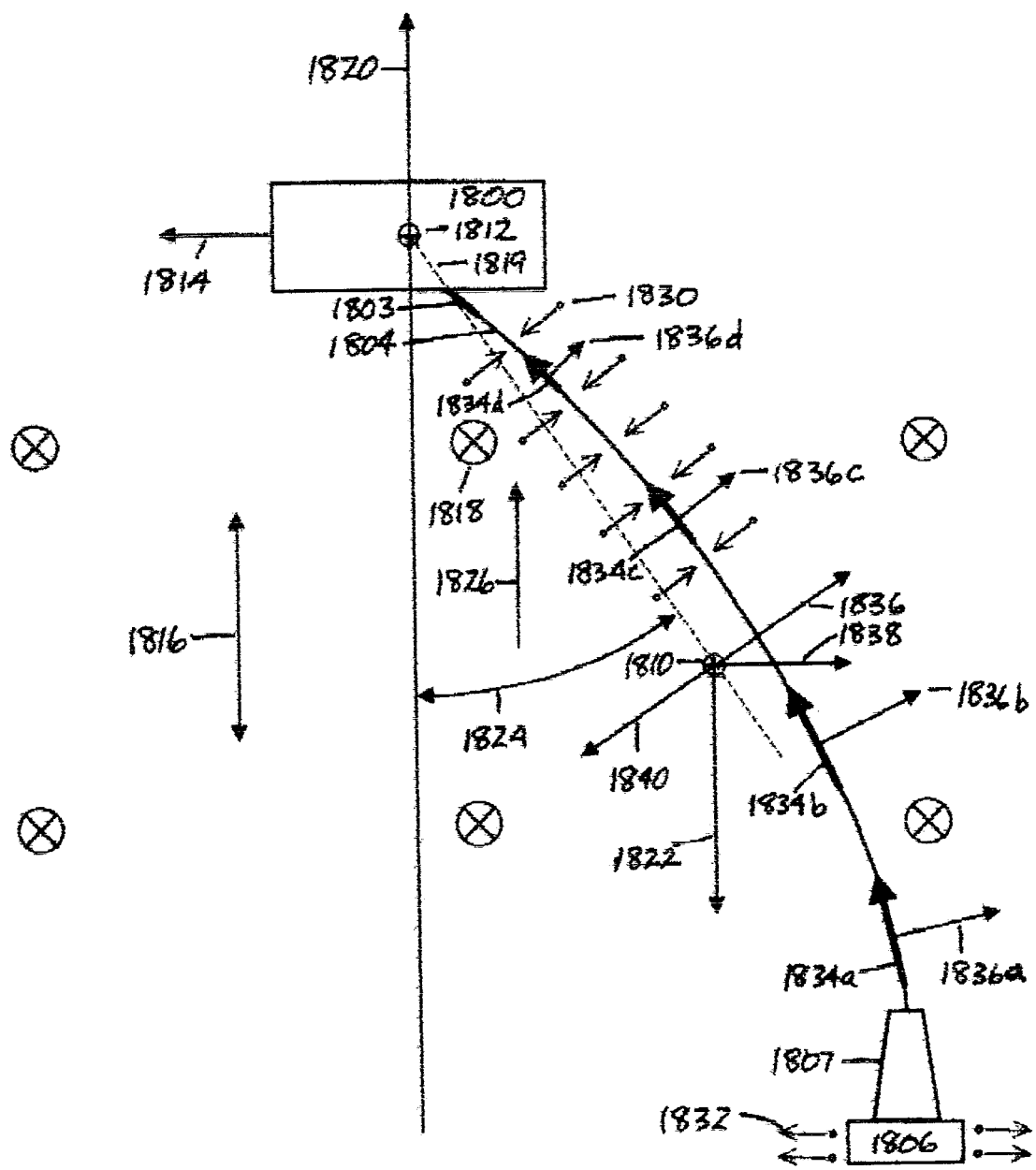
FIG. 18 is similar to FIG. 16 except that it shows more practical details including the curve of the tether.

FIG. 18 is a more realistic version of FIG. 16, in that it shows that in reality, the tether will not be straight, but somewhat curved because of the varying masses along the tether and the varying forces along the tether. Because the tether is curved, the center of mass of the total tether system does not lie exactly on the tether, but is at some point inside the curve of the tether. The important tether angle to be optimized is then not defined by the tether itself, since the tether is curved, but is defined as the angle between the local vertical through the spacecraft center of mass and the line between the spacecraft center of mass and the total tether center of mass. Also, in reality, there will usually be a short length (typically 100 meters) of non-conducting tether to insulate the host spacecraft from any electrical interactions with the Terminator Tether™ deorbit device.

FIG. 18 shows a space system consisting of an orbiting spacecraft 1800, a non-conductive tether 1803 with a near end and a far end, a conductive tether 1804 with a near end and a far end, without insulation at the near end of the tether, a tether deployer 1807 acting as both a deployer and an endmass, and an endmass tether-current-control-device 1806. The spacecraft 1800 is connected to the near end of the non-conductive tether 1803, and the far end of the non-conductive tether 1803 is connected to the near end of the conductive tether 1804. The far end of the conductive tether 1804 is attached to the deployer 1807 and thence to the endmass tether-current-control-device 1806. The deployer 1807 provides both a mechanical and an electrical connection between the conducting tether 1804 and the endmass tether-current-control-device 1806. The non-conductive tether 1803, the conductive tether 1804, the endmass tether-current-control-device 1806, and the deployer 1807 have a combined center-of-mass, the effective-total-tether-center-of-mass 1810. The components 1803, 1804, 1806, and 1807 constitute the Terminator Tether™ deorbit device.

In FIG. 18, the spacecraft 1800 has a center-of-mass 1812, and a velocity and direction defined by a spacecraft state vector 1814 produced by the orbital motion of the spacecraft center-of-mass 1812 about a celestial body (not shown). The celestial body produces in the region of space around the spacecraft and tether a gravity gradient tensor field 1816, a magnetic vector field 1818, and an electrically conductive ionized plasma (not shown). The celestial body also defines the local vertical 1820, defined as the radial direction from the center-of-mass of the celestial body through the spacecraft center-of-mass 1812. The gravity gradient tensor field 1816 produces a gravity gradient force 1822 on the effective-total-tether-center-of-mass 1810, which tends to orient the system along the local vertical 1820. The Terminator Tether™ is oriented at some tether angle 1824 off the local vertical 1820, which is defined as the angle between the local vertical 1820 and the dotted line 1819 defined by the spacecraft center of mass 1812 and the effective-total-tether-center-of-mass 1810.

As the spacecraft 1800 moves through the magnetic field vector 1818, the relative motion of the spacecraft with respect to the magnetic field vector 1818 produces an electric field vector 1826 in space in the reference frame of the moving spacecraft. The direction of the electric field vector 1826 is at a right angle to both the spacecraft state vector 1814 and the magnetic field vector 1818. The electric field vector 1826 will cause the near end of the tether to become positively charged. The positive charged bare conducting tether will attract electrons 1830 from the space plasma. If at the same time the endmass tether-current-control-device 1806 is activated to cause electrons 1832 to be emitted into the space plasma, then an electric current vector will flow in the conductive tether 1804. The electric current vector is not constant along the tether, because the electrons 1830 are entering the bare conducting tether along a substantial part of the length of the tether. The current will thus be full strength at the far end of the tether, as shown by the electric current vector 1834$a$, and will be at nearly full strength further up the tether as shown by the electric current vector 1834$b$, but will get weaker nearing the near end of the tether as shown by the electric current vector 1834$c$, and be weakest of all at the near end of the tether as shown by the electric current vector 1834$d$. The magnitude of the current flow can be controlled by the endmass tether-current-control-device 1806.

The flow of the electric currents 1834$a$ through 1834$d$ through the conductive tether 1804 in the presence of the magnetic field vector 1818 will induce a electrodynamic force vectors 1836$a$ thorough 1836$d$ on the tether which vary in both magnitude and direction. The sum of all these electrodynamic force vectors 1836$a$ through 1836$d$ is represented by the electrodynamic force vector 1836 acting upon the effective-total-tether-center-of-mass 1810. The electrodynamic force vector 1836 has a component along the spacecraft state vector 1814, the motion-parallel electrodynamic force vector 1838. The motion-parallel electrodynamic force vector 1838 opposes the motion of the spacecraft 1800, causing the spacecraft to deorbit faster than normal.

The electrodynamic force vector 1836 also causes a torque on the effective-total-tether-center-of-mass 1810 that will cause the tether angle 1824 to increase. The gravity gradient force 1822 on the effective-total-tether-center-of-mass 1810 has a component at right angles to the tether, the gravity gradient torque force 1840, which produces a torque on the effective-total-tether-center-of-mass 1810 that will cause the tether angle 1824 to decrease. The teaching of the invention is how to maximize the motion-parallel electrodynamic force vector 1838, while at the same time not allowing the tether to become unstable, by controlling the tether angle 1824 through controlling the tether current 1834.

Figure 19:
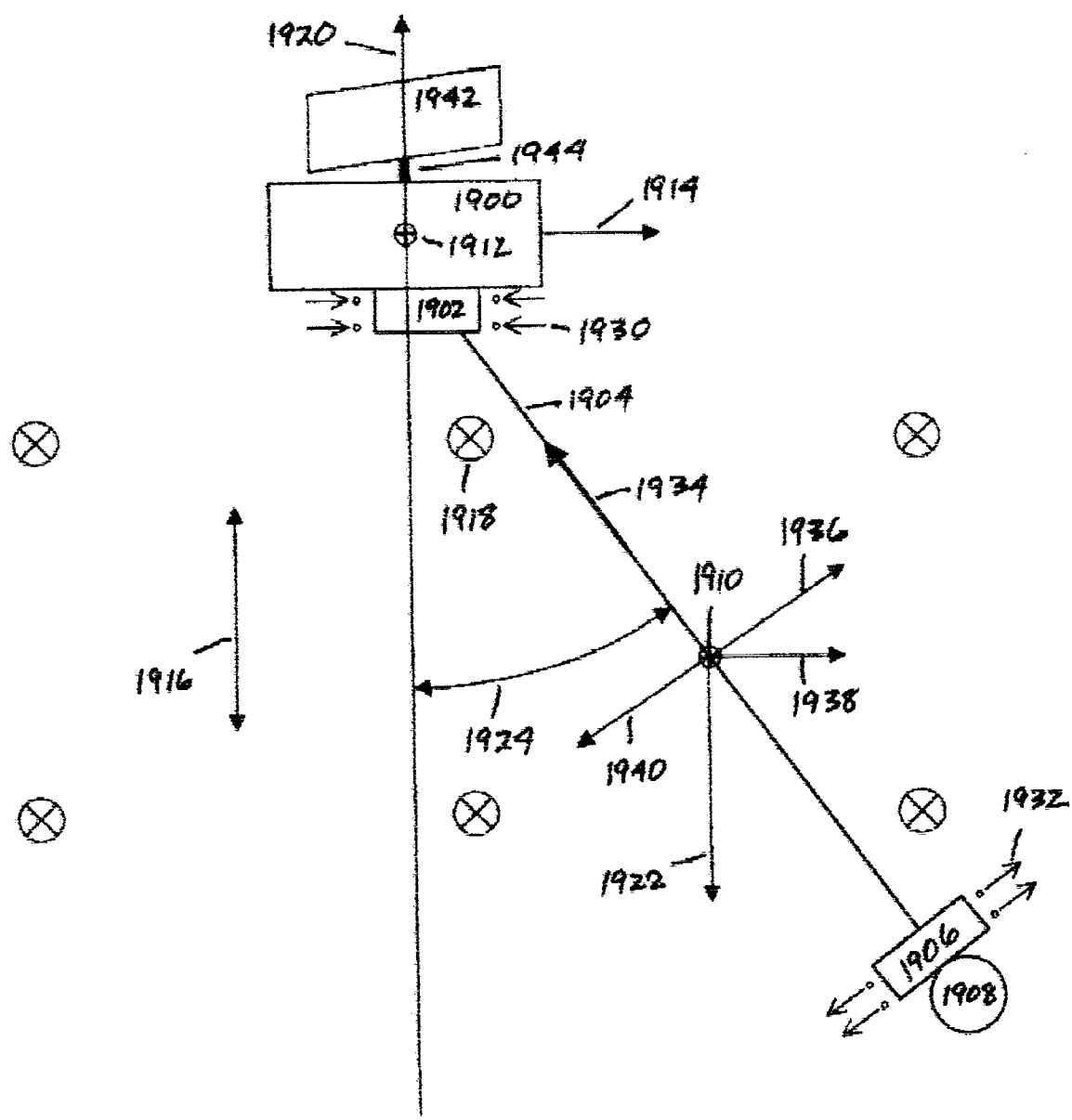
FIG. 19 shows the present invention adapted to provide electrodynamic propulsion using a power supply and a conducting tether

FIG. 19 is similar to FIG. 14 in structure except that a power supply has been added to the spacecraft itself. FIG. 19 is similar to FIG. 14 in method of operation, in that the electrodynamic forces on the tether in FIG. 19 are in the same direction as in FIG. 14. However, it is important to note that the direction of motion of the spacecraft in FIG. 19 is reversed from the direction of spacecraft motion in FIG. 14. The electrodynamic forces from the tether are "pulling" the spacecraft along its direction of motion, thus "accelerating" the spacecraft. This version of the device of the invention is a "propulsion" system for maintaining or increasing the orbit of a spacecraft instead of deorbiting it. The motion of the spacecraft in this direction through the magnetic field would normally cause voltages that would cause the current in the tether to flow in the opposite direction to that shown. However, the power supply used in FIG. 19 is strong enough to generate voltages large enough to not only cancel out the voltage generated by the motion of the spacecraft, but to charge the tether in the opposite direction, thus producing the current and electrodynamic forces shown in FIG. 19, which is in the same direction as in FIG. 14.

FIG. 19 shows a space system consisting of an orbiting spacecraft 1900, a spacecraft tether-current-control-device 1902, a conductive tether 1904 with a near end and a far end, an endmass tether-current-control-device 1906, an endmass 1908, a power supply 1942 and a power supply connector joint 1944. The spacecraft 1900 is connected to the near end of the conductive tether 1904 through the spacecraft tether-current-control-device 1902. The far end of the conductive tether 1904 is attached to the endmass tether-current-control-device 1906 and thence to endmass 1908. The conductive tether 1904, the endmass tether-current-control-device 1906, and the endmass 1908 have a combined center-of-mass, the effective-total-tether-center-of-mass 1910. The spacecraft 1900 is also connected to the power supply 1942 through the power supply connector joint 1944. The structure of the spacecraft 1900 provides both a mechanical and electrical connection to the spacecraft tether-current-control-device 1902.

In FIG. 19, the spacecraft 1900, together with power supply 1942 and power supply connector joint 1944, has a spacecraft center-of-mass 1912, and a velocity and direction defined by a spacecraft state vector 1914 produced by the orbital motion of the spacecraft center-of-mass 1912 about a celestial body (not shown). The celestial body produces in the region of space around the spacecraft and tether a gravity gradient tensor field 1916, a magnetic vector field 1918, and an electrically conductive ionized plasma (not shown). The celestial body also defines the local vertical 1920, defined as the radial direction from the center-of-mass of the celestial body through the spacecraft center-of-mass 1912.

The gravity gradient tensor field 1916 produces a gravity gradient force 1922 on the effective-total-tether-center-of-mass 1910, which tends to orient the system along the local vertical 1920. The conductive tether 1904 is oriented at some tether angle 1924 with respect to the local vertical 1920. The teaching of the invention is how to continuously maintain the tether angle 1924 at or near some optimum value for best system performance.

The power supply 1942 is used to generate a voltage on the tether which is positive at the near end of the tether. If the spacecraft tether-current-control-device 1902 is activated to cause electrons 1930 to be collected from the space plasma by the near end of the conductive tether 1904, while at the same time the endmass tether-current-control-device 1906 is activated to cause electrons 1932 to be emitted into the space plasma, then an electric current vector 1934 will flow in the conductive tether 1904 in the direction toward the spacecraft. The magnitude of the current flow can be controlled by either the endmass tether-current-control-device 1906, the spacecraft tether-current-control-device 1902 or the power supply 1942.

The flow of the electric current 1934 through the conductive tether 1904 in the presence of the magnetic field vector 1918 will induce an electrodynamic force vector 1936 on the tether. The electrodynamic force vector 1936 has a component along the spacecraft state vector 1914, the motion-parallel electrodynamic force vector 1938. The motion-parallel electrodynamic force vector 1938 can either cause an acceleration of the spacecraft state vector 1914, causing the spacecraft to increase its orbital energy, or can compensate for any aerodynamic drag that would normally decrease the spacecraft orbital energy. The component of the electrodynamic force vector 1936 that is not along the spacecraft state vector can be usefully employed to change the inclination of the spacecraft orbit.

The electrodynamic force vector 1936 also causes a torque on the effective-total-tether-center-of-mass 1910 that will cause the tether angle 1924 to increase. The gravity gradient force 1922 on the effective-total-tether-center-of-mass 1910 has a component at right angles to the tether, the gravity gradient torque force 1940, which produces a torque on the effective-total-tether-center-of-mass 1910 that will cause the tether angle 1924 to decrease. The teaching of the invention is how to maximize the motion-parallel electrodynamic force vector 1938, while at the same time not allowing the tether to become unstable, by controlling the tether angle 1924 through controlling the tether current 1934.

Figure 20:
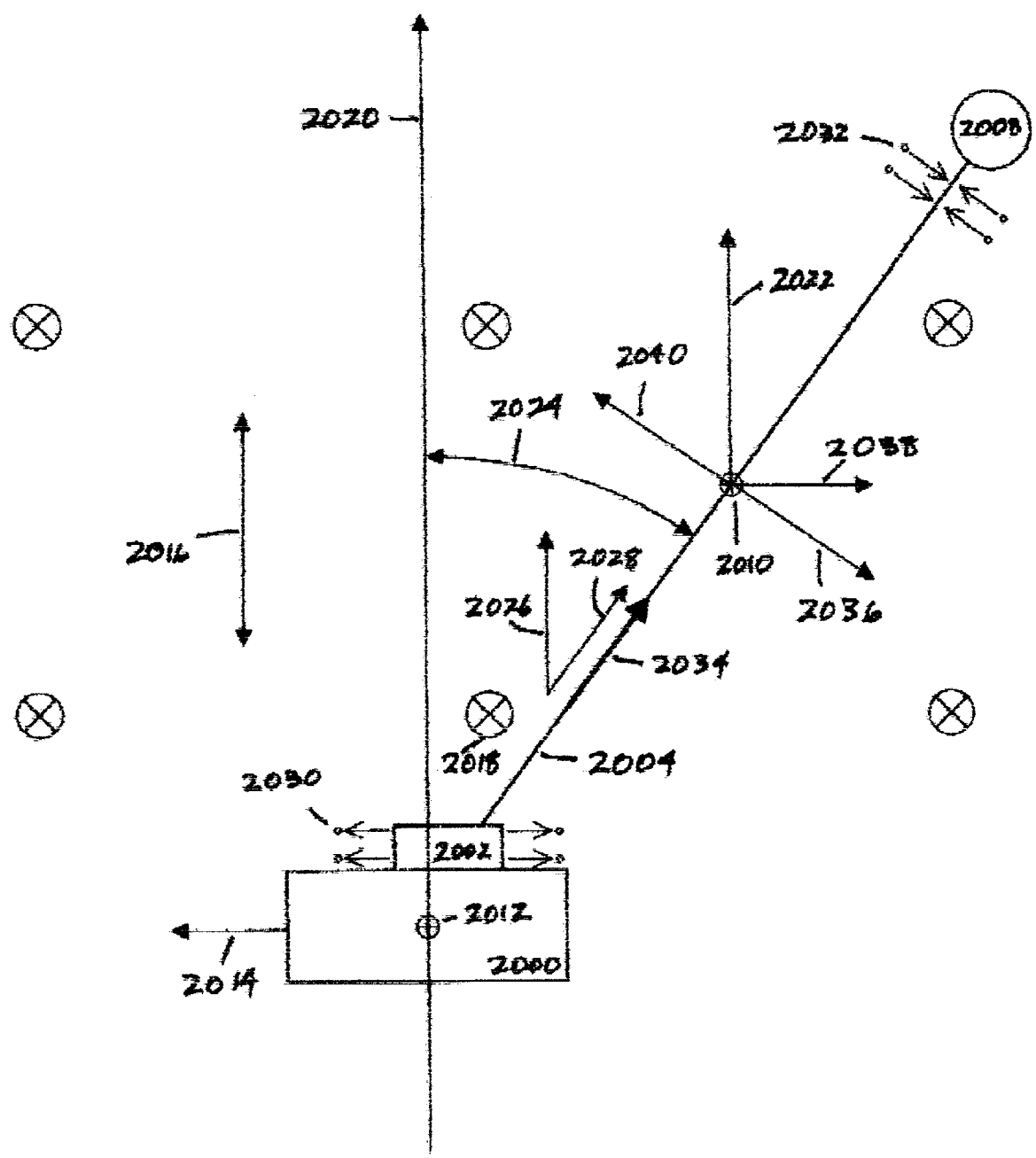
FIG. 20 shows the embodiment of the present invention operating in electrodynamic drag mode with the electron collector at the outer end of the tether being the bare tether structure.

FIG. 20 is similar to FIG. 13, except that the endmass tether current control device is replaced by the bare end of the conductive tether, resulting in a simpler, lower-mass, lower-cost Terminator Tether™ device. This is the system configuration that will be tested by the NASA ProSEDS mission, with the tether upward and the tether current control device on the spacecraft rather than packaged with the deployer, as in FIGS. 15, 16 and 18. The configurations of 15, 16 and 18 are to be preferred as the only interface needed between the Terminator Tether™ and the spacecraft is a single mechanical connection point for the near end of the tether. In the ProSEDS mission there will be no attempt to control the tether angle or the tether oscillations. The method of this invention will show how to control both the tether angle and oscillations.

FIG. 20 shows a space system consisting of an orbiting spacecraft 2000, a spacecraft tether-current-control-device 2002, a conductive tether 2004 with a near end and a far end, without insulation at the far end of the tether, and an endmass 2008. The spacecraft 2000 is connected to the spacecraft tether-current-control-device 2002, which is connected to the near end of the conductive tether 2004. The far end of the conductive tether 2004 is attached to endmass 2008. The conductive tether 2004 and the endmass 2008 have a combined center-of-mass, the effective-total-tether-center-of-mass 2010.

In FIG. 20, the spacecraft 2000 has a center-of-mass 2012, and a velocity and direction defined by a spacecraft state vector 2014 produced by the orbital motion of the spacecraft center-of-mass 2012 about a celestial body (not shown). The celestial body produces in the region of space around the spacecraft and tether a gravity gradient tensor field 2016, a magnetic vector field 2018, and an electrically conductive ionized plasma (not shown). The celestial body also defines the local vertical 2020, defined as the radial direction from the center-of-mass of the celestial body through the spacecraft center-of-mass 2012. The gravity gradient tensor field 2016 produces a gravity gradient force 2022 on the effective-total-tether-center-of-mass 2010, which tends to orient the system along the local vertical 2020. The conductive tether 2004 is oriented at some tether angle 2024 with respect to the local vertical 2020.

As the spacecraft 2000 moves through the magnetic field vector 2018, the relative motion of the spacecraft with respect to the magnetic field vector 2018 produces an electric field vector 2026 in space in the reference frame of the moving spacecraft. The direction of the electric field vector 2026 is at a right angle to both the spacecraft state vector 2014 and the magnetic field vector 2018. The electric field vector 2026 has a component, the tether-parallel electric field vector 2028 that lies along the conductive tether 2004 as shown. The tether-parallel electric field vector 2028 will cause the far end of the tether to become positively charged. The positive charged bare conducting tether will attract electrons 2032 from the space plasma. If at the same time the spacecraft tether-current-control-device 2002 is activated to cause electrons 2030 to be emitted into the space plasma, then an electric current vector 2034 will flow in the conductive tether 2004 in the direction of the tether-parallel electric field vector 2028. The magnitude of the current flow can be controlled by the spacecraft tether-current-control-device 2002.

The flow of the electric current 2034 through the conductive tether 2004 in the presence of the magnetic field vector 2018 will induce an electrodynamic force vector 2036 on the tether. The electrodynamic force vector 2036 has a component along the spacecraft state vector 2014, the motion-parallel electrodynamic force vector 2038. The motion-parallel electrodynamic force vector 2038 opposes the motion of the spacecraft 2000, causing the spacecraft to deorbit faster than normal.

The electrodynamic force vector 2036 also causes a torque on the effective-total-tether-center-of-mass 2010 that will cause the tether angle 2024 to increase. The gravity gradient force 2022 on the effective-total-tether-center-of-mass 2010 has a component at right angles to the tether, the gravity gradient torque force 2040, which produces a torque on the effective-total-tether-center-of-mass 2010 that will cause the tether angle 2024 to decrease. The teaching of the invention is how to maximize the motion-parallel electrodynamic force vector 2038, while at the same time not allowing the tether to become unstable, by controlling the tether angle 2024 through controlling the tether current 2034.

Figure 21:
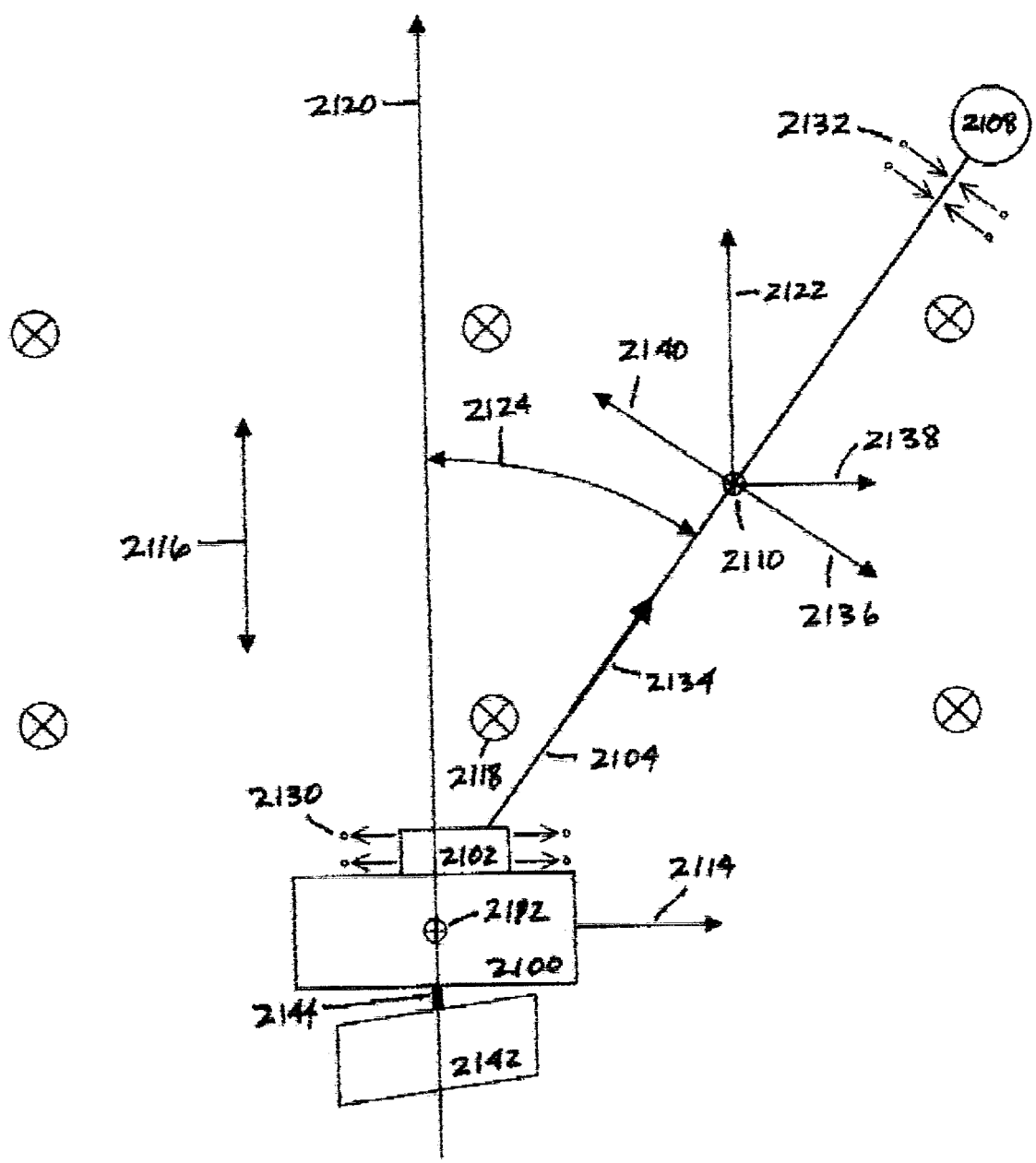
FIG. 21 shows an electrodynamic tether propulsion system similar to FIG. 20, but with a power supply added to the spacecraft that generates a voltage that opposes and overcomes the voltage generated by the electrodynamic interaction of the tether with the Earth's magnetic field.

FIG. 21 is similar to FIG. 19 in method of operation, in that both describe a spacecraft propulsion system instead of a spacecraft deorbit system. FIG. 21 is similar to FIG. 20 in structure and orientation except that a power supply has been added to the spacecraft itself and the direction of motion of the spacecraft in FIG. 21 is reversed from the direction of spacecraft motion in FIG. 19.

FIG. 21 shows a space system consisting of an orbiting spacecraft 2100, a spacecraft tether-current-control-device 2102, a conductive tether 2104 with a near end and a far end, an endmass 2108, a power supply 2142 and a power supply connector joint 2144. The spacecraft 2100 is connected to the near end of the conductive tether 2104 through the spacecraft tether-current-control-device 2102. The far end of the conductive tether 2104 is attached to the endmass 2108. The conductive tether 2104 and the endmass 2108 have a combined center-of-mass, the effective-total-tether-center-of-mass 2110. The spacecraft 2100 is also connected to the power supply 2142 through the power supply connector joint 2144. The structure of the spacecraft 2100 provides both a mechanical and electrical connection of the power supply 2142 to the spacecraft tether-current-control-device 2102.

In FIG. 21, the spacecraft 2100, together with power supply 2142 and power supply connector joint 2144, has a spacecraft center-of-mass 2112, and a velocity and direction defined by a spacecraft state vector 2114 produced by the orbital motion of the spacecraft center-of-mass 2112 about a celestial body (not shown). The celestial body produces in the region of space around the spacecraft and tether a gravity gradient tensor field 2116, a magnetic vector field 2118, and an electrically conductive ionized plasma (not shown). The celestial body also defines the local vertical 2120, defined as the radial direction from the center-of-mass of the celestial body through the spacecraft center-of-mass 2112.

The gravity gradient tensor field 2116 produces a gravity gradient force 2122 on the effective-total-tether-center-of-mass 2110, which tends to orient the system along the local vertical 2120. The conductive tether 2104 is oriented at some tether angle 2124 with respect to the local vertical 2120. The teaching of the invention is how to continuously maintain the tether angle 2124 at or near some optimum value for best system performance.

The power supply 2142 is used to generate a voltage on the tether which is positive at the far end of the tether. The positive voltage at the far end of the conducting tether 2104 will collect electrons 2132 from the space plasma. If the spacecraft tether-current-control-device 2102 is activated to cause electrons 2130 to be emitted into the space plasma, then an electric current vector 2134 will flow in the conductive tether 2104 in the direction away from the spacecraft. The magnitude of the current flow can be controlled by either the spacecraft tether-current-control-device 2102 or the power supply 2142.

The flow of the electric current 2134 through the conductive tether 2104 in the presence of the magnetic field vector 2118 will induce an electrodynamic force vector 2136 on the tether. The electrodynamic force vector 2136 has a component along the spacecraft state vector 2114, the motion-parallel electrodynamic force vector 2138. The motion-parallel electrodynamic force vector 2138 can either produce an acceleration of the spacecraft state vector 2114, causing the spacecraft to increase its orbital energy, or can compensate for any aerodynamic drag that would normally decrease the spacecraft orbital energy. The component of the electrodynamic force vector 2136 that is not along the spacecraft state vector can be usefully employed to change the inclination of the spacecraft orbit.

The electrodynamic force vector 2136 also causes a torque on the effective-total-tether-center-of-mass 2110 that will cause the tether angle 2124 to increase. The gravity gradient force 2122 on the effective-total-tether-center-of-mass 2110 has a component at right angles to the tether, the gravity gradient torque force 2140, which produces a torque on the effective-total-tether-center-of-mass 2110 that will cause the tether angle 2124 to decrease. The teaching of the invention is how to maximize the motion-parallel electrodynamic force vector 2138, while at the same time not allowing the tether to become unstable, by controlling the tether angle 2124 through controlling the tether current 2134.

Figure 22:
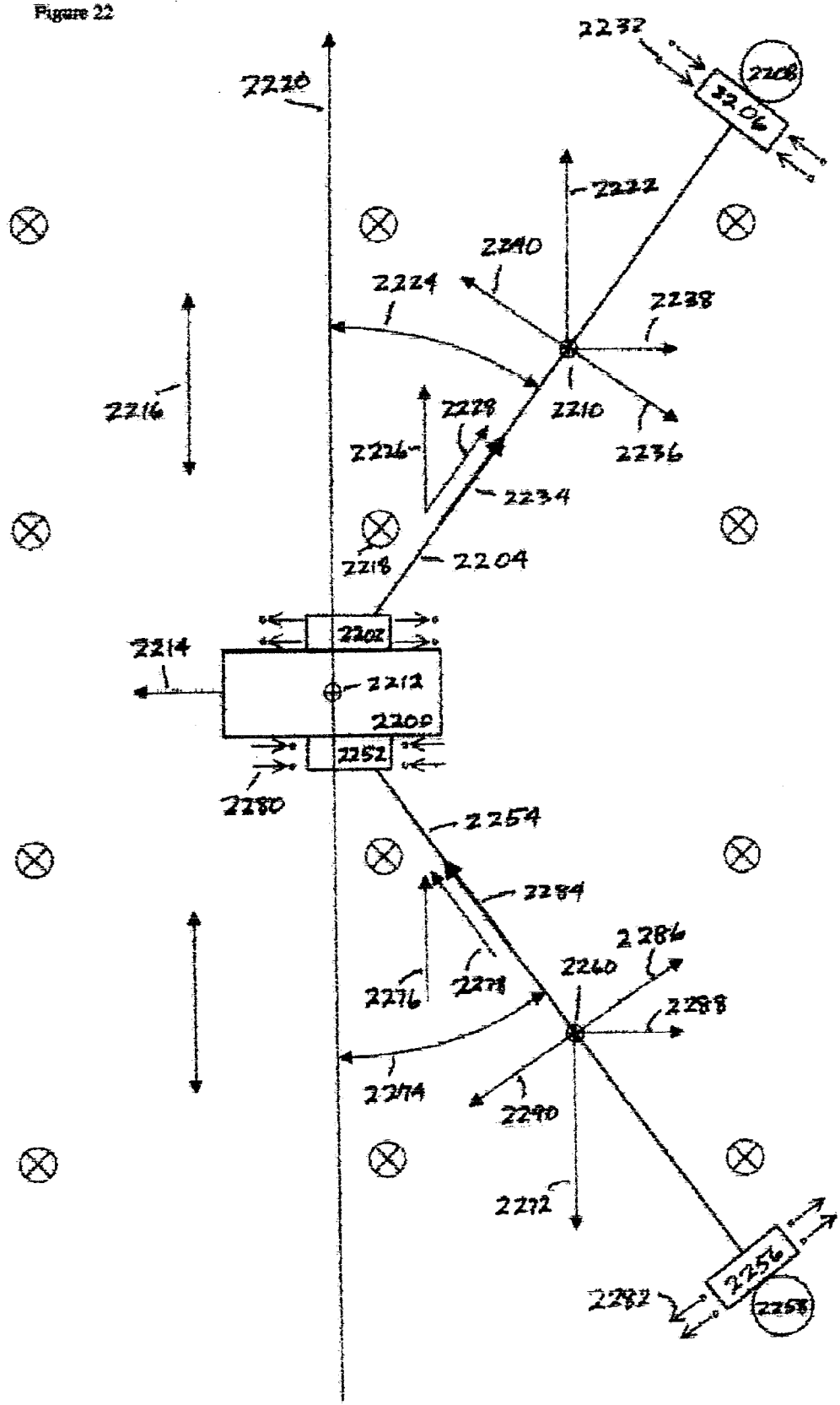
FIG. 22 shows a two-tether electrodynamic drag deorbit system constructed according to the present invention.

FIG. 22 is a simple combination of FIGS. 13 and 14 into a symmetrical structure with a common spacecraft. FIG. 22 shows a space system consisting of an orbiting spacecraft 2200, an upper spacecraft tether-current-control-device 2202, an upper conductive tether 2204 with a near end and a far end, an upper endmass tether-current-control-device 2206, and an upper endmass 2208; plus a lower spacecraft tether-current-control-device 2252, a lower conductive tether 2254 with a near end and a far end, a lower endmass tether-current-control-device 2256, and a lower endmass 2258. The spacecraft 2200 is connected to the near end of the upper conductive tether 2204 through the upper spacecraft tether-current-control-device 2202. The far end of the upper conductive tether 2204 is attached to the upper endmass tether-current-control-device 2206 and thence to upper endmass 2208. The spacecraft 2200 is also connected to the near end of the lower conductive tether 2254 through the lower spacecraft tether-current-control-device 2252. The far end of the lower conductive tether 2254 is attached to the lower endmass tether-current-control-device 2256 and thence to lower endmass 2258.

The upper conductive tether 2204, the upper endmass tether-current-control-device 2206, and the upper endmass 2208 have a combined center-of-mass, the upper effective-total-tether-center-of-mass 2210. The lower conductive tether 2254, the lower endmass tether-current-control-device 2256, and the lower endmass 2258 have a combined center-of-mass, the lower effective-total-tether-center-of-mass 2260. The spacecraft 2200 plus the upper spacecraft tether-current-control-device 2202 and the lower spacecraft tether-current-control-device 2252 have a center-of-mass 2212, and a velocity and direction defined by a spacecraft state vector 2214 produced by the orbital motion of the spacecraft center-of-mass 2212 about a celestial body (not shown). The celestial body produces in the region of space around the spacecraft and tether a gravity gradient tensor field 2216 (shown 2 times), a magnetic vector field 2218 (shown 12 times), and an electrically conductive ionized plasma (not shown). The celestial body also defines the local vertical 2220, defined as the radial direction from the center-of-mass of the celestial body through the spacecraft center-of-mass 2212. The magnetic vector field 2218 of a typical celestial body is typically oriented along the local vertical near the magnetic poles of the celestial body and at right angles to the local vertical near the magnetic equator of the celestial body. In FIG. 22 the magnetic vector field 2218 is shown going into the page, and oriented at right angles to both the local vertical 2220 and the state vector 2214 of the spacecraft 2200, since it is this component of the total magnetic vector field that produces the desired electrodynamic forces on the total space system.

The gravity gradient tensor field 2216 produces an upper gravity gradient force 2222 on the upper effective-total-tether-center-of-mass 2210, which tends to orient the upper tether along the zenith direction of the local vertical 2220. The upper conductive tether 2204 is oriented at some upper tether angle 2224 with respect to the local vertical 2220. The teaching of the invention is how to continuously maintain the upper tether angle 2224 at or near some optimum value for best system performance. The gravity gradient tensor field 2216 also produces a lower gravity gradient force 2272 on the lower effective-total-tether-center-of-mass 2260, which tends to orient the lower tether along the nadir direction of the local vertical 2220. The lower conductive tether 2254 is oriented at some lower tether angle 2274 with respect to the local vertical 2220. The teaching of the invention is how to continuously maintain the lower tether angle 2274 at or near some optimum value for best system performance.

As the spacecraft 2200 moves through the magnetic field vector 2218, the relative motion of the spacecraft with respect to the magnetic field vector 2218 produces an electric field vector 2226 in space in the reference frame of the moving spacecraft. The direction of the electric field vector 2226 is at a right angle to both the spacecraft state vector 2214 and the magnetic field vector 2218. The electric field vector 2226 has a component, the upper tether-parallel electric field vector 2228 that lies along the upper conductive tether 2204 as shown. If the upper spacecraft tether-current-control-device 2202 is activated to cause electrons 2230 to be emitted from the near end of the upper conductive tether 2204 into the space plasma of the celestial body, while at the same time the upper endmass tether-current-control-device 2206 is activated to cause electrons 2232 to be collected from the space plasma of the celestial body, then an upper electric current vector 2234 will flow in the upper conductive tether 2204 in the direction of the upper tether-parallel electric field vector 2228. The magnitude of the current flow can be controlled by either the upper endmass tether-current-control-device 2206 or the upper spacecraft tether-current-control-device 2202.

The flow of the upper electric current 2234 through the conductive tether 2204 in the presence of the magnetic field vector 2218 will induce an upper electrodynamic force vector 2236 on the upper tether. The upper electrodynamic force vector 2236 has a component along the spacecraft state vector 2214, the upper motion-parallel electrodynamic force vector 2238. The upper motion-parallel electrodynamic force vector 2238 opposes the motion of the spacecraft, causing the spacecraft to deorbit faster than normal.

The upper electrodynamic force vector 2236 also causes a torque on the upper effective-total-tether-center-of-mass 2210 that will cause the upper tether angle 2224 to increase. The upper gravity gradient force 2222 on the upper effective-total-tether-center-of-mass 2210 has a component at right angles to the tether, the upper gravity gradient torque force 2240, which produces a torque on the upper effective-total-tether-center-of-mass 2210 that will cause the upper tether angle 2224 to decrease. The teaching of the invention is how to maximize the upper motion-parallel electrodynamic force vector 2238 and thus the deorbit drag on the total system, while at the same time not allowing the tether to become unstable, by controlling the upper tether angle 2224 through controlling the upper tether current 2234.

As the spacecraft 2200 moves through the magnetic field vector 2218, the relative motion of the spacecraft with respect to the magnetic field vector 2218 also produces a lower electric field vector 2276 in space in the reference frame of the moving spacecraft. The direction of the lower electric field vector 2276 is at a right angle to both the spacecraft state vector 2214 and the magnetic field vector 2218. The lower electric field vector 2276 has a component, the lower tether-parallel electric field vector 2278 that lies along the lower conductive tether 2254 as shown. If the lower spacecraft tether-current-control-device 2252 is activated to cause electrons 2280 to be collected from the space plasma by the near end of the lower conductive tether 2254, while at the same time the lower endmass tether-current-control-device 2256 is activated to cause electrons 2282 to be emitted into the space plasma, then a lower electric current vector 2284 will flow in the lower conductive tether 2254 in the direction of the lower tether-parallel electric field vector 2278. The magnitude of the lower tether current flow can be controlled by either the lower endmass tether-current-control-device 2256 or the lower spacecraft tether-current-control-device 2252.

The flow of the lower electric current 2284 through the lower conductive tether 2254 in the presence of the magnetic field vector 2268 will induce a lower electrodynamic force vector 2286 on the tether. The lower electrodynamic force vector 2286 has a component along the spacecraft state vector 2214, the lower motion-parallel electrodynamic force vector 2288. The lower motion-parallel electrodynamic force vector 2288 opposes the motion of the spacecraft 2200, causing the spacecraft to deorbit faster than normal.

The lower electrodynamic force vector 2286 also causes a torque on the lower effective-total-tether-center-of-mass 2260 that will cause the lower tether angle 2274 to increase. The lower gravity gradient force 2272 on the lower effective-total-tether-center-of-mass 2260 has a component at right angles to the tether, the lower gravity gradient torque force 2290, which produces a torque on the lower effective-total-tether-center-of-mass 2260 that will cause the lower tether angle 2274 to decrease. The teaching of the invention is how to maximize the lower motion-parallel electrodynamic force vector 2288, while at the same time not allowing the lower tether to become unstable, by controlling the lower tether angle 2274 through controlling the lower tether current 2284.

Figure 23:
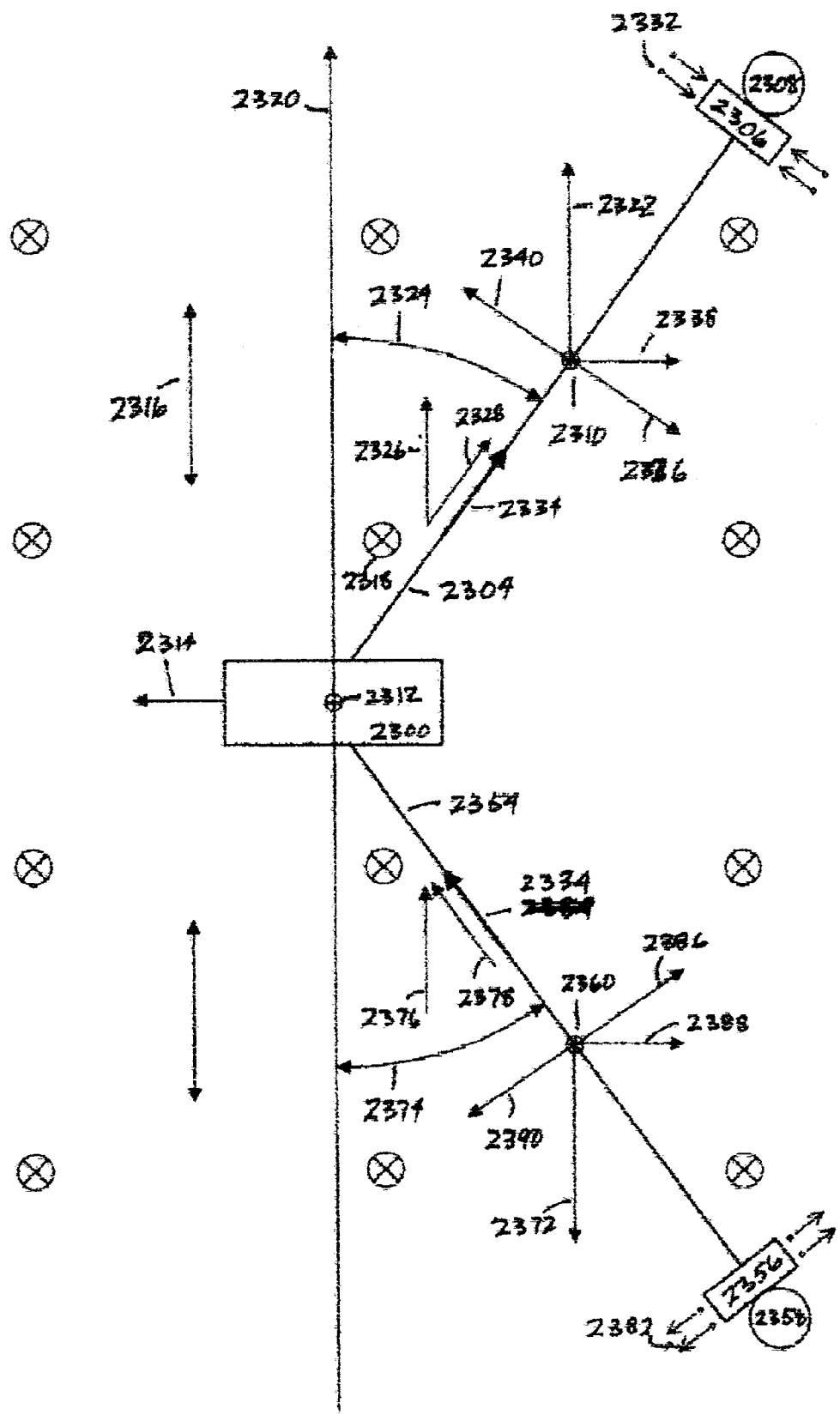
FIG. 23 shows an alternate "bent" embodiment of a tether electrodynamic drag deorbit system.

FIG. 23 is similar to FIG. 22, except that the upper and lower spacecraft tether-current-control-devices have been eliminated and the same electrical current runs through both tethers.

FIG. 23 shows a space system consisting of an orbiting spacecraft 2300, an upper conductive tether 2304 with a near end and a far end, an upper endmass tether-current-control-device 2306, and an upper endmass 2308; plus a lower conductive tether 2354 with a near end and a far end, a lower endmass tether-current-control-device 2356, and a lower endmass 2358. The spacecraft 2300 is connected to the near end of the upper conductive tether 2304. The far end of the upper conductive tether 2304 is attached to the upper endmass tether-current-control-device 2306 and thence to upper endmass 2308. The spacecraft 2300 is also connected to the near end of the lower conductive tether 2354. The far end of the lower conductive tether 2354 is attached to the lower endmass tether-current-control-device 2356 and thence to lower endmass 2358. The spacecraft 2300 provides both a mechanical and an electrical connection between the upper conducting tether 2304 and the lower conducting tether 2354.

The upper conductive tether 2304, the upper endmass tether-current-control-device 2306, and the upper endmass 2308 have a combined center-of-mass, the upper effective-total-tether-center-of-mass 2310. The lower conductive tether 2354, the lower endmass tether-current-control-device 2356, and the lower endmass 2358 have a combined center-of-mass, the lower effective-total-tether-center-of-mass 2360. The spacecraft 2300 has a center-of-mass 2312, and a velocity and direction defined by a spacecraft state vector 2314 produced by the orbital motion of the spacecraft center-of-mass 2312 about a celestial body (not shown). The celestial body produces in the region of space around the spacecraft and tether a gravity gradient tensor field 2316, a magnetic vector field 2318, and an electrically conductive ionized plasma (not shown). The celestial body also defines the local vertical 2320, defined as the radial direction from the center-of-mass of the celestial body through the spacecraft center-of-mass 2312. In FIG. 23 the magnetic vector field 2318 is shown going into the page, and oriented at right angles to both the local vertical 2320 and the state vector 2314 of the spacecraft 2300, since it is this component of the total magnetic vector field that produces the desired electrodynamic forces on the total space system.

The gravity gradient tensor field 2316 produces an upper gravity gradient force 2322 on the upper effective-total-tether-center-of-mass 2310, which tends to orient the upper tether along the zenith direction of the local vertical 2320. The upper conductive tether 2304 is oriented at some upper tether angle 2324 with respect to the local vertical 2320. The teaching of the invention is how to continuously maintain the upper tether angle 2324 at or near some optimum value for best system performance. The gravity gradient tensor field 2316 also produces a lower gravity gradient force 2372 on the lower effective-total-tether-center-of-mass 2360, which tends to orient the lower tether along the nadir direction of the local vertical 2320. The lower conductive tether 2354 is oriented at some lower tether angle 2374 with respect to the local vertical 2320. The teaching of the invention is how to continuously maintain the lower tether angle 2374 at or near some optimum value for best system performance.

As the spacecraft 2300 moves through the magnetic field vector 2318, the relative motion of the spacecraft with respect to the magnetic field vector 2318 produces an electric field vector 2326 in space in the reference frame of the moving spacecraft. The direction of the electric field vector 2326 is at a right angle to both the spacecraft state vector 2314 and the magnetic field vector 2318. The electric field vector 2326 has a component, the upper tether-parallel electric field vector 2328 that lies along the upper conductive tether 2304 as shown. At the same time, the relative motion of the spacecraft with respect to the magnetic field vector 2318 also produces a lower electric field vector 2376 in space in the reference frame of the moving spacecraft. The lower electric field vector 2376 will be similar to, but usually slightly different than the upper electric field vector 2326. The direction of the lower electric field vector 2376 is at a right angle to both the spacecraft state vector 2314 and the magnetic field vector 2318. The lower electric field vector 2376 has a component, the lower tether-parallel electric field vector 2378 that lies along the lower conductive tether 2354 as shown. The upper and lower tether-parallel electric field vectors combine to produce a single electrical potential difference between the far end of the lower conductive tether 2354 and the far end of the upper conductive tether 2304.

If the upper endmass tether-current-control-device 2306 is activated to cause electrons 2332 to be collected from the space plasma of the celestial body, while at the same time the lower endmass tether-current-control-device 2356 is activated to cause electrons 2382 to be emitted into the space plasma, then an electric current vector 2334 will flow in both conductive tethers in the direction indicated. The magnitude of the tether current flow 2334 can be controlled by either the lower endmass tether-current-control-device 2356 or the upper endmass tether-current-control-device 2306.

The flow of the electric current 2334 through the conductive tethers 2304 and 2354 in the presence of the magnetic field vector 2318 will induce the electrodynamic force vectors 2336 and 2386 on the two tethers. The electrodynamic force vectors 2336 and 2386 have components along the spacecraft state vector 2314, the motion-parallel electrodynamic force vectors 2338 and 2388, which oppose the motion of the spacecraft 2300, causing the spacecraft to deorbit faster than normal.

The upper electrodynamic force vector 2336 produces a torque on the upper effective-total-tether-center-of-mass 2310 that will cause the upper tether angle 2324 to increase. The upper gravity gradient force 2322 on the upper effective-total-tether-center-of-mass 2310 has a component at right angles to the tether, the upper gravity gradient torque force 2340, which produces a torque on the upper effective-total-tether-center-of-mass 2310 that will cause the upper tether angle 2324 to decrease. The lower electrodynamic force vector 2386 produces a torque on the lower effective-total-tether-center-of-mass 2360 that will cause the lower tether angle 2374 to increase. The lower gravity gradient force 2372 on the lower effective-total-tether-center-of-mass 2360 has a component at right angles to the tether, the lower gravity gradient torque force 2390, which produces a torque on the lower effective-total-tether-center-of-mass 2360 that will cause the lower tether angle 2374 to decrease. The teaching of the invention is how to maximize the sum of the motion-parallel electrodynamic force vectors 2338 and 2388, while at the same time not allowing the either tether to become unstable, by controlling the tether angles 2324 and 2374 through controlling the tether current 2334.

Figure 24:
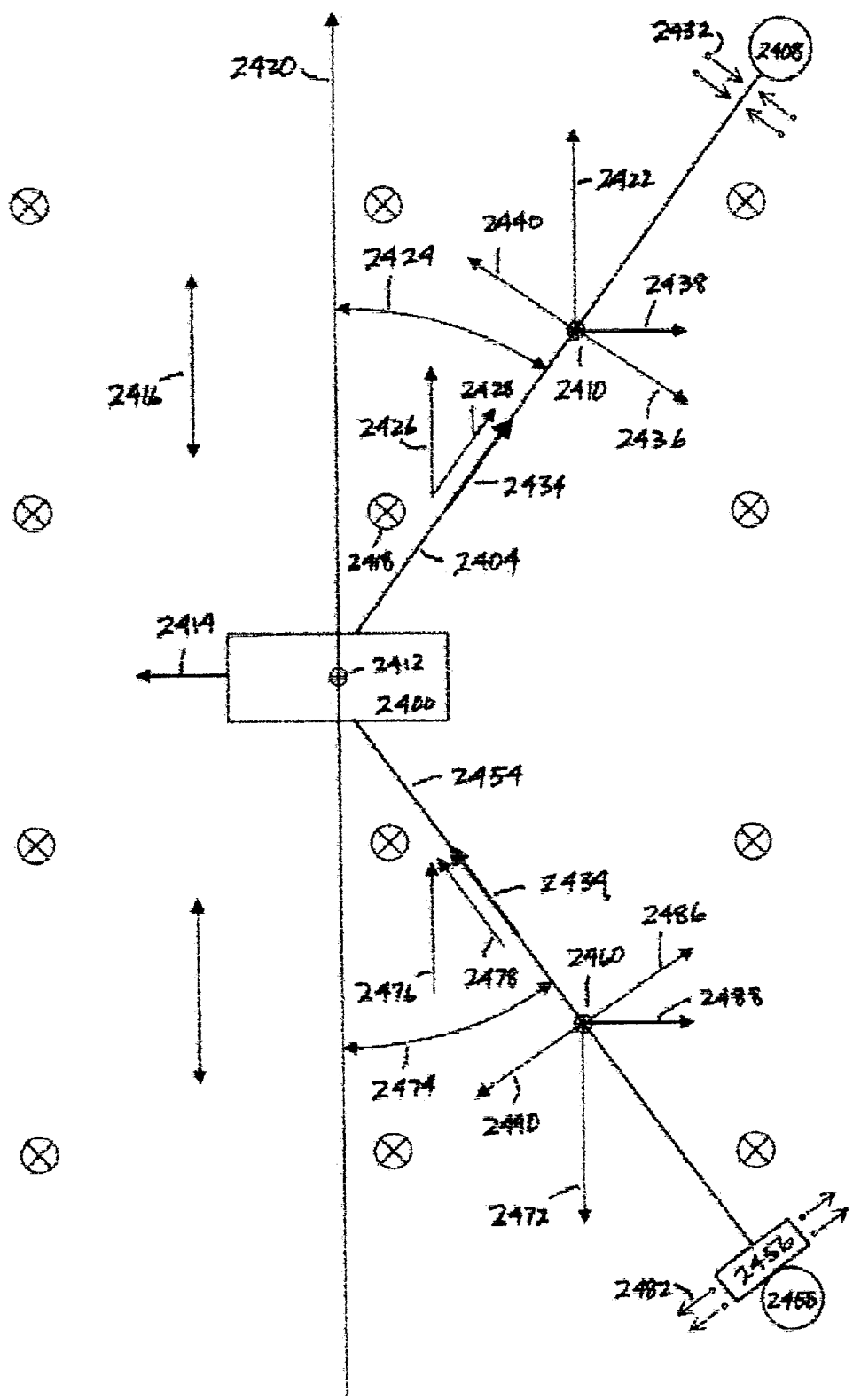
FIG. 24 show a system similar to that shown in FIG. 23 except the electron collector at the far upper end of the bent tether is the bare wire of the tether itself.

FIG. 24 is similar to FIG. 23 except that the upper endmass tether-current-control-device for collecting electrons has been replaced by the bare wire of an uninsulated portion of the upper tether. The current will not be constant in the upper tether, but will decrease in magnitude toward the far bare end of the upper tether.

FIG. 24 shows a space system consisting of an orbiting spacecraft 2400, an upper conductive tether 2404 with a near end and a far end, the far end of which is uninsulated, and an upper endmass 2408; plus a lower conductive tether 2454 with a near end and a far end, a lower endmass tether-current-control-device 2456, and a lower endmass 2458. The spacecraft 2400 is connected to the near end of the upper conductive tether 2404. The far end of the upper conductive tether 2404 is attached to the upper endmass 2408. The spacecraft 2400 is also connected to the near end of the lower conductive tether 2454. The far end of the lower conductive tether 2454 is attached to the lower endmass tether-current-control-device 2456 and thence to lower endmass 2458. The spacecraft 2400 provides both a mechanical and an electrical connection between the upper conducting tether 2404 and the lower conducting tether 2454.

The upper conductive tether 2404 and the upper endmass 2408 have a combined center-of-mass, the upper effective-total-tether-center-of-mass 2410. The lower conductive tether 2454, the lower endmass tether-current-control-device 2456, and the lower endmass 2458 have a combined center-of-mass, the lower effective-total-tether-center-of-mass 2460. The spacecraft 2400 has a center-of-mass 2412, and a velocity and direction defined by a spacecraft state vector 2414 produced by the orbital motion of the spacecraft center-of-mass 2412 about a celestial body (not shown). The celestial body produces in the region of space around the spacecraft and tether a gravity gradient tensor field 2416, a magnetic vector field 2418, and an electrically conductive ionized plasma (not shown). The celestial body also defines the local vertical 2420, defined as the radial direction from the center-of-mass of the celestial body through the spacecraft center-of-mass 2412. In FIG. 24 the magnetic vector field 2418 is shown going into the page, and oriented at right angles to both the local vertical 2420 and the state vector 2414 of the spacecraft 2400, since it is this component of the total magnetic vector field that produces the desired electrodynamic forces on the total space system.

The gravity gradient tensor field 2416 produces an upper gravity gradient force 2422 on the upper effective-total-tether-center-of-mass 2410, which tends to orient the upper tether along the zenith direction of the local vertical 2420. The upper conductive tether 2404 is oriented at some upper tether angle 2424 with respect to the local vertical 2420. The teaching of the invention is how to continuously maintain the upper tether angle 2424 at or near some optimum value for best system performance. The gravity gradient tensor field 2416 also produces a lower gravity gradient force 2472 on the lower effective-total-tether-center-of-mass 2460, which tends to orient the lower tether along the nadir direction of the local vertical 2420. The lower conductive tether 2454 is oriented at some lower tether angle 2474 with respect to the local vertical 2420. The teaching of the invention is how to continuously maintain the lower tether angle 2474 at or near some optimum value for best system performance.

As the spacecraft 2400 moves through the magnetic field vector 2418, the relative motion of the spacecraft with respect to the magnetic field vector 2418 produces an electric field vector 2426 in space in the reference frame of the moving spacecraft. The direction of the electric field vector 2426 is at a right angle to both the spacecraft state vector 2414 and the magnetic field vector 2418. The electric field vector 2426 has a component, the upper tether-parallel electric field vector 2428 that lies along the upper conductive tether 2404 as shown. At the same time, the relative motion of the spacecraft with respect to the magnetic field vector 2418 also produces a lower electric field vector 2476 in space in the reference frame of the moving spacecraft. The lower electric field vector 2476 will be similar to, but usually slightly different than the upper electric field vector 2426. The direction of the lower electric field vector 2476 is at a right angle to both the spacecraft state vector 2414 and the magnetic field vector 2418. The lower electric field vector 2476 has a component, the lower tether-parallel electric field vector 2478 that lies along the lower conductive tether 2454 as shown. The upper and lower tether-parallel electric field vectors combine to produce a single electrical potential difference between the far end of the lower conductive tether 2454 and the far end of the upper conductive tether 2404, with the far end of the upper conductive tether 2404 being positive in electric potential. A positive electric potential on the bare wire of the far end of the upper conductive tether will extract electrons 2432 from the space plasma. If, at the same time, the lower endmass tether-current-control-device 2456 is activated to cause electrons 2482 to be emitted into the space plasma, then an electric current vector 2434 will flow in both conductive tethers in the direction indicated. The magnitude of the tether current flow 2434 can be controlled by the lower endmass tether-current-control-device.

The flow of the electric current 2434 through the conductive tethers 2404 and 2454 in the presence of the magnetic field vector 2418 will induce the electrodynamic force vector 2436 and 2486 on the two tethers. The electrodynamic force vectors 2436 and 2486 have components along the spacecraft state vector 2414, the motion-parallel electrodynamic force vectors 2438 and 2488, which oppose the motion of the spacecraft 2400, causing the spacecraft to deorbit faster than normal.

The upper electrodynamic force vector 2436 produces a torque on the upper effective-total-tether-center-of-mass 2410 that will cause the upper tether angle 2424 to increase. The upper gravity gradient force 2422 on the upper effective-total-tether-center-of-mass 2410 has a component at right angles to the tether, the upper gravity gradient torque force 2440, which produces a torque on the upper effective-total-tether-center-of-mass 2410 that will cause the upper tether angle 2424 to decrease. The lower electrodynamic force vector 2486 produces a torque on the lower effective-total-tether-center-of-mass 2460 that will cause the lower tether angle 2474 to increase. The lower gravity gradient force 2472 on the lower effective-total-tether-center-of-mass 2460 has a component at right angles to the tether, the lower gravity gradient torque force 2490, which produces a torque on the lower effective-total-tether-center-of-mass 2460 that will cause the lower tether angle 2474 to decrease. The teaching of the invention is how to maximize the sum of the motion-parallel electrodynamic force vectors 2438 and 2488, while at the same time not allowing the either tether to become unstable, by controlling the tether angles 2424 and 2474 through controlling the tether current 2434.

Figure 25:
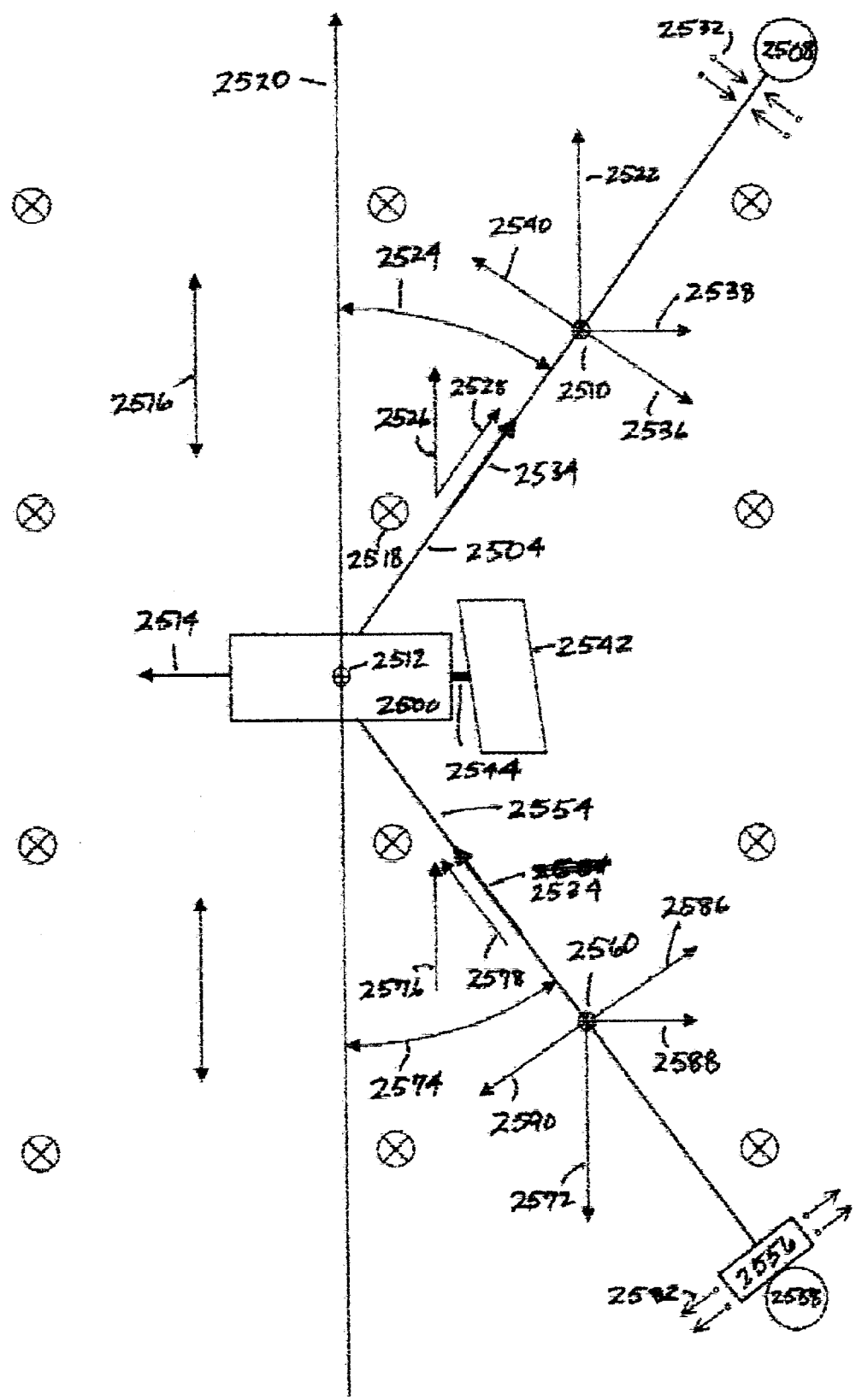
FIG. 25 shows a system similar to that shown in FIG. 24 except that a power supply has been added to the spacecraft to augment the motionally induced current in order to optimize the drag force.

FIG. 25 is similar to FIG. 24, except that an electrical power supply has been added to the spacecraft to augment the voltage and current that can be generated by the motion of the spacecraft through the magnetic field of the Earth. The power supply can be put anywhere along the tether.

FIG. 25 shows a space system consisting of an orbiting spacecraft 2500, an upper conductive tether 2504 with a near end and a far end, the far end of which is uninsulated, and an upper endmass 2508; plus a lower conductive tether 2554 with a near end and a far end, a lower endmass tether-current-control-device 2556, and a lower endmass 2558; plus a power supply 2542 and a power supply connecting joint 2544. The spacecraft 2500 is connected to the near end of the upper conductive tether 2504. The far end of the upper conductive tether 2504 is attached to the upper endmass 2508. The spacecraft 2500 is also connected to the near end of the lower conductive tether 2554. The far end of the lower conductive tether 2554 is attached to the lower endmass tether-current-control-device 2556 and thence to lower endmass 2558. The spacecraft 2500 is also connected both mechanically and electrically to the power supply 2542 by the power supply connecting joint 2544. The spacecraft 2500 provides both a mechanical and an electrical connection between the upper conducting tether 2504 and the lower conducting tether 2554 and the power supply 2542.

The upper conductive tether 2504 and the upper endmass 2508 have a combined center-of-mass, the upper effective-total-tether-center-of-mass 2510. The lower conductive tether 2554, the lower endmass tether-current-control-device 2556, and the lower endmass 2558 have a combined center-of-mass, the lower effective-total-tether-center-of-mass 2560. The spacecraft 2500, plus the power supply 2542 and the power supply connecting joint 2544 have a center-of-mass 2512, and a velocity and direction defined by a spacecraft state vector 2514 produced by the orbital motion of the spacecraft center-of-mass 2512 about a celestial body (not shown). The celestial body produces in the region of space around the spacecraft and tether a gravity gradient tensor field 2516, a magnetic vector field 2518, and an electrically conductive ionized plasma (not shown). The celestial body also defines the local vertical 2520, defined as the radial direction from the center-of-mass of the celestial body through the spacecraft center-of-mass 2512. In FIG. 25 the magnetic vector field 2518 is shown going into the page, and oriented at right angles to both the local vertical 2520 and the state vector 2514 of the spacecraft 2500, since it is this component of the total magnetic vector field that produces the desired electrodynamic forces on the total space system.

The gravity gradient tensor field 2516 produces an upper gravity gradient force 2522 on the upper effective-total-tether-center-of-mass 2510, which tends to orient the upper tether along the zenith direction of the local vertical 2520. The upper conductive tether 2504 is oriented at some upper tether angle 2524 with respect to the local vertical 2520. The teaching of the invention is how to continuously maintain the upper tether angle 2524 at or near some optimum value for best system performance. The gravity gradient tensor field 2516 also produces a lower gravity gradient force 2572 on the lower effective-total-tether-center-of-mass 2560, which tends to orient the lower tether along the nadir direction of the local vertical 2520. The lower conductive tether 2554 is oriented at some lower tether angle 2574 with respect to the local vertical 2520. The teaching of the invention is how to continuously maintain the lower tether angle 2574 at or near some optimum value for best system performance.

As the spacecraft 2500 moves through the magnetic field vector 2518, the relative motion of the spacecraft with respect to the magnetic field vector 2518 produces an electric field vector 2526 in space in the reference frame of the moving spacecraft. The direction of the electric field vector 2526 is at a right angle to both the spacecraft state vector 2514 and the magnetic field vector 2518. The electric field vector 2526 has a component, the upper tether-parallel electric field vector 2528 that lies along the upper conductive tether 2504 as shown. At the same time, the relative motion of the spacecraft with respect to the magnetic field vector 2518 also produces a lower electric field vector 2576 in space in the reference frame of the moving spacecraft. The lower electric field vector 2576 will be similar to, but usually slightly different than the upper electric field vector 2526. The direction of the lower electric field vector 2576 is at a right angle to both the spacecraft state vector 2514 and the magnetic field vector 2518. The lower electric field vector 2576 has a component, the lower tether-parallel electric field vector 2578 that lies along the lower conductive tether 2554 as shown. The upper and lower tether-parallel electric field vectors 2528 and 2578, plus the power supply 2542, combine to produce a single electrical potential difference between the far end of the lower conductive tether 2554 and the far end of the upper conductive tether 2504, with the far end of the upper conductive tether 2504 being positive in electric potential. A positive electric potential on the bare wire of the far end of the upper conductive tether will extract electrons 2532 from the space plasma. If, at the same time, the lower endmass tether-current-control-device 2556 is activated to cause electrons 2582 to be emitted into the space plasma, then an electric current vector 2534 will flow in both conductive tethers in the direction indicated. The magnitude of the tether current flow 2534 can be controlled by either or both the lower endmass tether-current-control-device 2556 and the power supply 2542.

The flow of the electric current 2534 through the conductive tethers 2504 and 2554 in the presence of the magnetic field vector 2518 will induce the electrodynamic force vector 2536 and 2586 on the two tethers. The electrodynamic force vectors 2536 and 2586 have components along the spacecraft state vector 2514, the motion-parallel electrodynamic force vectors 2538 and 2588, which oppose the motion of the spacecraft 2500, causing the spacecraft to deorbit faster than normal.

The upper electrodynamic force vector 2536 produces a torque on the upper effective-total-tether-center-of-mass 2510 that will cause the upper tether angle 2524 to increase. The upper gravity gradient force 2522 on the upper effective-total-tether-center-of-mass 2510 has a component at right angles to the tether, the upper gravity gradient torque force 2540, which produces a torque on the upper effective-total-tether-center-of-mass 2510 that will cause the upper tether angle 2524 to decrease. The lower electrodynamic force vector 2586 produces a torque on the lower effective-total-tether-center-of-mass 2560 that will cause the lower tether angle 2574 to increase. The lower gravity gradient force 2572 on the lower effective-total-tether-center-of-mass 2560 has a component at right angles to the tether, the lower gravity gradient torque force 2590, which produces a torque on the lower effective-total-tether-center-of-mass 2560 that will cause the lower tether angle 2574 to decrease. The teaching of the invention is how to maximize the sum of the motion-parallel electrodynamic force vectors 2538 and 2588, while at the same time not allowing the either tether to become unstable, by controlling the tether angles 2524 and 2574 through controlling the tether current 2534.

Figure 26:
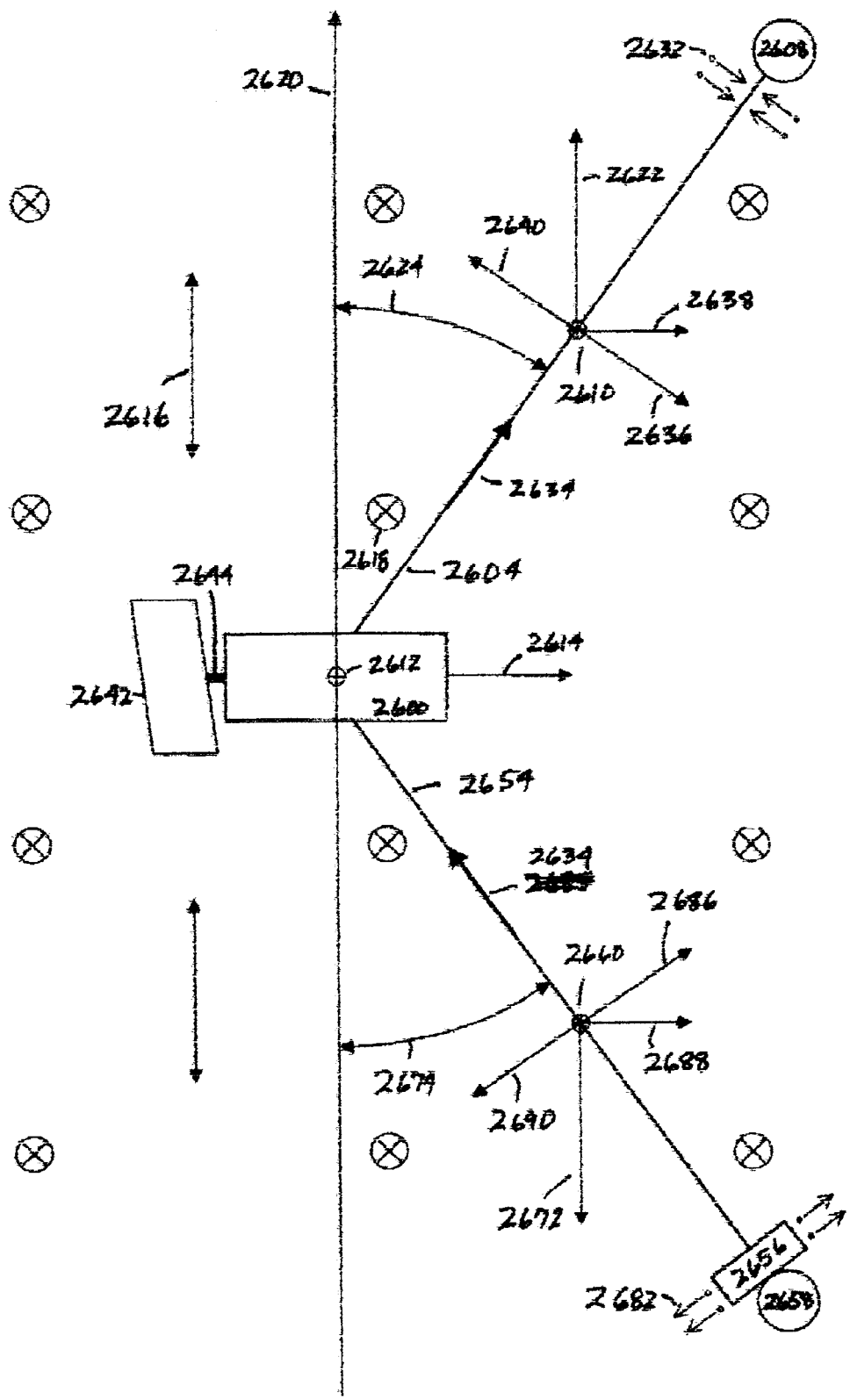
FIG. 26 shows a two tether electrodynamic Propulsion System with solar power array and a bare wire electron collector.

FIG. 26 is similar in structure to FIG. 25 except that the motion of the spacecraft is now in the opposite direction. The power supply is now of opposite polarity, so that it can drive current through the two tethers in the opposite direction to the induced electric potential due to the motion of the spacecraft, thus producing propulsive thrust force instead of deorbit drag force.

FIG. 26 shows a space system consisting of an orbiting spacecraft 2600, an upper conductive tether 2604 with a near end and a far end, the far end of which is uninsulated, and an upper endmass 2608; plus a lower conductive tether 2654 with a near end and a far end, a lower endmass tether-current-control-device 2656, and a lower endmass 2658; plus a power supply 2642 and a power supply connecting joint 2644. The spacecraft 2600 is connected to the near end of the upper conductive tether 2604. The far end of the upper conductive tether 2604 is attached to the upper endmass 2608. The spacecraft 2600 is also connected to the near end of the lower conductive tether 2654. The far end of the lower conductive tether 2654 is attached to the lower endmass tether-current-control-device 2656 and thence to lower endmass 2658. The spacecraft 2600 is also connected both mechanically and electrically to the power supply 2642 by the power supply connecting joint 2644. The spacecraft 2600 provides both a mechanical and an electrical connection between the upper conducting tether 2604 and the lower conducting tether 2654 and the power supply 2642.

The upper conductive tether 2604 and the upper endmass 2608 have a combined center-of-mass, the upper effective-total-tether-center-of-mass 2610. The lower conductive tether 2654, the lower endmass tether-current-control-device 2656, and the lower endmass 2658 have a combined center-of-mass, the lower effective-total-tether-center-of-mass 2660. The spacecraft 2600, plus the power supply 2642 and the power supply connecting joint 2644 have a center-of-mass 2612, and a velocity and direction defined by a spacecraft state vector 2614 produced by the orbital motion of the spacecraft center-of-mass 2612 about a celestial body (not shown). The celestial body produces in the region of space around the spacecraft and tether a gravity gradient tensor field 2616, a magnetic vector field 2618, and an electrically conductive ionized plasma (not shown). The celestial body also defines the local vertical 2620, defined as the radial direction from the center-of-mass of the celestial body through the spacecraft center-of-mass 2612. In FIG. 26 the magnetic vector field 2618 is shown going into the page, and oriented at right angles to both the local vertical 2620 and the state vector 2614 of the spacecraft 2600, since it is this component of the total magnetic vector field that produces the desired electrodynamic forces on the total space system.

The gravity gradient tensor field 2616 produces an upper gravity gradient force 2622 on the upper effective-total-tether-center-of-mass 2610, which tends to orient the upper tether along the zenith direction of the local vertical 2620. The upper conductive tether 2604 is oriented at some upper tether angle 2624 with respect to the local vertical 2620. The teaching of the invention is how to continuously maintain the upper tether angle 2624 at or near some optimum value for best system performance. The gravity gradient tensor field 2616 also produces a lower gravity gradient force 2672 on the lower effective-total-tether-center-of-mass 2660, which tends to orient the lower tether along the nadir direction of the local vertical 2620. The lower conductive tether 2654 is oriented at some lower tether angle 2674 with respect to the local vertical 2620. The teaching of the invention is how to continuously maintain the lower tether angle 2674 at or near some optimum value for best system performance.

The power supply 2642 is used to produce an electrical potential difference between the far end of the lower conductive tether 2654 and the far end of the upper conductive tether 2604, with the far end of the upper conductive tether 2604 being positive in electric potential. A positive electric potential on the bare wire of the far end of the upper conductive tether will extract electrons 2632 from the space plasma. If, at the same time, the lower endmass tether-current-control-device 2656 is activated to cause electrons 2682 to be emitted into the space plasma, then an electric current vector 2634 will flow in both conductive tethers in the direction indicated. The magnitude of the tether current flow 2634 can be controlled by either or both of the lower endmass tether-current-control-device 2656 and the power supply 2642.

The flow of the electric current 2634 through the conductive tethers 2604 and 2654 in the presence of the magnetic field vector 2618 will induce the electrodynamic force vector 2636 and 2686 on the two tethers. The electrodynamic force vectors 2636 and 2686 have components along the spacecraft state vector 2614, the motion-parallel electrodynamic force vectors 2638 and 2688, which are in the same direction the motion of the spacecraft 2600, causing the spacecraft to accelerate. This acceleration can be used to increase the spacecraft orbital energy, or compensate for any aerodynamic drag that would normally decrease the spacecraft orbital energy. The component of the electrodynamic force vector 2136 that is not along the spacecraft state vector can be usefully employed to change the inclination of the spacecraft orbit.

The upper electrodynamic force vector 2636 produces a torque on the upper effective-total-tether-center-of-mass 2610 that will cause the upper tether angle 2624 to increase. The upper gravity gradient force 2622 on the upper effective-total-tether-center-of-mass 2610 has a component at right angles to the tether, the upper gravity gradient torque force 2640, which produces a torque on the upper effective-total-tether-center-of-mass 2610 that will cause the upper tether angle 2624 to decrease. The lower electrodynamic force vector 2686 produces a torque on the lower effective-total-tether-center-of-mass 2660 that will cause the lower tether angle 2674 to increase. The lower gravity gradient force 2672 on the lower effective-total-tether-center-of-mass 2660 has a component at right angles to the tether, the lower gravity gradient torque force 2690, which produces a torque on the lower effective-total-tether-center-of-mass 2660 that will cause the lower tether angle 2674 to decrease. The teaching of the invention is how to maximize the sum of the motion-parallel electrodynamic force vectors 2638 and 2688, while at the same time not allowing the either tether to become unstable, by controlling the tether angles 2624 and 2674 through controlling the tether current 2634.

Figure 27:
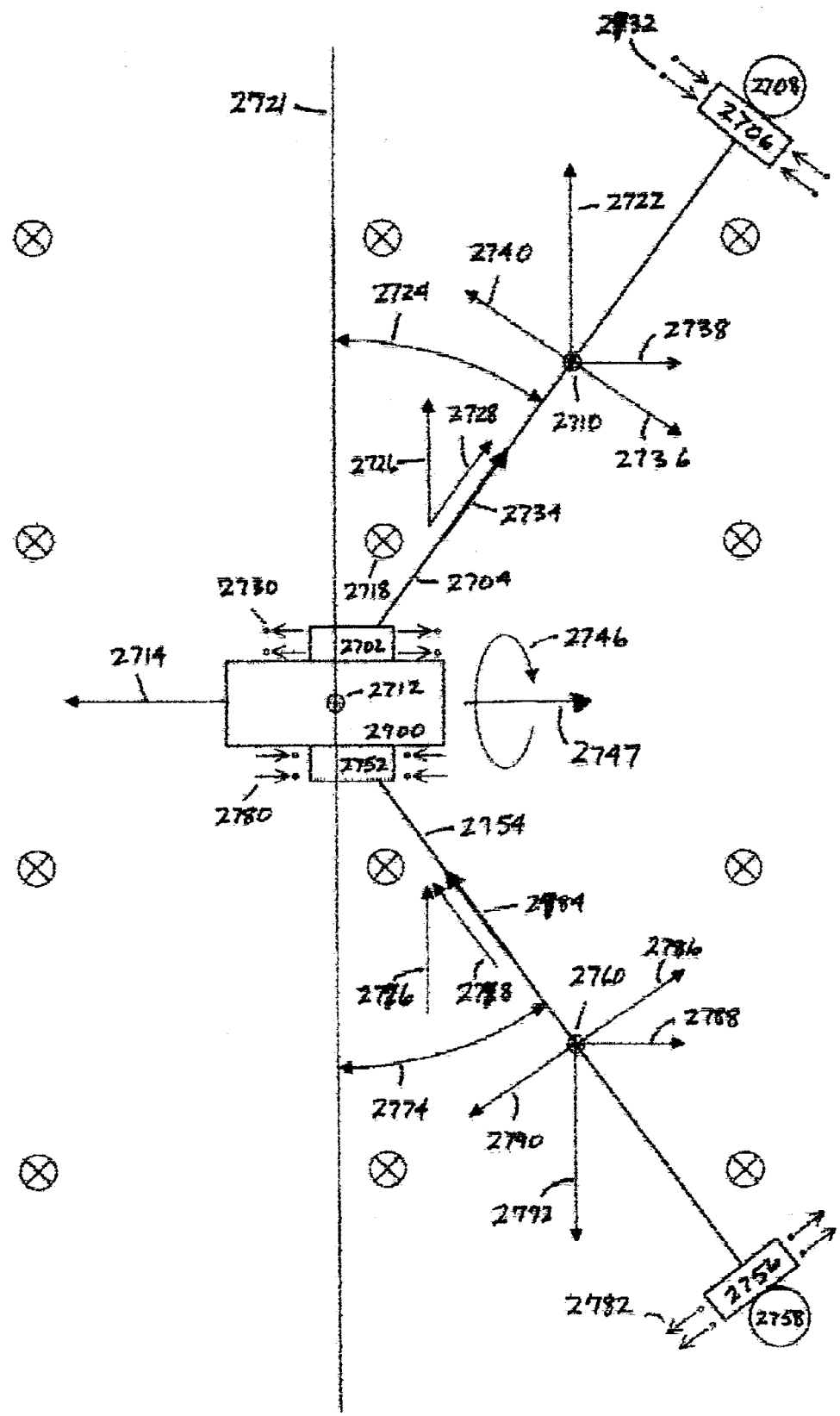
FIG. 27 shows an embodiment of the present invention with the spacecraft is rotating about an axis along the direction of the spacecraft direction of motion.

FIG. 27 is similar to FIG. 22 in structure. However, instead of using the gravity gradient force field of the Earth to torque the tethers in a direction opposite to the electrodynamic force torque, instead the embodiment of the invention shown in FIG. 27 uses a rotation of the entire system to create a centrifugal gradient force field to torque the tethers in a direction opposite to the electrodynamic force torque. In FIG. 27, the rotation is shown to be about a rotation axis that is aligned with the spacecraft motion vector. This is for simplicity of description. The rotation could be about any axis. Some axes are better than others. Since a rotating object, unless deliberately torqued, tends to have its axis remain in a fixed direction, there will be times during the spacecraft orbit when the electrodynamic tethers are not oriented properly with the magnetic field or the spacecraft direction of motion. One option is to only activate the current in the tethers when the rotation axis is properly oriented with the spacecraft motion and the magnetic field. Another option is to use the electrodynamic tether forces to not only supply acceleration forces to change the spacecraft state vector, but to also supply torque forces to the spacecraft rotation to keep the system spin axis oriented properly with respect to the spacecraft motion and/or the magnetic field. This concept of the invention of using rotation to supply a centrifugal gradient force to balance the electrodynamic force on the tether is a very useful one. The centrifugal gradient forces can easily be made much greater in magnitude than the gravity gradient forces, allowing much higher electrodynamic forces to be used on the tethers, increasing the deceleration forces on the spacecraft state vector and causing the spacecraft to deorbit faster, decreasing the Time component of the Area-Time-Product. The higher centrifugal gradient forces will also allow the use of shorter length tether, decreasing the Area component of the Area-Time-Product. A decreased Area-Time-Product means a lower likelihood of a collision with an operational spacecraft during the deorbit process.

FIG. 27 shows a space system consisting of an orbiting spacecraft 2700, an upper spacecraft tether-current-control-device 2702, an upper conductive tether 2704 with a near end and a far end, an upper endmass tether-current-control-device 2706, and an upper endmass 2708; plus a lower spacecraft tether-current-control-device 2752, a lower conductive tether 2754 with a near end and a far end, a lower endmass tether-current-control-device 2756, and a lower endmass 2758. The spacecraft 2700 is connected to the near end of the upper conductive tether 2704 through the upper spacecraft tether-current-control-device 2702. The far end of the upper conductive tether 2704 is attached to the upper endmass tether-current-control-device 2706 and thence to upper endmass 2708. The spacecraft 2700 is also connected to the near end of the lower conductive tether 2754 through the lower spacecraft tether-current-control-device 2752. The far end of the lower conductive tether 2754 is attached to the lower endmass tether-current-control-device 2756 and thence to lower endmass 2758.

The upper conductive tether 2704, the upper endmass tether-current-control-device 2706, and the upper endmass 2708 have a combined center-of-mass, the upper effective-total-tether-center-of-mass 2710. The lower conductive tether 2754, the lower endmass tether-current-control-device 2756, and the lower endmass 2758 have a combined center-of-mass, the lower effective-total-tether-center-of-mass 2760. The spacecraft 2700 plus the upper spacecraft tether-current-control-device 2702 and the lower spacecraft tether-current-control-device 2752 have a center-of-mass 2712, and a velocity defined by a spacecraft state vector 2714 produced by the orbital motion of the spacecraft center-of-mass 2712 about a celestial body (not shown). The celestial body generates in the region of space around the spacecraft and tether a magnetic vector field 2718 (shown 12 times), and an electrically conductive ionized plasma (not shown).

The entire system of FIG. 27 is in rotation in the direction shown by the rotation direction curve 2746 with a rotation axis 2747. Either direction of rotation is acceptable. In FIG. 27 the rotation axis 2747 is roughly antiparallel to the spacecraft state vector 2714 for purposes of a simplified discussion, but the rotation axis could be in any direction. At right angles to the rotation axis 2747 is the plane of rotation 2721, shown here edge on and going through the spacecraft center-of-mass 2712. The system rotation 2746 produces a centrifugal gradient force 2722 on the upper effective-total-tether-center-of-mass 2710, which tends to orient the upper tether toward the plane of rotation 2721. The upper conductive tether 2704 is shown oriented at some upper tether angle 2724 with respect to the plane of rotation 2721. The teaching of the invention is how to maintain the upper tether angle 2724 at or near some optimum value for best system performance. The system rotation 2746 also produces a lower centrifugal gradient force 2772 on the lower effective-total-tether-center-of-mass 2760, which tends to orient the lower tether toward the plane of rotation 2721. The lower conductive tether 2754 is shown oriented at some lower tether angle 2774 with respect to the plane of rotation 2721. The teaching of the invention is how to maintain the lower tether angle 2774 at or near some optimum value for best system performance.

As the spacecraft 2700 moves through the magnetic field vector 2718, the relative motion of the spacecraft with respect to the magnetic field vector 2718 produces an electric field vector 2726 in space in the reference frame of the moving spacecraft. The direction of the electric field vector 2726 is at a right angle to both the spacecraft state vector 2714 and the magnetic field vector 2718. The electric field vector 2726 has a component, the upper tether-parallel electric field vector 2728, that lies along the upper conductive tether 2704 as shown. If the upper spacecraft tether-current-control-device 2702 is activated to cause electrons 2730 to be emitted from the near end of the upper conductive tether 2704 into the space plasma of the celestial body, while at the same time the upper endmass tether-current-control-device 2706 is activated to cause electrons 2732 to be collected from the space plasma of the celestial body, then an upper electric current vector 2734 will flow in the upper conductive tether 2704 in the direction of the upper tether-parallel electric field vector 2728. The magnitude of the current flow can be controlled by either the upper endmass tether-current-control-device 2706 or the upper spacecraft tether-current-control-device 2702.

The flow of the upper electric current 2734 through the conductive tether 2704 in the presence of the magnetic field vector 2718 will induce an upper electrodynamic force vector 2736 on the upper tether. The upper electrodynamic force vector 2736 has a component along the spacecraft state vector 2714, the upper motion-parallel electrodynamic force vector 2738. The upper motion-parallel electrodynamic force vector 2738 opposes the motion of the spacecraft, causing the spacecraft to deorbit faster than normal.

The upper electrodynamic force vector 2736 also causes a torque on the upper effective-total-tether-center-of-mass 2710 that will cause the upper tether angle 2724 to increase. The upper centrifugal gradient force 2722 on the upper effective-total-tether-center-of-mass 2710 has a component at right angles to the tether, the upper centrifugal gradient torque force 2740, which produces a torque on the upper effective-total-tether-center-of-mass 2710 that will cause the upper tether angle 2724 to decrease. The teaching of the invention is how to maximize the upper motion-parallel electrodynamic force vector 2738 and thus the deorbit drag on the total system, while at the same time not allowing the tether to become unstable, by controlling the upper tether angle 2724 through controlling the upper tether current 2734.

As the spacecraft 2700 moves through the magnetic field vector 2718, the relative motion of the spacecraft with respect to the magnetic field vector 2718 also produces a lower electric field vector 2776 in space in the reference frame of the moving spacecraft. The direction of the lower electric field vector 2776 is at a right angle to both the spacecraft state vector 2714 and the magnetic field vector 2718. The lower electric field vector 2776 has a component, the lower tether-parallel electric field vector 2778 that lies along the lower conductive tether 2754 as shown. If the lower spacecraft tether-current-control-device 2752 is activated to cause electrons 2780 to be collected from the space plasma by the near end of the lower conductive tether 2754, while at the same time the lower endmass tether-current-control-device 2756 is activated to cause electrons 2782 to be emitted into the space plasma, then a lower electric current vector 2784 will flow in the lower conductive tether 2754 in the direction of the lower tether-parallel electric field vector 2778. The magnitude of the lower tether current flow 2784 can be controlled by either the lower endmass tether-current-control-device 2756 or the lower spacecraft tether-current-control-device 2752.

The flow of the lower electric current 2784 through the lower conductive tether 2754 in the presence of the magnetic field vector 2768 will induce a lower electrodynamic force vector 2786 on the tether. The lower electrodynamic force vector 2786 has a component along the spacecraft state vector 2714, the lower motion-parallel electrodynamic force vector 2788. The lower motion-parallel electrodynamic force vector 2788 opposes the motion of the spacecraft, causing the spacecraft to deorbit faster than normal.

The lower electrodynamic force vector 2786 also causes a torque on the lower effective-total-tether-center-of-mass 2760 that will cause the lower tether angle 2774 to increase. The lower centrifugal gradient force 2772 on the lower effective-total-tether-center-of-mass 2760 has a component at right angles to the tether, the lower centrifugal gradient torque force 2790, which produces a torque on the lower effective-total-tether-center-of-mass 2760 that will cause the lower tether angle 2774 to decrease. The teaching of the invention is how to maximize the lower motion-parallel electrodynamic force vector 2788, while at the same time not allowing the lower tether to become unstable, by controlling the lower tether angle 2774 through controlling the lower tether current 2784.

The optimum tether angle for both the upper and lower tether when the rotation axis 2747 is roughly aligned with the spacecraft state vector 2714 is 35.26 degrees.

Although FIG. 27 describes the rotation of a symmetric electrodynamic tether drag deorbit system consisting of two tethers on opposite sides of a single spacecraft, the same principle of operation could apply equally well to a rotating electrodynamic tether drag deorbit system with multiple spacecraft bodies and/or either one tether or multiple tethers at multiple arbitrary angles. The rotating electrodynamic tether drag deorbit system could also have other electrodynamic tether structures than the ones shown in FIG. 27, such as the specific electrodynamic tether structures shown in FIGS. 15 through 18, plus other specific electrodynamic tether structures obvious to one skilled in the art of electrodynamic tether design.

Figure 28:
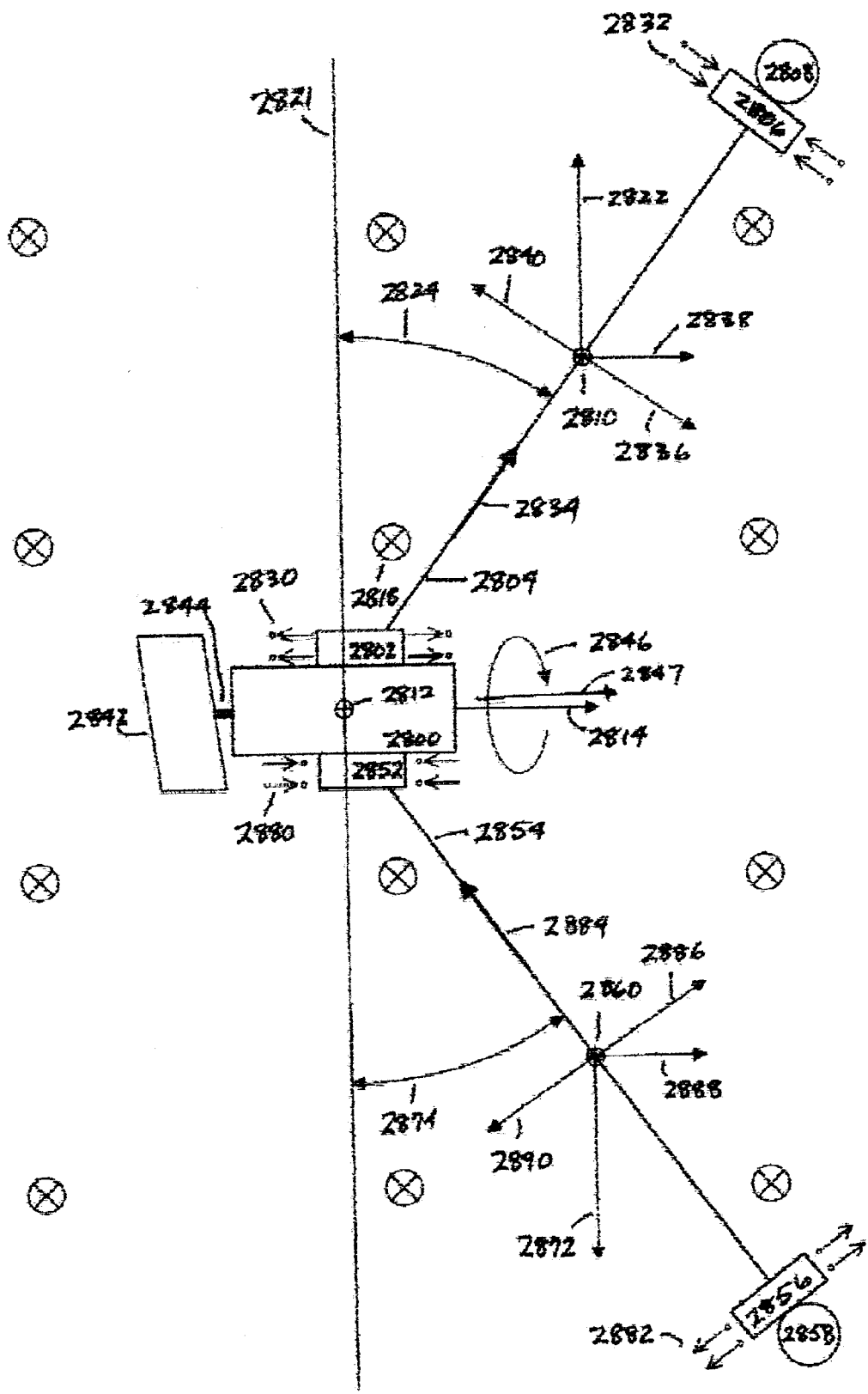
FIG. 28 shows an embodiment of the present with an added power which produces propulsive thrust in the direction of the spacecraft state vector.

FIG. 28 is similar to FIG. 27, except that a power supply has been added to the spacecraft which results in a spacecraft propulsion system instead of a spacecraft deorbit system. Note that in FIG. 28 the direction of the spacecraft motion vector is reversed compared to the direction in FIG. 27. This rotating mode for an electrodynamic tether propulsion system is especially useful, since it can allow large electrodynamic forces to be generated using short tethers and small ballast masses. Such rotating electrodynamic tether systems would be especially useful in polar orbits, since the rotation of the tether allows the tether to be at right angles to the magnetic field more often. To give a simple example, a gravity gradient stabilized electrodynamic tether propulsion system similar to FIG. 26, in a polar orbit, is unable to obtain any electrodynamic thrust in the direction of the spacecraft motion at the magnetic poles, despite the potential availability of high currents in the tethers using the power supply, because the vertically oriented tethers are nearly parallel to the vertical magnetic field at the pole, and it is the cross product of the current J and the magnetic field B that produces the force F=JXB. A rotating centrifugal gradient stabilized electrodynamic tether propulsion system will have its tethers at a significant angle to the vertical polar magnetic field for a good portion of its rotation cycle. For example, when the rotating tethers are nearly tangent to the surface of the Earth, then they will be at nearly right angles to the vertical polar magnetic field, and the electrodynamic thrust will be along the spacecraft motion vector. Thus, by properly pulsing the tether currents in phase and direction with the spacecraft rotation, significant net average thrust can be obtained over the magnetic poles instead of zero force. In FIG. 28 the currents in the two tethers are shown going in the same direction. If desired, the power supply output could be switched so that both of the currents could be reversed in direction, reversing the thrust. Alternatively, just one of the tether currents could be reversed, creating a torque on the spacecraft instead of a thrust. This torque could be useful in torquing the plane of rotation during the spacecraft orbit around the Earth to keep the axis of rotation pointed in some desired orientation with respect to the spacecraft state vector.

FIG. 28 shows an electrodynamic tether space propulsion system consisting of an orbiting spacecraft 2800, an upper spacecraft tether-current-control-device 2802, an upper conductive tether 2804 with a near end and a far end, an upper endmass tether-current-control-device 2806, and an upper endmass 2808; plus a lower spacecraft tether-current-control-device 2852, a lower conductive tether 2854 with a near end and a far end, a lower endmass tether-current-control-device 2856, and a lower endmass 2858; plus a power supply 2842 and a power supply connection joint 2844. The spacecraft 2800 is connected to the near end of the upper conductive tether 2804 through the upper spacecraft tether-current-control-device 2802. The far end of the upper conductive tether 2804 is attached to the upper endmass tether-current-control-device 2806 and thence to upper endmass 2808. The spacecraft 2800 is also connected to the near end of the lower conductive tether 2854 through the lower spacecraft tether-current-control-device 2852. The far end of the lower conductive tether 2854 is attached to the lower endmass tether-current-control-device 2856 and thence to lower endmass 2858. The spacecraft 2800 is also connected, both mechanically and electrically, to the power supply 2842, through the power supply connection joint 2844, which allows the power supply 2842 to move in angle with respect to the spacecraft 2800. The structure of spacecraft 2800 supplies both a mechanical and an electrical connection between the power supply connection joint 2844 and thence to power supply 2842 and both of the spacecraft tether-current-control-devices 2802 and 2852 and thence to tethers 2804 and 2854.

The upper conductive tether 2804, the upper endmass tether-current-control-device 2806, and the upper endmass 2808 have a combined center-of-mass, the upper effective-total-tether-center-of-mass 2810. The lower conductive tether 2854, the lower endmass tether-current-control-device 2856, and the lower endmass 2858 have a combined center-of-mass, the lower effective-total-tether-center-of-mass 2860. The spacecraft 2800, plus the upper spacecraft tether-current-control-device 2802, the lower spacecraft tether-current-control-device 2852, the power supply 2842, and the power supply connection joint 2844 have a center-of-mass 2812, and a velocity and direction defined by a spacecraft state vector 2814 produced by the orbital motion of the spacecraft center-of-mass 2812 about a celestial body (not shown). The celestial body generates in the region of space around the spacecraft and tether, a magnetic vector field 2818 (shown 12 times) and an electrically conductive ionized plasma (not shown).

The entire system of FIG. 28 is in rotation in the direction shown by the rotation direction curve 2846 and the rotation axis 2847. Either direction of rotation is acceptable. In FIG. 28 the rotation axis 2847 is roughly along the spacecraft state vector 2814 for purposes of a simplified discussion, but the rotation axis could be in any direction. At right angles to the rotation axis 2847 is the plane of rotation 2821, shown here edge on and passing through the spacecraft center-of-mass 1812. The system rotation 2846 produces a centrifugal gradient force 2822 on the upper effective-total-tether-center-of-mass 2810, which tends to orient the upper tether toward the plane of rotation 2821. The upper conductive tether 2804 is shown oriented at some upper tether angle 2824 with respect to the plane of rotation 2821. The teaching of the invention is how to maintain the upper tether angle 2824 at or near some optimum value for best system performance. The system rotation 2846 also produces a lower centrifugal gradient force 2872 on the lower effective-total-tether-center-of-mass 2860, which tends to orient the lower tether toward the plane of rotation 2821. The lower conductive tether 2854 is shown oriented at some lower tether angle 2874 with respect to the plane of rotation 2821. The teaching of the invention is how to maintain the lower tether angle 2874 at or near some optimum value for best system performance.

The power supply 2842 is used to produce an electrical potential difference between the far end of the upper conductive tether 2804 connected to the upper endmass tether-current-control-device 2806, and the near end of the upper conductive tether 2804 connected to the upper spacecraft tether-current-control-device 2802. In FIG. 28, the electric potential difference is such that the far end of the upper conductive tether 2804 is at a positive potential. The positive potential will attract electrons from the space plasma. When the upper endmass tether-current-control-device 2806 is activated to collect electrons 2832 from the space plasma and upper spacecraft tether-current-control-device 2802 is activated to emit electrons 2830 into the space plasma, an electric current vector 2834 will flow in the conductive tether 2804 in the direction indicated. The magnitude and direction of the tether current flow 2834 can be controlled by the upper endmass tether-current-control-device 2806, the upper spacecraft tether-current-control-device 2802, or the power supply 2842. The power supply 2842 is also used to produce an electrical potential difference between the far end of the lower conductive tether 2854 connected to the lower endmass tether-current-control-device 2856, and the near end of the lower conductive tether 2854 connected to the lower spacecraft tether-current-control-device 2852. In FIG. 28, the electric potential difference is such that the near end of the lower conductive tether 2854 is at a positive potential. The positive potential will attract electrons from the space plasma. When the lower spacecraft tether-current-control-device 2852 is activated to collect electrons 2880 from the space plasma and lower endmass tether-current-control-device 2856 is activated to emit electrons 2882 into the space plasma, a lower electric current 2884 will flow in the lower conductive tether 2854 in the direction indicated. The magnitude and direction of the lower tether current flow 2884 can be controlled by the lower endmass tether-current-control-device 2856, the lower spacecraft tether-current-control-device 2852, or the power supply 2842.

The flow of the upper electric current 2834 through the upper conductive tether 2804 in the presence of the magnetic field vector 2818 will induce an upper electrodynamic force vector 2836 on the upper tether. The flow of the lower electric current 2884 through the lower conductive tether 2854 in the presence of the magnetic field vector 2818 will induce a lower electrodynamic force vector 2886 on the tether. The upper and lower electrodynamic force vectors 2836 and 2886 have components along the spacecraft state vector 2814, the upper and lower motion-parallel electrodynamic force vectors 2838 and 2888, which are in the same direction as the motion of the spacecraft 2800, causing the spacecraft to accelerate. This acceleration can be used to increase the spacecraft orbital energy, or compensate for any aerodynamic drag that would normally decrease the spacecraft orbital energy. The components of the sum of the upper and lower electrodynamic force vectors 2836 and 2885 that are not along the spacecraft state vector can be usefully employed to change the inclination of the spacecraft orbit or to torque the system rotation.

The upper electrodynamic force vector 2836 produces a torque on the upper effective-total-tether-center-of-mass 2810 that will cause the upper tether angle 2824 to increase. The upper centrifugal gradient force 2822 on the upper effective-total-tether-center-of-mass 2810 has a component at right angles to the tether, the upper centrifugal gradient torque force 2840, which produces a torque on the upper effective-total-tether-center-of-mass 2810 that will cause the upper tether angle 2824 to decrease. The lower electrodynamic force vector 2886 produces a torque on the lower effective-total-tether-center-of-mass 2860 that will cause the lower tether angle 2874 to increase. The lower centrifugal gradient force 2872 on the lower effective-total-tether-center-of-mass 2860 has a component at right angles to the tether, the lower centrifugal gradient torque force 2890, which produces a torque on the lower effective-total-tether-center-of-mass 2860 that will cause the lower tether angle 2874 to decrease. The teaching of the invention is how to maximize the sum of the motion-parallel electrodynamic force vectors 2838 and 2888, while at the same time not allowing the either tether to become unstable, by controlling the tether angles 2824 and 2874 through controlling the tether currents 2834 and 2884.

The optimum tether angle for both the upper and lower tether when the rotation axis 2847 is roughly aligned with the spacecraft state vector 2814 is 35.26 degrees.

Although FIG. 28 describes the rotation of a symmetric electrodynamic tether propulsion system consisting of two tethers on opposite sides of a single spacecraft, the same principle of operation could apply equally well to a rotating electrodynamic tether propulsion system with multiple spacecraft bodies and/or either one tether or multiple tethers at multiple arbitrary angles. The rotating electrodynamic tether propulsion system could also have other powered electrodynamic tether structures than the ones shown in FIG. 28, such as the specific powered electrodynamic tether structures shown in FIGS. 19, 21, and 26, plus other specific powered electrodynamic tether structures obvious to one skilled in the art of powered electrodynamic tether system design.

Because all of the above embodiments of the present invention have not yet been built and tested the inventors use mathematical models of their invention to predict behavior of the various embodiments of their invention. The following detailed analysis of the present invention will help those skilled in the art to better make and use the present invention.

Electrodynamic Drag Analysis

The following is an optimization analysis of the electrodynamic drag produced by a conducting tether deployed from a host spacecraft that it is to deorbit. The force and torque diagram used in the analysis is shown in FIG. 12, which shows the forces and torques on an upward deployed conducting tether due to the motion of the host spacecraft through the magnetic field of the Earth, shown going into the plane of the drawing in the FIGS. 12–28 discussed above and designated "B" in the following analysis.

Physical Constants and Assumptions

The analysis that follows will use the following physical constants and assumptions:

Newton's gravitational constant $G=6.67\times10^{-11}$ $m^3$ /kg-$s^2$.

Mass of Earth $M_e=5.976\times10^{24}$ kg.

Radius of Earth near equator $R_e=6378$ km.

Assumed host spacecraft altitude $h=622$ km.

Assumed host spacecraft orbital radius $a=7000$ km.

Host spacecraft orbital velocity $w=\omega a=[GM_e/a]^{1/2}=7546$ m/s.

Vertical gravity gradient at spacecraft $2\Gamma=2GM_e/a^3=2.32\times10^{-6}s^{-2}$.

Centrifugal gradient at spacecraft $\omega^2=GM_e/a^3 1.16\times10^{-6}s^{-2}$.

Combined gradient at spacecraft $3\Gamma=3GM_e/a^3=3\omega^2=3.49\times10^{-6}s^{-2}$.

Magnetic field of Earth (tilted dipole approximation):

Magnitude $B_o=35$ $\mu T=0.35$ gauss.

Angle between magnetic pole and spin pole 11.5°.

Field components at spacecraft with altitude a and angle β between radius vector of spacecraft and magnetic equatorial plane.

Horizontal $B_H = B_o(R_e/a)^3 \cos \beta = 26.5 \, \mu T \cos \beta$.

Vertical $B_V = 2B_o(R_e/a)^3 \sin \beta = 52.9 \, \mu T \sin \beta$.

Electrodynamic Tether Constants and Assumptions

The electrodynamic tether is assumed to be made of a conducting metal, and have a length L, density d, resistivity r, and cross-sectional area A that is constant along the length of the tether. If the tether is a single round wire of diameter D, then the cross-sectional area is $A=\pi D^2/4$. Because of the micrometeorite and space debris hazard, however, it is likely the tether will be made up of redundantly interconnected multiple lines whose individual cross-sectional areas add up to A. Given these assumptions, the tether mass is then $m_T = dLA$, while the end-to-end tether resistance is $$R_T = rL/A = rdL^2/m_T.$$

Specific Conductivity Parameter

The choice of the metal conductor to be used in a space tether is determined by a combination of low resistivity (high conductivity) and low density, with cost, strength, and melting point as secondary considerations for certain applications. Copper has a resistivity $r=17.0$ n$\Omega$-m, a density $d=8933$ kg/m$^3$, and a "specific conductivity" of $1/rd=6,585$ m$^2/\Omega$-kg. Aluminum has a resistivity $r=27.4$ n$\Omega$-m, which is significantly greater than that of copper, but it has a much lower density of $d=2700$ kg/m$^3$. As a result, aluminum's "specific conductivity" of $1/rd=13,500$ m$^2/\Omega$-kg is twice the conductivity per unit mass of copper. Silver, because of its higher density and higher cost, is not competitive as an electrodynamic space tether even though its resistivity of $16.1$ n$\Omega$-m is slightly better than that of copper. An alternate candidate material would be beryllium, with a resistivity $r=32.5$ n$\Omega$-m, density $d=1850$ kg/m$^3$, and a "specific conductivity" of $1/rd=16,630$ m$^2/\Omega$-kg, slightly better than that of the much cheaper aluminum. Beryllium also has a higher melting point at 1551 K. than aluminum at 933 K., so some of its alloys may be a preferred material for some electrodynamic applications despite its higher materials cost. Unfortunately, despite decades of metallurgical research by the nuclear power industry, highly ductile alloys of beryllium have not been found, so it is difficult to pull beryllium into wire. As a result, because of its high specific conductivity, low cost, and ready availability in ductile wire form, it will be assumed for this analysis that the electrodynamic tether will be made of aluminum wire.

Typical Resistance Values

To be economically competitive, the mass of the tether needs to be a small fraction of the mass of the host spacecraft it is required to deorbit. Since a typical constellation spacecraft has a mass of about 1000 kg, a typical Terminator Tether™ with a mass that is 2% of the host spacecraft mass would consist of a deployer/controller package with a mass $m_D=10$ kg, containing an aluminum tether with a mass $m_T=10$ kg with a volume of $LA=m_T/d=3.70\times10^{-3}$ m$^3$. If this 10 kg of aluminum were formed into a tether with a length of L=2 km and a cross-sectional area of A=1.85 mm$^2$, then the end-to-end resistance of the tether would be $R=rL/A= rdL^2/m_T=29.6\Omega$ A longer tether would have a proportionately smaller cross-sectional area and a higher resistance; for example, a 5 km long tether with the same mass would have a resistance of 185$\Omega$.

Orbit Inclination Assumption

In order to make the remainder of the analysis mathematically tractable, it will be assumed that the orbit of the host spacecraft is circular and above the magnetic equator, so that the angle between the radius vector to the spacecraft and the magnetic equatorial plane is $\beta$0 degrees. In this orbit, the velocity v of the spacecraft with respect to the magnetic field is the orbital velocity w less the rotational velocity of the magnetic field at the orbital radius a due to the once per day rotation of the Earth, or:

$$v = W - 2\pi a/1 \text{ day} = (7546 - 509) \text{ m/s} = 7037 \text{ m/s}$$

This equation also shows why electrodynamic drag will not be useful for removing geostationary spacecraft from orbit. At the geostationary orbital radius of a=42,200 km, the relative velocity of the spacecraft and the rotating magnetic field of the Earth is zero.

With this assumption of an orbit above the magnetic equator, the vertical component of the Earth's magnetic field is zero and the horizontal component of the Earth's magnetic field is at right angles to both the local vertical and the direction of motion of the spacecraft. The total magnetic field seen by the host spacecraft and its Terminator Tether™ is then orthogonally horizontal and has the magnitude:

$$B = B_H = B_o[R_e/a]^3 \cos \beta = 26.5 \, \mu T.$$

Where for simplicity the subscript H will be dropped for the remainder of this analysis.

This orbit, with its inclination of 11.5° with respect to the spin equator, will not stay in the plane of the magnetic equator, but will vary ±11.5° above and below it as the Earth rotates, causing a variation in magnetic field strength of ±0.5 $\mu$T, as well as a slight variation in angle. This 2% variation is negligible in terms of the other uncertainties in this analysis. It is not until the orbital inclination of the host spacecraft orbit reaches 60°, where cos 60°=0.5, that there is a significant drop in the expected magnitude of the electrodynamic drag forces calculated in this analysis.

Electromagnetic Drag Effects in Polar Orbit

In many medium Earth orbit communication satellite constellations, there are a significant number of spacecraft at high inclinations and in nearly polar orbits. The high inclination spacecraft, with inclinations between 60° and 78.5°, will all have orbits that stay between the magnetic poles. Although the amount of electrodynamic drag will be significantly less than that experienced by spacecraft with orbits at lower inclinations, the direction of the induced electric fields in the tether will always be in the proper direction. If the tether is vertically upward, the outer tip of the tether will be positively charged and the bare wire in the tether will pull electrons out of the surrounding space plasma, while the electron emitter at the host spacecraft end will eject the electrons back into the space plasma to complete the circuit.

For spacecraft in near polar orbits with inclinations between 78.5° and 90°, however, there will be much more drastic variations. First of all, for a spacecraft in a 90° orbit that happens to pass directly over the magnetic poles, there is no horizontal component of the magnetic field when it is passing over one of the magnetic poles, so no voltage is generated in the tether during that part of the orbit, while the horizontal component of the magnetic field near the magnetic equator, while strong in magnitude, is along the spacecraft velocity vector, so no voltage is generated in the tether in that part of the orbit either. As a result, there will be negligible electrodynamic drag experienced by the host spacecraft during that particular orbit. The Earth is rotating, however, and the magnetic pole is rotating with it. A few orbits later, the host spacecraft will be passing over the Earth's spin pole at a point where the horizontal component of the magnetic field is exactly at right angles to the direction of motion of the spacecraft, so the full voltage is generated in the tether. When passing over the spin pole, the spacecraft radius vector is at an angle of 11.5° from the magnetic pole and at an angle β=78.5° away from the magnetic equatorial plane. With these assumptions, the magnitude of the horizontal component of the magnetic field at the Earth's spin pole is a respectable:

$$B=B_o[R_e/a]^3 \cos 78.5°=5.28\ \mu T$$

or 20% of the maximum value experiences by spacecraft orbiting above the magnetic equator. This value will drop slightly as the orbit continues, then build back up as the spacecraft passes over the opposite pole. As the Earth continues to rotate, bringing the magnetic pole again under the orbit, and the interaction of the tether with the horizontal component of the magnetic field again drops to zero. The average coupling of a tether to the Earth's magnetic field over all polar trajectories has been calculated to be 12.3 percent.

A problem experienced only by spacecraft with orbit inclinations greater than 78.5°:

The spacecraft will no longer be traveling from west to east with respect to the magnetic field axis, but will have a retrograde motion as it moves through the magnetic field. As a result, the voltage generated by the motion of the tether through the Earth's magnetic field will switch direction. The outer tip will be negatively charged and will attempt to collect ions, which is a much less efficient process than collecting electrons.

There are a number of solutions to this problem. The first is to increase the mass and length of the tether supplied to a spacecraft assigned to a polar orbit, so that higher voltages, currents, and drag are generated during the limited times the spacecraft is passing over the poles in the right direction. The second is to supply a tether with plasma contactors at both ends that can emit electrons from either end, allowing the current to flow either way, depending upon which direction the spacecraft is passing around the magnetic pole. The third is to utilize the first number of passes to torque the orbit of the spacecraft until the orbit inclination has been shifted below 60°, then turn on the electrodynamic drag full time to deorbit the spacecraft from this more favorable orbit inclination. This orbit torqueing maneuver is accomplished by activating the electrodynamic drag mechanism only when the magnetic field orientation is such that a strong out-of-plane component of force is created. This orbit torqueing maneuver can be augmented by switching to a propulsion mode, where power saved in the batteries during the drag force mode is pumped back into the tether when the magnetic field is in the opposite direction, applying electrodynamic propulsion to torque the orbit even further. With the tether at a large and stable trailing orientation, the coupling to the magnetic field can be significant to a vertical tether.

In summary, spacecraft in near-polar orbits might take longer to bring down, and might have to utilize specially designed Terminator Tethers™ that might cost and mass more than the simpler Terminator Tethers™ usable in lower inclination orbits, but a Terminator Tether™ can still remove a spacecraft from a polar orbit when desired.

The inventors now present a detailed analysis and optimization of a typical Terminator Tether™ attached to a typical host spacecraft in a typical low inclination orbit.

Electromotive Generation of Voltage and Current in the Tether

When an object is moved at a velocity v through a magnetic field B, an electric field is generated in the frame of reference of the moving object given by:

$$E=v\times B=-vB$$

where the magnetic field B of the Earth, being mostly tangent to the Earth's surface in the north-south direction, is at right angles to the velocity vector v of the spacecraft, assumed to be orbiting in a generally west-east direction. The direction of the electric field E will be at right angles to both v and B, or along the local vertical. It should be noted that this electric field exists in the moving frame of reference because a moving magnetic field creates an electric field. No object actually has to be there, but if it is, then the relative motion of the magnetic field of the Earth will not only apply magnetic forces to whatever material the object is made out of, but electric forces too.

Note also that the velocity used in this equation is the relative velocity between the object and the magnetic field. Because the Earth's magnetic field rotates with the Earth, the motion of the magnetic field must be subtracted from the orbital velocity of the object to obtain the relative velocity.

Voltage Generation in a Conducting Tether

If the moving object is a long conducting wire of length L, the electric field E generated in the wire produces a voltage V between the opposite ends of the wire given by:

$$V=E\cdot L=EL\cos\tau=-vBL\cos\tau$$

where τ is the angle between the length vector L of the tether and the electric field vector E, assumed to be in the vertical direction at right angles to the velocity vector v in the plane of FIG. 12 and the magnetic field vector B into the plane of FIG. 12. A typical value for the voltage level built up in a vertically oriented tether with length L=5 km and τ=0, moving at a velocity of v=7037 m/s through the Earth's horizontal magnetic field of strength 26.5 μT, is 932 V, or 0.186 V/m. Spacecraft in higher inclination orbits would experience somewhat smaller electric fields. For calibration, the voltage measured between the ends of the 19.5 km long TSS-1R tether was 3500 V, or 0.175 V/m.

Contacting the Space Plasma

Although a voltage will build up between the ends of the conducting tether, no current will flow unless the circuit is completed. The circuit cannot be completed with another wire, for it too will have a similar voltage generated in it by the moving magnetic field. Fortunately, empty space is not empty, and in near-Earth regions not too distant from the Earth's atmosphere there exists highly electrically conductive space plasma, kept partially ionized by radiation from the Sun. The electron and ion density varies from the dark to light side, with altitude, with season, with sunspot cycle, with contamination level, etc. but it typically varies from $10^{11}$ to $10^{13}$ electrons/cc.

Fortunately, it has been found that if a bare conductive surface such as the spherical Italian spacecraft in the TSS-1R experiment, or the long bare wire to be used in the ProSEDS experiment, or a multiline conducting wire Hoytape mesh, is charged to a few hundred volts, the bare conductor will readily pull electrons out of the space plasma. So all that is needed to complete a connection to the space plasma at the positively charged (upper) end of the tether is a sufficient large area of uninsulated conductor.

It is more difficult to eject electrons from a wire or to collect positive ions from the space plasma. Although it is conceivable that a very large area at the other end of the tether could collect enough ions to complete the circuit as was demonstrated during the TSS-1R mission when the Shuttle orbiter was found to be an adequate plasma contactor for over an ampere of current, the present method chosen is to use an electron emitter of some sort, either a hot cathode, a plasma cathode or contactor, a field-emission device, or something similar. Once provisions have been made at both ends of the tether to allow the flow of electrons out of one end of the tether and into the other end, and the altitude of the host spacecraft is not too high, then there will be sufficient conductivity in the space plasma surrounding the host spacecraft to allow current to flow through the tether.

Current Flow In The Tether

The amount of current I flowing through the tether depends upon the total resistance R in the circuit. This resistance will consist of three components, the effective resistance of the plasma, the resistance of the tether, calculated earlier as $R_T=rL/A=rdL^2/m_T$, and a control resistor $R_C$, which will be varied as needed to optimize the Terminator Tether™ performance. There will also need to be a parasitic load on the current in the form of a charging device to charge some batteries. The batteries in turn will be used to power the control and communication circuits, and drive the electron emitting devices at the negative end of the tether. A well-designed Terminator Tether™ will thus be completely self-powered, except for an initial charge in the batteries to provide electrical power for the deployment and startup procedure. For simplicity of analysis it will be assumed that this battery charging load, which absorbs power like a resistor, but which stores it and uses it later instead of dissipating it immediately as heat, is included in the control resistor $R_c$. Normally, this load would act as a "base resistance" below which the control resistor could not be lowered, but since the charging circuit can be turned off when desired, and operations continued without interruption using the power stored in the batteries, it will be assumed that the control resistor can be taken to near zero value in those circumstances where the space plasma conductivity is low, or the magnetic field is in the wrong orientation and the voltage being generated in the tether is not large. Under these circumstances, lowering the control resistor to near zero allows a much higher current to flow for a given generated voltage, thus increasing the power being dissipated in the tether and maintaining a high level of electrodynamic drag on the host spacecraft.

A properly designed Terminator Tether™ will have plenty of bare metal area for electron collection at the positive end, while the electron emitters at the other end are efficient in terms of emitting large electron currents at low voltages and therefore low powers, while at the same time the mass, length, and area of the conducting tether have been made such that the resistance of the tether is moderately high. Under these conditions, the effective resistance of the space plasma will be much less than the design resistance of the tether. To make the mathematics more tractable it will be assumed that the plasma resistance is essentially zero and that the voltage available to drive the tether is the full voltage generated by the moving magnetic field. Although voltage will be needed to power the electron emitter, whatever its form, it will be assumed that the required voltage and power will be supplied by the batteries. The batteries in turn will be powered by the battery charging circuit, whose effective resistance is included in the control resistor (except for those short periods when the plasma or magnetic field interactions are weak).

Given all these assumptions concerning the total resistance in the circuit, the current I flowing through the tether is then given by:

$$I=V/R=-vBL \cos \tau/(R_C+rdL^2/m_T)$$

A typical current level can be estimated by assuming that the control resistance $R_C$ should be about the same size as the tether resistance $R_T$, which for an aluminum tether with resistivity r=27.4 nΩ-m, density d=2700 kg/m³, length L=5 km, and mass $m_T$=10 kg, is $R_T$=185Ω, giving a total resistance, including the control resistance $R_C$, of R=370Ω. Thus, the current flowing though a tether of length L=5 km, generating a voltage of V=932 V, would be I=V/R=2.52 A.

Power Dissipation Analysis

The induced current I flowing through the tether resistance $R_T$ will generate heat in the wire, which will be radiated into space and lost. That radiated energy must come from somewhere. There is also power taken out of the current flow by the battery charging circuit and ultimately dissipated. In order to conform to energy conservation laws, this power and energy must come from a decrease in the total kinetic and potential energy of the host spacecraft, causing it to deorbit. Set forth below is a detailed, optimized force analysis which will calculate the drag force on the host spacecraft. In this section, by using some simplifying assumptions, it is possible to produce a general argument based on energy conservation laws, that will illustrate the broad scope of the present invention.

For this energy conservation analysis it will be assumed that the plasma resistance is small compared with the tether resistance, and that the control resistance is equal to the tether resistance:

$$R_C=R_T=rL/A=rdL^2/m_T$$

Assume that the ballast mass at the end of the tether is a large piece of the defunct host spacecraft, such as a solar panel, antenna, or battery pack, so that the gradient force is large and the tether is always oriented along the vertical so that the angle τ=0°. Also assume the spacecraft is in an orbit above the magnetic equator and thus is moving at right angles to the Earth's magnetic field, so that the angle between the orbital velocity vector and the magnetic field vector is 90°, and the electric field vector is in the vertical direction, aligned perfectly with the tether length vector. Under these ideal conditions, the voltage between the ends of the tether is given by:

$$V=E \cdot L=(-v \times B) \cdot L=-vBL$$

The current in the tether is then just:

$$I=V/(R_C+R_T)=-vBm_T/2rdL$$

The power dissipated as ohmic heating in the tether is then given by:

$$P=IV=(vB)^2 m_T/2rd$$

This equation shows the interesting result that the power dissipated does not depend upon the length or the area of the tether (within reason), but only the mass of the tether $m_T$, the resistivity r and density d of the tether material, and the velocity v of the conducting tether through the Earth's magnetic field B.

For a canonical aluminum tether of mass $m_T$=10 kg, the power dissipated is an impressive P=2350 W. Even if only a small fraction of this power is dissipated in a real system, the kinetic energy of the host spacecraft would suffer a significant energy loss with time.

Orbital Energy Extraction Analysis

The total energy U of a spacecraft of mass M in orbit around the Earth consists of two components, its positive orbital kinetic energy and its negative gravitational potential energy. If a circular orbit of altitude h and radius $a=R_e+h$ is assumed, then the total energy of the spacecraft moving at a velocity $w=(GM_e/a)^{1/2}$ is:

$$U=+Mw^2/2-GMM_e/a=-GMM_e/2a$$

The system will be dissipating energy in the tether to decrease the energy U of the unwanted spacecraft from its relatively low negative value in a high Earth orbit to a greater negative value in a lower Earth orbit. To give a specific example, an unwanted spacecraft with a mass of M=1000 kg (a metric ton) in an orbit with an altitude of h=1000 km and a high orbital radius of a(H)=$R_e$+h=7371 km, then its (negative) total energy is:

$$U(H)=-GMM_e/2a(H)=-27.1 \text{ GJ or } -27.1 \text{ MJ/kg.}$$

It is desired to lower the spacecraft to an orbit with an altitude just outside the atmosphere of h=200 km or a lower orbital radius of a(L)=$R_e$+h=6571 km, where atmospheric drag will finish the job. The total (negative) energy of a metric ton spacecraft at 200 km altitude is:

$$U(L)=-GMM_e/2a(L)=-30.4GJ.$$

Thus, the amount of energy needed to be dissipated in order to move the 1000 kg spacecraft from a 1000 km orbit with a total energy U(H)=−27.1 GJ down to a 200 km orbit with energy U(L)=−30.4 GJ is:

$$dU=U(H)-U(L)=3.3GJ.$$

The decay time T of a metric ton spacecraft moving from a 1000 km altitude orbit to a 200 km altitude orbit with an energy difference of dU=3.3 GJ, when its energy is being dissipated at a power of P=2350 W by a typical aluminum tether massing just 10 kg or 1% the mass of the spacecraft, is found to be T=dU/P=16 days.

The actual decay time will be longer than this. If the electrodynamic drag force is very large, and becomes larger than the gravity gradient forces pulling on the ends of the tether, then the tether will tend to align itself along the magnetic field lines instead of across them, and the drag force will decrease because of the small angle between the conductor length and the magnetic field lines. The tether current will need to be controlled until the angle of the tether settles into an angle determined by the balance between these two forces. These electrodynamic torque vs. gradient torque dynamic interaction effects are discussed in the next section.

Force and Torque Balance Analysis

It is now possible to calculate the forces and torques on the tether. It is also possible to use the fact that the electrodynamic and gravity forces and torques on the tether must balance each other out to calculate and teach some optimum values for some of the Terminator Tether™ parameters.

Electrodynamic Force and Torque

As discussed above, both theory and experiment show that: provided the conducting tether is moved rapidly through the Earth's magnetic field in order to generate a voltage across it, and provided good contact is made with the space plasma, the conducting tether will have a current flowing through it. When a wire (moving or not) carrying a current I is embedded in a magnetic field B, there will be an electrodynamic force $F_E$ generated on each element of the wire. The electrodynamic force will be at right angles to the magnetic field vector and the length vector of the wire element, with a magnitude given by:

$$F_E=J\times B=ILB$$

where B is the horizontal component of the magnetic field, which is perpendicular to the assumed magnetic equator orbit plane, while the tether length vector L is assumed to lie in the orbit plane. If, as will be the case most of the time, the electron current is leaving the space plasma and entering the tether along the length of the tether, then IL needs to be replaced with an integral of the current along the length of the tether.

Note that the electrodynamic force amplitude or direction is not directly dependent on the motion of the tether through the Earth's magnetic field. The electrodynamic force would be the same if the tether were not moving and the current was being supplied by a battery. Since the current I is a function of the orbital velocity, however, there is a secondary dependence of the electrodynamic force magnitude on the orbital velocity, but not its direction. The electrodynamic force is always at right angles to the conductor, and stays at right angles to the conductor as the angle τ varies, as shown in FIG. 12.

Assuming that the electrodynamic drag force is applied uniformly along the length of the tether, it is possible to make the simplifying assumption that the integrated force is effectively applied at right angles to the center of mass of the tether at the point L/2 as shown in FIG. 12. The electrodynamic torque on the tether is then:

$$T_E=F_EL/2=IBL^2/2=-vB^2L^3 \cos \tau/2(R_C+rdL^2/m_T)=-vB^2L^3 \cos \tau/2R$$

Gravity Gradient Forces and Torques

When a tether and its ballast end mass are deployed from a host spacecraft, the gravity gradient force field of the Earth, combined with the orbital centrifugal gradient force field will cause the tether to deploy either up or down from the host spacecraft. The direction desired depends on which end of the tether is connected to the electron emitter. Normally, the electron emitter will be on the end attached to the host spacecraft, in which case the desired direction of deployment will be upward so that the induced voltage in the tether will produce an excess of electrons at the electron emitter end of the tether. The desired upward direction is chosen by having the deployer eject the ballast mass in the upward direction. Once the ballast mass has been started in that direction, the centrifugal force due to the orbital motion of the ballast mass will cause the ballast mass to continue to accelerate in the upward direction until it is brought to a halt by the full deployment of the tether.

If there were no electrodynamic or atmospheric drag, the equilibrium direction of the tether would be exactly along the vertical, since the combined gradient field is a maximum in that direction. Because a significant amount of electromagnetic drag is expected, the actual angle of the tether with respect to the local vertical will be at some angle τ, lagging behind the spacecraft motion in the plane of the orbit, as shown in FIG. 12. In the following analysis shows that there is an optimum angle for τ that produces the largest electrodynamic drag force on the host spacecraft without producing tether instability.

The combined vertical gravity gradient and centrifugal gradient field 3Γ acting on the ballast mass $m_B$ at the end of the tether of length L will produce a gradient force $F_{GB}$ given by:

$$F_{GB}=-3\Gamma m_B L \cos \tau$$

The strength of the force depends not only on the ballast mass $m_B$ and the strength of the gradient field 3Γ, but also the component along the radial direction of the distance of the ballast mass from the center of mass, which is L cos τ. This force acts in the vertical direction along the radius vector leading from the ballast mass away from the center of the Earth. The amount of gradient force is not large. For a ballast mass of $m_B=10$ kg and a tether length of L=5 km, the gradient force is about 0.175 N.

As can be seen in FIG. 12, the component of this gradient force that is at right angles to the tether, given by $F_{GB} \sin \tau$, will produce a torque $T_{GB}$ on the tether that tends to restore the tether toward the vertical, lessening the angle $\tau$.

$$T_{GB}=LF_{GB} \sin \tau = -3_{64}m_B L^2 \sin \tau \cos \tau$$

The tether mass $m_T$ also contributes to the gradient force and torque. If it is assumed that the tether has a uniform cross section, then it is possible to replace the distributed mass of the tether with an equivalent point mass $m_T$ placed at the center of mass of the tether, which is the point L/2 along the tether, and a distance L /2 cos $\tau$ in the radial direction. The gradient force due to the tether mass is then:

$$F_{GT}=-3/2\Gamma m_T L \cos \tau$$

While the gradient torque is:

$$T_{GT}=-L/2F_{GT} \sin \tau = -3/4\Gamma m_B L^2 \sin \tau \cos \tau$$

The total gradient torque attempting to restore the tether to its vertical orientation is then:

$$T_G=T_{GB}+T_{GT}=3\Gamma(m_B+m_T/4)L^2 \sin \tau \cos \tau$$

It is important to notice the variation of the total gravity gradient torque as the tether angle $\tau$ is varied. Since the gradient force is always in the radial or vertical direction, there is no torque on the tether when the tether is vertical, as is the case when there are no aerodynamic or electromagnetic drag forces. Once the drag forces become important and start to apply torque to the tether, increasing the tether angle $\tau$, those drag torques causing an increase in tether angle $\tau$ will be opposed by a rising gradient torque which will attempt to decrease the tether angle. For small tether angles, the gradient torque increases first linearly with $\tau$, then as sin $\tau$, since cos $\tau$ is near unity for small $\tau$, then at $\tau=45°$ the gradient torque reaches its maximum, where sin $\tau=\cos \tau=0.707$ and sin $\tau$ cos $\tau=0.50$. When this angle is reached, the tether is a point of catastrophic instability, for if there is a further increase in the electrodynamic drag force, causing the angle $\tau$ to become greater than 45°, the gradient torque, instead of growing stronger to counteract the increased drag torque, will become weaker and the tether angle will go rapidly to 90°.

To restore control to the tether angle if the instability occurs, it will be necessary to turn off the electrodynamic drag forces by shutting off the current flow through the tether. The $\tau=90°$ position for the tether and ballast mass is a gravitationally unstable orientation. After a time, slight fluctuations in the gravity field will allow the gradient force to slowly take over and restore the tether to the vertical orientation, which, unless it can be controlled in some way, is equally likely to be up or down. It would therefore be desirable to maintain control of the tether angle so as to avoid the tether angle getting into the region of instability.

Torque Balance on the Tether

The angle $\tau$ of the tether is determined by a balance between the electrodynamic torque $T_E$ attempting to increase the angle $\tau$ and the gradient torque $T_G$ attempting to decrease the angle $\tau$. Balance is achieved when the two torques are equal:

$$T_E=T_G=T_{GB}+T_{GT}$$

or:

$$vB^2L^3 \cos \tau/2R=3_{\Gamma/}(m_B+m_T/4)L^2 \sin \tau \cos \tau$$

Simplifying and rearranging yields an equation giving us the angle $\tau$ at which torque balance occurs:

$$\tau=\arc \sin[vB^2L/6_\Gamma(m_B+m_T/4)R]$$

The physical interpretation of this equation is that the maximum electrodynamic force that can be sustained on the tether is limited by the gradient force on the tether. It is possible to increase the electrodynamic force by decreasing the total resistance R of the tether (for example, by using a tether with a larger mass and a lower tether resistance), but if the tether resistance is too low, then the quantity in brackets becomes greater than unity and this equation has no solution, indicating that the tether has reached an angle where instability sets in.

To maintain control of the tether angle, it will be necessary to vary the control resistance of the tether to compensate for variations in magnetic field strength and direction, plasma density (which affects the plasma resistance), and other factors, and thereby maintain the tether at an intermediate angle where both the electrodynamic and gradient forces are at an appreciable level and balance each other.

Optimization of Tether Angle

At first glance, it might seem that the optimum angle for the tether would be 45°, since at that angle the gradient torque is largest and therefore can counteract a larger electrodynamic drag force. However, since the 45° angle is the point where instability sets in, it is desirable to set the tether angle at some value below 45°. The optimum angle is that which maximizes the horizontal or drag component of the electrodynamic force. This optimum angle $\tau$ is derived from the equation for the horizontal component of the electrodynamic force, or the electrodynamic drag force, since it opposes the host spacecraft motion:

$$F_{ED}=F_E \cos \tau = 6[m_B+m_T/4] \Gamma L \sin \tau \cos^2 \tau$$

By setting the partial derivative $?F_{ED}/?\tau=0$ and solving, it is possible to calculate that the optimum angle for the tether that gives the maximum electrodynamic drag force $FE_D$, while still keeping the tether torques balanced and under control, is $\tau=\arc \tan(0.707)=35.26°$. With this angle selected and maintained by varying the control resistor $R_C$ to compensate for variations in plasma contact resistance and variations in the strength and direction of the Earth's magnetic field B seen at the spacecraft, the tether experience the maximum stable value for the electromagnetic drag force of:

$$F_{ED}(\max, \tau=35.26°)=2.31 [m_B+m_T/4]\tau L$$

There are many ways to provide the sensing information needed to provide the feedback signals to the control resistor, but the simplest is to merely measure the drag acceleration on the host spacecraft with a set of accelerometers, and maximize the force in the direction opposite to the host spacecraft motion. Another method would be to measure the current in the tether, and knowing the tether resistance and the amount of control resistance, calculate the power being extracted and maximize that value. Alternate methods would be to use an optical position sensor or GPS receivers at both ends of the tether to measure the angle of the tether or the position of the ballast mass with respect to the host spacecraft.

To make an estimate of the magnitude of drag force attainable, if it is assumed that a typical aluminum tether with a length of L=5 km, a tether mass of $m_T$=10 kg and a ballast mass of $m_B$=10 kg is being used, then the maximum gradient force limited electrodynamic drag force is $F_{ED}$=0.167 N. The power being dissipated in the canonical tether at the angle $\tau$, with $R_C$=$R_T$=rdL$^2$/$m_T$=185Ω is given by:

$$P=IR=[vBL\cos\tau]^2/(R_C+rdL^2/m_T)$$

which for an angle $\tau$=35.26° results in a power dissipation of 1570 W. Thus, the thrust level per unit power obtained by the typical Terminator Tether™ would be about 0.106 N/kW. This number is comparable to the value of 0.148 N/kW estimated for the much heavier and longer TSS-1R tether.

Reconciliation of Energy and Force Analysis

By a force and torque balance analysis an optimum angle for the tether has been discovered at which it is possible to obtain a maximum in the drag component of the electrodynamic force. There is also an additional component of the electrodynamic force, the component in the vertical direction, $F_{EV}$=$F_E\sin(\tau)$, which is downward for an upwardly deployed tether. This component of force combines with the gravity force of the Earth to effectively allow the host spacecraft to orbit a little faster than normal for that orbital altitude. It does not contribute to the deorbiting of the host spacecraft. But since this vertical component of force is created by current running through the tether, and that current is creating heat and dissipating energy as it passes through the tether, there might be some concern that the force and torque balance analysis above does not conform to the law of conservation of energy.

The inventors will now show, in a very general manner, that no matter what the tether angle, the electrical power being dissipated in the tether is exactly equal to the power being lost by the slowing of the host spacecraft.

The "deorbit power" $P_D$ that must be removed from a spacecraft moving at a velocity v when that motion is opposed by a drag force $F_{ED}$ is:

$$P_D=v\cdot F_{ED}=vF_E\cos\tau=vILB\cos\tau=I[vBL\cos\tau]$$

But, since the voltage V induced across the tether of length L and tilt angle $\tau$ moving at a velocity v through a horizontal magnetic field B is $$V=E\cdot L=EL\cos\tau=vBL\cos\tau$$

Therefore:

$$P_D=IV=P_E$$

And the deorbit power $P_D$ extracted from the slowing of the spacecraft by the drag component of the electrodynamic force is always exactly equal to the electrical power $P_E$ being dissipated as heat in the tether circuits, independent of the tether angle.

Optimization of Tether Mass Distribution

If it is not possible to use a piece of the host spacecraft as ballast mass, then the mass of the ballast must be included in the Terminator Tether™ mass. It would be desirable to minimize the total Terminator Tether™ mass, since every kilogram saved means that another kilogram's worth of revenue-producing transponders can be added to the working payload of the host spacecraft. Given a total mass for the Terminator Tether™ and the mass of the deployer/controller unit, it is possible to optimize the mass distribution between the ballast mass and the tether mass to obtain a minimum total Terminator Tether™ mass. A well-designed Terminator Tether™ will also have most, if not all, of the deployer mass incorporated into the ballast mass.

Assume that the total Terminator Tether™ mass consists of the deployer/controller mass $m_D$, the tether mass $m_T$, and the ballast mass $m_B$, with $m_B$>$m_T$>$m_D$. Of the three mass components in the Terminator Tether™, two of them affect the electrodynamic drag performance. If it is assumed that the ballast mass is a factor X larger than the tether mass, or $m_B$=X$m_T$, the maximum drag force that can be obtained is now:

$$F_{ED}(\max)=2.31m_T(X+0.25)\Gamma L$$

If it is assumed that the control resistor has been adjusted so that this maximum value for the electrodynamic drag force is maintained as the motion of the spacecraft along its orbit moves the spacecraft into regions with different magnetic field strengths and plasma densities, then for the angle $\tau$=35.26°, $\cos(35.26°)$=0.817, and the maximum electrodynamic drag force in terms of the electrodynamic parameters will be:

$$0.817vB^2L^2/(R_C+rdL^2/m_T)=F_{ED}(\max)=2.31m_T(X+0.25)\Gamma L$$

or canceling out terms and rearranging:

$$(X+0.25)=0.353vB^2L/\Gamma m_T(R_C+rdL^2/m_T)$$

It is now possible to make the further simplifying assumption that to maintain control of the tether, the control resistor needs to be roughly the same size as the tether resistance or $R_C\approx rdL^2/m_T$. Using this assumption produces an equation for the optimum value for the ratio X of the ballast mass to the tether mass:

$$X=0.177vB^2/\Gamma rdL-0.25$$

This equals $$-0.25+(\Lambda/L)$$

where $\Lambda$ is the "effective electromagnetic length" of the conductive tether.

If the tether is short, so that L is small, this equation indicates that the ballast mass must be increased to increase the gradient force, since it is the gradient force which determines the upper limit to the amount of electrodynamic drag force that can be generated without losing control of the tether.

Assuming the usual values for the Earth's magnetic and gradient fields, the velocity of the host spacecraft through the magnetic field, and the resistivity and density of aluminum, this equation becomes:

$$X=-0.25+(10.9/L)$$

where L is in kilometers.

For a typical tether of length L=5 km, X=1.93. If the total mass for the Terminator Tether™ is 20 kg, or 2% of the host spacecraft mass, and the mass of the deployer is 10 kg, then the remaining 10 kg should be distributed so that 6.59 kg is in the ballast mass while 3.41 kg is in tether mass.

Optimization of Tether Length

If the ballast mass consists of a piece of the host spacecraft, then the mass of the ballast does not have to be considered in the optimization of the Tether system. In this case, the optimum distribution of the Tether mass is to put as much mass as possible into the tether, with a minimum in the deployer/controller package. Under this assumption, the optimum length of the tether is determined by the desire to keep the Area-Time Product of the host spacecraft plus Tether to a minimum.

In a long tether of length L, the effective "collision" cross-sectional area is not the area of the tether, but the larger area produced by multiplying the length of the tether by sum of the width of the tether plus the width of the "target" spacecraft that would be damaged by the tether hitting it. Thus, to decrease the "area" portion of the Area-Time Product, it would be desirable to shorten the tether, making it thicker, and perhaps slightly wider, at the same time, thus keeping the same tether mass and electron collection area, and thereby maintaining the drag force and keeping the decay time at the same level. The result will be a shortening of the Area-Time Product.

If the tether is shortened too much, however, the smaller voltage generated across the shorter tether will leave less voltage margin for the operation of the plasma contactors and the battery recharge system. Since the maximum voltage that can be generated is about 200 V/km, and typical plasma contactors and battery chargers take 25–100 V to operate, a minimum length for a Tether would be roughly 2 km. Host spacecraft operating in polar orbits, where the conditions for voltage generation are not as good, may require a tether length of 5 km or more.

Since many watts of heat power will be dissipated in the control resistor, means must usually be provided to radiate the heat away into space. One low-mass method of accomplishing this is to make the control resistor (or resistors) in the form of a long, electrically insulated, high resistivity wire similar to those used in electric blankets, but designed to operate at a higher temperature, and during the fabrication of the electrodynamic tether, incorporate the high resitivity wire (or wires) into the end of the tether closest to the control circuit by weaving or braiding the insulated high resistivity wire in with the uninsulated aluminum wire of the electrodynamic tether. The surface area of a long wire is very large, so in this extended wire configuration, exposed to the space all around it, the hot control resistor wire can self-radiate its power into cold space without incurring the mass penalty of a separate radiating surface.

Implementation

The basic optimum structure for a Terminator Tether™ would be one of the many types of Hoytethers. A multiline (6–12 primary line) Hoytape™ will provide the largest contact area with the plasma, since both sides of the tape would be able to pass current to the plasma. If the spacing between the primary lines is chosen to be larger than twice the Debye length of the plasma, then the effective current collection area per unit length of the Hoytape is proportional to the width of the Hoytape mesh, not the diameter of the wires in the mesh. Thus, a Hoytape not only provides an assured longer life for the Terminator Tether™, but very short lengths will also provide a very large current collection areas.

The deployer for the tether can deploy the Terminator Tether™ either down or up or both. The deployer can stay attached to the spacecraft as was done in the SEDS missions, or perhaps a better alternative would have the deployer ejected from the spacecraft, with one end of the tether still attached to the spacecraft, reeling out tether as it leaves. The empty deployer would then act as a ballast mass at the end of the Terminator Tether™, which would improve the performance.

The "Remora Remover"

In addition to attaching Terminator Tethers to spacecraft before launch, it is possible to consider a missile-like application. This "Remora Remover" missile would use a Terminator Tether™ carried by a seeker missile similar to the small "hit-to-kill" missiles developed by the Space Defense Initiative Office that deployed a net loaded with oriented metal rods. The Remora Remover missile would hunt down a spacecraft that needs to be removed from space, but instead of hitting the spacecraft, the missile would be programmed to rendezvous with the spacecraft and attach itself to the host spacecraft using a hooked net, harpoon, or adhesive "sucker". The Remora Remover missile would then deploy the Terminator Tether™, which would bring down both the spacecraft and the missile. Alternatively the Remora missile could include an orbital maneuvering vehicle that would carry a plurality of deployable tether deorbit systems and could affix one of the "Terminator Tethers" to a target spacecraft and then maneuver to the next spacecraft to be removed. This would allow the Remora to be a space asset that could stay on station for a long period of time and deorbit a number of natural or artificial space objects, enemy satellites or upper stage fragments and other orbital debris, with one launch.

The inventors have presented two analyses, backed up with data obtained from space flight experiments. One analysis was based on generalized energy conservation laws while the other analysis use force and torque balance arguments. Both analyses show that optimized aluminum wire tethers 2 to 5 km in length and massing just 1% to 5% of the mass of the host spacecraft can deorbit the host spacecraft in the order of a few weeks, thus mitigating the long-lived orbital debris hazard created by a constellation spacecraft after their end-of-life.

Power Augmented Operation of the Tether

It is well known in the aerospace literature that if a spacecraft has a power supply and a conducting tether hanging from it, and the spacecraft is in an orbit or trajectory that takes it near a body, such as the Earth or Jupiter, which has both a magnetic field and a region of moderate density electron-ion plasma, and electrical current is pumped from the power supply through the tether and back through the plasma, that the current flowing through the tether will interact with the magnetic field of the body, producing forces on the tether and thence on the spacecraft, changing its orbit or trajectory. These forces can be used to increase or decrease the spacecraft altitude and/or inclination. The amount of altitude or inclination change is proportional to the ratio of the power available from the power supply divided by the mass of the spacecraft and varies with altitude. The unpowered Terminator Tether™ is a simple example of such a system, in which only altitude decrease is possible, although small amounts of both inclination increase or decrease are possible at the same time Some typical references to this prior art are: Les Johnson, "Propulsive Small Expendable Deployer System Mission (ProSEDS)", Proceedings of the OAST $8^{th}$ Advanced Propulsion Workshop, JPL, Pasadena, Calif., May 20–22, 1997; and Les Johnson, Joe Carroll, Robert D. Estes, Enrico Lorenzini, Brian Gilchrist, Manuel Martinez-Sanchez, Juan Sanmartin, and Irwin Vas, "Electrodynamic Tethers for Reboost of the International Space Station and Spacecraft Propulsion, AIAA Paper 1996.

Since the Terminator Tether™ of the invention is normally associated with a satellite that has a power supply in the form of a solar panel combined with a storage battery, the Terminator Tether™ can be operated in the "powered propulsion" mode if desired. Such a mode would be useful when attempting to avoid a collision between the Terminator Tether™ and another spacecraft. In such cases, the power from the solar panel, augmented by the power stored in the battery, can be used to temporarily operate the Terminator Tether™ in the propulsion mode instead of the normal drag mode. This would enable to Terminator Tether™ to raise its altitude and/or increase or decrease its inclination to avoid a collision.

In addition, the Terminator Tether™ could be operated in the "power-augmented drag" mode. In this mode, there will be a current induced in the tether by the motion of the spacecraft through the magnetic field, which will cause a drag force on the spacecraft. This induced current would then be augmented by additional current in the same direction generated by the solar panel and the storage batteries in the power supply. The increased current will cause an increased drag force, if there is a significant component of the magnetic field in the direction of the spacecraft motion there will also be an increased force normal to the orbital plane, which will cause an increased rate of change of inclination.

When the Terminator Tether™ is operated in the "powered propulsion" or "power-augmented drag" mode, the conditions for stable optimum operation will be essentially the same as in the "unpowered drag" mode. The reason the conditions stay the same is that the maximum tether force than can be effectively utilized is limited by the strength of the gradient force, which has not changed, since the length and mass of the tether and the ballast mass has not changed for these different modes of operation. As a result the optimum operational angle for the tether is still 35.26 degrees, and the optimum ratio of ballast mass to tether mass for different tether lengths and tether material is still determined by the analysis of the invention as is set forth above.

In the analysis given above, where the optimum tether angle was found, the tether was assumed to be in the plane of the orbit and lagging behind the spacecraft motion, since in the "unpowered drag" mode, that would be its normal position, although if the component of the magnetic field along the orbit were high, there would be some tilt of the tether out of the plane of the orbit, producing a force tending to change the inclination of the orbit. In either of the "powered" modes of operation of the Terminator Tether™, however, the tilt of the tether could be forward toward the motion of the spacecraft or strongly tilted to one side or the other of the orbital plane. In all these cases, if the electrodynamic force is allowed to become too large, and the tether angle exceeds 45 degrees, the restoring force of the gradient field will drop off and the tether angle will go unstable. As a result, the optimum angle for the tether that will give the maximum stable force, whether it is a maximum drag force, and maximum propulsion force, or a maximum inclination change force, will be 35.26 degrees, and the optimum ratio for the mass of the tether versus the mass of the ballast will be the same as for the unpowered drag case.

The analysis that gave the optimum angle as 35.26 degrees assumed that the tether would be oriented like a rigid rotor. In reality, variations in forces along the tether will probably cause the tether to hang in a curved shape, where the optimum angle may not be exactly 35.26 degrees from the local vertical. The optimum angle in such a case is where the acceleration or drag force in the direction of the spacecraft motion is the largest.

Feedback Control of Electrodynamic Tether Deorbit Systems

Using the EDTetherSim numerical model of the electrical, dynamical, and orbital behavior of the Terminator Tether™, the inventors have investigated several methods of performing feedback control on the tether current in order to stabilize the tether dynamics and the optimum tether angle.

The general approach to stabilizing the tether dynamics used here is to take advantage of the fact that the direction of the electrodynamic force varies during an orbit. As a result, during some portions of the orbit, the electrodynamic force opposes the libration swing, and during other portions it is in the same direction as the swing. By reducing the tether current slightly during those portions of the orbit when the electrodynamic force is in the same direction as the swing, and allowing the current to flow at its maximum possible value during the portions of the orbit when the force opposes the swing, the tether librations are damped sufficiently to keep them from becoming unstable. The simulations indicate that feedback control on the In-Plane libration motion alone is sufficient to stabilize the tether dynamics. Feedback control on the Out-Of-Plane motion alone, however, is not sufficient to prevent instability. Feedback control on both In-Plane and Out-Of-Plane motion can minimize the overall librations, but does not improve the deorbit time.

As was discussed in the detailed mathematical analysis of tether dynamics above, when a electrodynamic drag tether is deployed from a spacecraft and current is allowed to flow along the tether, the tether does not simply drag neatly behind the spacecraft. Variations in the direction and strength of the Earth's magnetic field cause variations in the direction and strength of the electrodynamic force on the tether. Moreover, variations in the ionospheric plasma density over an orbit will cause variations in the current that the tether can collect. These variations cause the tether to swing, or "librate", in both the in plane and the out of plane directions. Over time, nonlinear interactions between the librations and the forces that cause them can result in growth of the libration amplitude. If the libration amplitude exceeds 45°, the gravity gradient forces on the tether system may be insufficient to return the tether to vertical, and the tether may flip over or even begin to rotate. Either case is unacceptable for the present invention because loss of tether orientation will cause the tether to cease to deorbit its host spacecraft in an efficient manner. Consequently, we have used the EDTetherSim numerical simulation to develop and test simple schemes for performing feedback control on the tether current to maintain the tether dynamics within acceptable bounds.

Example Mission: Simulation of the deorbit of an upper stage from low-LEO

In this investigation, we chose to study the application of control algorithms to a typical mission for the Terminator Tether™ that will pose a very challenging situation for the tether system: deorbit of an upper stage rocket from low-LEO. The rocket stage is chosen to mass 1500 kg, and its initial orbit is a circular orbit with an altitude of 400 km and an inclination of 50°. At this altitude, the plasma density is high and the voltages induced by the Earth's magnetic field can be very large. As a result, the tether can collect large currents, in excess of 3 amperes for the tether studied. At this relatively high inclination, the OOP forces on the tether are significant, and cause large librations in the out-of-plane. Moreover, the IP forces are large enough that the IP libration amplitude may exceed 45°, beyond which the gravity gradient forces may be insufficient to keep the tether from rotating above the host spacecraft.

The Terminator Tether™ system modeled in this study uses a 7.5 km long aluminum tether massing 15 kg, with a 15 kg endmass.

FIGS. 29a through 29e are graphs of the results from the EDTetherSim computer simulations for the baseline case using the present invention with no control over the current allowed to flow in the invention's electrodynamic tether.

To illustrate the necessity for controlling the tether dynamics in the Terminator Tether™, we began by simulating an electrodynamic drag tether with no limit on the tether current. FIG. 29a shows the altitude. FIG. 29b shows tether current. FIG. 29c shows in plane (P) libration angle. FIG. 29d shows out of plane (OOP) libration angle. And FIG. 29e shows tether tension at the endmass. All of these graphed values are plotted against time in days.

The tether current trace shown in FIG. 29b shows that the system collects currents of 1–3 A, with variations over an orbit caused by passage through the Earth's shadow as well as by variations in the induced voltage resulting from librations of the tether and changes in the geomagnetic field vector over an orbit. With no control on the tether current, the in plane libration angle shown in FIG. 29c oscillates and grows steadily until it passes beyond 45° at roughly 12 hours, at which point the tether begins to rotate uncontrollably. Each time the tether rotates below the spacecraft, it receives an additional "kick" from the electrodynamic drag, causing it to rotate faster. The tether tension shown in FIG. 29e grows steadily as the rotation increases, and eventually the tension will exceed the capacity of the tether and it will break.

This "out of control" mode of operation of the present invention can provide a means for boosting a payload from an upper stage that could achieve larger ΠV's than possible with a non-conducting, hanging tether. Essentially, once the tether begins rotating, the tether converts the kinetic energy of the upper stage into rotational energy for the tether and endmass. Thus the rotation could be allowed to build up until the tether has a large tip velocity, and then the endmass could be thrown into a higher orbit.

Feedback Control by Current Limitation

FIGS. 30a through 30e show the result of using the simplest control scheme of placing an upper limit on the current that the tether system could emit. This is the control method presently being used by the electrodynamic tether experts designing and operating the ProSEDs mission, and is the present "state of the art" of those experts in the field. It was thought by the experts that by holding the current below levels that could push the tether beyond the 45° stability limit, the tether libration might be held below acceptable levels. FIGS. 30a through 30e are the plots of the same variables as were discussed above in connection with FIGS. 29a through 29e, in a EDTetherSim simulation where the tether current is not allowed to exceed one ampere. As shown by FIGS. 30c and 30d, initially, the IP and OOP librations are small, and the tether deorbit system performs well for several days, decreasing the host altitude by over 10.5 km/day. However, the amplitude of the IP libration builds over time, until the tether passes the 45° stability limit just before 8 days. At that point, the tether flips over so that the tether is hanging above the spacecraft, and the system ceases to deorbit efficiently. The simulation was halted at this point.

These results indicate that there is a natural feedback between the In-Plane libration and the magnitude of the electrodynamic drag that drives a slowly growing instability in the IP libration. As a result, feedback control of the tether current is required to maintain tether stability. It is the one object of the present invention to disclose and claim those feedback control methods.

Feedback Control on In-Plane Libration

FIGS. 31a through 31e show the embodiment of the present invention that uses a control method wherein the current limit imposed upon the system is varied depending upon the direction of the In-Plane libration motion. When the electrodynamic drag force was in the same direction as the IP libration motion (i.e.—when the endmass was swinging behind the satellite), the maximum allowed current was reduced by 10% to 0.9 ampere. When the electrodynamic drag force was in the opposite direction from the IP libration motion (i.e.—when the endmass was swinging in the same direction as the orbital velocity), the current was allowed to run as high as one ampre. This variation in the tether current results in damping of the IP tether libration.

FIG. 31c is a plot of the In-Plane Libration and shows that this control scheme succeeds in preventing the growth of the In-Plane Libration amplitude, maintaining the tether trailing behind the spacecraft at an average angle of −5.12° with a libration amplitude of roughly 10 degrees. The OOP libration shown in FIG. 31d does reach considerable amplitudes, but does not reach the 45° stability threshold.

In FIGS. 32a and 32b the in plane libration and the tether current, respectively, are plotted for the first half-day of the simulation discussed above in connection with FIGS. 31a through 31e. The development of higher-frequency oscillations in the in plane libration curve indicate that this control scheme tends to cause higher order tether oscillations. This may indicate that the 10% damping factor may actually be too strong. A lower damping factor may reduce or eliminate the higher order oscillations. Nonetheless, these oscillations do not appear to grow significantly during the deorbit period, and thus are not a significant concern.

By holding the IP tether libration within an acceptable level, this control scheme enables the Terminator Tether™ to successfully deorbit the upper stage rocket from 400 km to 250 km in just over 14 days.

Because the electrodynamic drag force is always pointed in a direction opposite to the tether system's velocity vector, the only variable that must be known to implement this embodiment of the present invention is whether the tether is swinging backwards or forwards.

Feedback Control on Out-Of-Plane Librations

FIGS. 33a through 33e are the same variables as were shown in the corresponding FIGS. 29a thorough 29e in a EDTetherSim simulation with feedback control operating to damp the out of plane libration only. The results shown in FIG. 33d show that although the feedback succeeds in holding the OOP libration amplitude to a low level for several days, the IP libration shown in FIG. 33c grows faster than with no feedback control. After about 4 days, the nonlinear interactions between the IP and OOP motions cause the amplitude of the OOP libration to grow as well, until the tether becomes uncontrolled and flips over at about 8 days. Consequently, feedback on the OOP libration motion is insufficient to stabilize the tether dynamics.

Feedback Control on both In Plane and Out of Plane Libration Motion

FIGS. 34a through 34e are the same variables as were shown in the corresponding FIGS. 29a through 29e in an EDTetherSim simulation where feedback control on the current was used to damp both the IP and OOP motions. In this simulation, the maximum current was reduced 5% if the electrodynamic force was in the same direction as the IP motion, and a further 5% if the force was in the same direction as the OOP motion. The plots of IP and OOP libration angle show that this control scheme succeeds in holding both the IP and OOP amplitudes below 15°, and enables the present invention to deorbit the upper stage in just over 14 days.

This control scheme may be more desirable than the simple IP feedback scheme, because it holds the tether in a tighter "cone" below the host spacecraft. However, it requires significantly more "observables" to feed into the control algorithm. The IP control can be achieved by determining if the endmass is moving forward or behind the host spacecraft. The OOP feedback control, however, requires knowledge of not only the direction of the OOP motion, but also knowledge of the direction of the electrodynamic force on the tether. It may be possible to determine the direction of the electrodynamic force by measuring the endmass acceleration or by measuring the direction of the geomagnetic field. However, the addition of the the OOP control does not improve the deorbit rate; in fact, in this simulation it slightly increased the total deorbit time (by about 1.7 hours), even though the time-averaged current for the IP+OOP control was slightly higher than the average current for the IP control alone.

Control of "Skip Rope" Oscillations

In addition to pendulum librations, electrodynamic tethers are also subject to transverse wave oscillations, and "skip rope" oscillations. The present invention teaches an algorithm for controlling these oscillations. The algorithm requires knowledge of the motion of several points along the length of the tether, and control is achieved by varying the tether current. Preliminary results of simulations of electrodynamic tethers indicate that this feedback control algorithm is successful in stabilizing dynamics of the tether.

When a tether in orbit carries a current along its length, the interaction of the tether with the geomagnetic field creates a force on the tether that is directed perpendicular to the tether. As has been discussed at length in the various embodiments of the present invention disclosed above, the summation of this force along the length of the tether can produce a net propulsive force on the tether system, raising or lowering its orbit. The tether, however, is not a rigid rod held above or below the spacecraft. It is a very long, thin cable, and has little or no flexural rigidity. The transverse electrodynamic forces therefore cause the tether to bow and to swing away from the local vertical. Gravity gradient forces cause a restoring force that pulls the tether back towards the local vertical, but this results in a pendulum-like motion. Because the direction of the geomagnetic field varies as the tether orbits the Earth, the direction of the electrodynamic forces also varies, and so this pendulum motion develops into complex librations in both the in-plane and out-of-plane directions. Due to coupling between the in-plane and out-of-plane motions, an electrodynamic tether operated at a constant current will continually add energy to the libration motions, causing the libration amplitudes to build until the tether begins rotating or oscillating wildly.

Due to the great complexity of the dynamics and physics of electrodynamic tethers, most theoretical studies of the dynamics of these systems have modeled the tethers as rigid rods and have used simple dipole models of the geomagnetic field. Even in these idealized systems, the theoretical efforts have found a number of complex instabilities.

Previous Work

In FIGS. 29 to 34 above, a detailed numerical simulation that includes models for tether dynamics, electrodynamics, geomagnetic field variations, J8 Earth gravitational field, and variable plasma density to investigate the dynamics of an electrodynamic tether used to deorbit spacecraft from low Earth orbit. We found that although once-per-orbit variations in tether current due to diurnal plasma fluctuations do initially pump energy into the out-of-plane oscillations, the rotation of the geomagnetic field with the Earth later reverses this effect. The net result is that the out-of-plane oscillations build and decay with a long-term period that depends upon a beat resonance between the orbit period, the Earth's rotational period, and the tether libration periods.

These simulations showed that coupling between the in-plane and out-of-plane librations results in net energy addition to the in-plane libration. If no feedback control is performed, the in-plane libration grows until the tether "flips-over", resulting in loss of control of the system. The present invention deals with this problem by a feedback control scheme in which the tether current was decreased slightly when the electrodynamic forces were in the same direction as the tether swing.

While this feedback control algorithm succeeded in stabilizing the in-plane motion of the tether, it did not affect the transverse and skip-rope modes of the tether. The growth rate of these modes are low enough, that stabilizing the in-plane motion was sufficient to enable the Terminator Tether™ deorbit system to complete its mission before the other modes became an issue. For longer-term applications like orbit raising and stationkeeping, however, these other modes become a significant issue.

Feedback Control of Tether Dynamics—Method 1

The present invention teaches a feedback control algorithm to stabilize the dynamics of the transverse and skiprope modes of electrodynamic tethers. This algorithm follows the following method:

1. The tether system obtains measurements of the velocity of tether relative to the system's center-of-mass for N points distributed along the length of the tether.
2. The tether system measures or computes the direction of the magnetic field at its location.
3. The tether system calculates the summation $$\Omega = \sum_{i=1}^{i=N} a_i \vec{F}_i \cdot \vec{v}_i,$$

where $\vec{F}_i$ is the electrodynamic force on the tether at position i, $\vec{v}_i$ is the velocity of the tether at point i and $a_i$ is a weighting function.

If $\Omega>0$, then the tether current is reduced by a factor B. Alternatively, the tether current could be increased when $\Omega<0$.

The method of the present invention takes advantage of the fact that the direction of the electrodynamic forces vary around an orbit and also vary relative to the direction in which parts of the tether are moving with respect to the system's center of mass. As a result, at some times the net electrodynamic forces will feed the tether oscillations, and at other times they will tend to oppose those oscillations. Because the growth rate of the oscillations is relatively slow, by increasing the tether current slightly during the periods when the resultant forces oppose the tether oscillations, the system can keep the oscillations from growing.

The algorithm described above is applicable to tether systems where it is desirable to maintain the tether in a gravity-gradient orientation. A similar algorithm could be applied to spinning electrodynamic tether systems by instead calculating the motion of the tether elements relative to the velocities they would have in the desired spinning state.

Feedback Control of Tether Dynamics—Method 2

An expansion of the above method can improve the stabilization and control of the dynamics of the transverse and skiprope modes of electrodynamic tethers. This algorithm follows the following method:

1. The tether system obtains measurements of the velocity of tether relative to the system's center-of-mass for N points distributed along the length of the tether.
2. The tether system measures or computes the direction of the magnetic field at its location.

3. The tether system calculates the summation $$\Omega = \sum_{k=1}^{k=K} a_k f_k [\vec{F}_{1...n}, \vec{v}_{1...n}],$$

where $\vec{F}_i$ is the electrodynamic force vector on the tether at position i, $\vec{v}_i$ is the velocity of the tether at point i and $f_k[\ ]$ is a function that evaluates the work done by the forces $\vec{F}_i$ on the kth mode, for modes numbered 1 . . . K, and $a_i$ is a weighting function that adjusts for the relative importance or instability of the kth mode.

4. If $\Omega > 0$, then the tether current is reduced by a factor B. Alternatively, the tether current could be increased when $\Omega < 0$.

This embodiment of the present invention improves upon Method 1 by allowing the feedback to be optimized to damp particular modes of the tether oscillation in preference to other modes. This additional control can improve the overall efficiency of the tether system.

Measurement of Tether Velocities

As described in step 1 above, the feedback control system will require a simple and reliable method for determining the velocity of the tether at several points along the tether. This could be accomplished through a number of different methods:

- A number of small devices containing a simple "ping" radio transmitter could be included in or attached to the tether. These transmitters could be powered either by solar cells or through electrical connection to the tether itself. The transmitters would contain an electrical circuit that would cause them to emit a "ping" every few seconds. They might each have a distinctive signal to identify different positions on the tether. A directional antenna onboard the tether facility could then be used to identify the position of each pinger.
- Small devices containing miniaturized GPS receivers, solar cells, and a radio transmitter could be placed at multiple points along the tether. These devices would measure their position and velocity using the GPS system and transmit them to the central tether control.
- The tether facility could utilize a radar or video system to periodically observe the position of the tether relative to the facility. From these observations it could estimate the velocities of the tether at multiple points along the tether. Radar reflectors or optical corner-cubes or highly reflective coatings on the tether could be positioned at multiple points along the tether to facilitate these observations.
- The tether system could use a LIDAR system to observe the configuration of the tether. The tether could be treated with a highly reflective coating, along either its entire length or just at periodic positions along the tether, to improve the ability of the LIDAR system to track the tether.
- The tether could be constructed with a number of small antennas built into the tether structure and connected to the conducting portion of the tether. The tether facility could apply a pulse of high-frequency electrical waves to the tether. This pulse would travel up the tether and, as it encounters each antenna, it would cause the antenna to broadcast a burst of radio signal. A receiver on board the facility would listen for each signal and from the timing and direction of the signal it could determine the positions of the antennas and thus deduce the shape and motion of the tether.

Simulation Results

Figure 35:
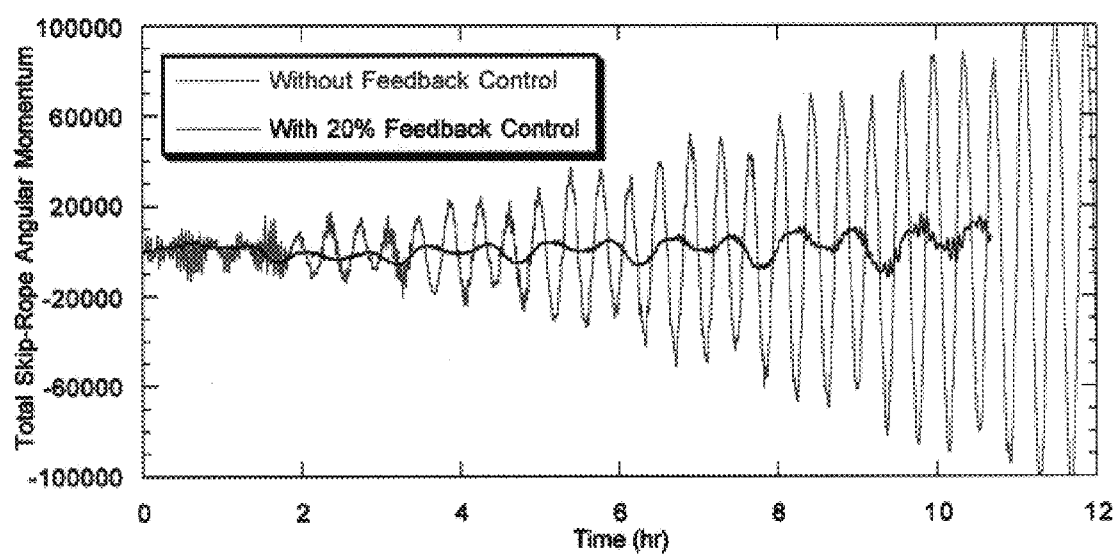
FIG. 35 shows the total skip rope angular momentum of a computer simulation of the tether system with no feedback control and with 20 percent feedback control as taught by the present invention.

The efficacy of the method of the present invention is shown in FIG. 35 which shows a simulated electrodynamic tether boost system operating with and without the method of the present invention. The simulations were conducted using the TetherSim program. The system modeled was a 500 kg satellite connected to a 50 kg endmass by a 10 kg, 10 km tether. The tether system has a maximum power level of 500 W, available only during portions of the orbit when the satellite is illuminated by the sun.

The present invention is discussed in this disclosure in terms of its space applications as a Terminator Tether™ useful for the removal of unwanted satellites. It should be understood, however, that the present invention is useful in any application where a space object can use a conductive tether to produce electrodynamic force through interaction with a magnetic field. The invention, therefore, should be limited not by this description, but only by the appended claims and their equivalents.

What is claimed is:

1. An apparatus for changing a state vector of a space object comprising:

a space object in space plasma, said space object moving relative to a magnetic field, said magnetic field having magnetic field lines, at least one electrodynamic tether, said tether having a near end and a far end separated by a length, said near end of said tether being mechanically affixed to said space object, said tether being deployed along its length from said space object at least a portion of said deployed length of said tether being electrically conductive, said tether being oriented along its deployed length with respect to said magnetic field lines to at least intermittently interact electrodynamically with said magnetic field lines to produce a flow of electric current in said conductive portion of said tether to produce a force acting on said tether; and tether current control means for controlling said flow of electric current in the conductive portion of said tether to control the magnitude of the electrodynamic interaction of said tether with said magnetic field to control the force acting on the tether to maintain the stability of said tether.

2. An apparatus as in claim 1 wherein the means for controlling the flow of electric current in the conductive portion of said tether includes an in plane libration control means for controlling the in plane libration instability of said tether.

3. An apparatus as in claim 2 wherein the in plane libration controlling means includes:

an in plane libration sensing means for sensing when the in plane libration motion of the tether is in the same direction as said force acting on the tether, and the current control means includes current decreasing means responsive to said in plane libration sensing means for decreasing the current flowing in the conductive portion of the tether when the in plane tether libration motion is in the same direction as the force acting on said tether.

4. An apparatus as in claim 2 wherein the in plane libration controlling means includes:

an in plane libration sensing means for sensing when the in plane libration motion of the tether is in the opposite direction from said force acting on the tether, and the current control means includes current increasing means responsive to said in plane libration sensing means for increasing the current flowing in the conductive portion of the tether when the in plane tether libration motion is in the opposite direction from the force acting on said tether.

5. An apparatus as in claim 2 wherein the in plane libration controlling means includes:

an in plane libration sensing means for sensing when the in plane libration motion of the tether is in the same direction as and in the opposite direction from said force acting on the tether, and the current control means includes current increasing and decreasing means responsive to said in plane libration sensing means for decreasing the current flowing in the conductive portion of the tether when the in plane tether libration motion is in the same direction as the force acting on said tether and increasing the current flowing in the conductive portion of the tether when the in plane tether libration motion is in the same direction as the force on the tether.

6. An apparatus as in claim 5 wherein the in plane libration control means changes the current flowing in the conductive portion of the tether by between 5 and 20 percent.

7. An apparatus as in claim 5 wherein the current control means includes out of plane libration control means for maintaining feedback control on the out of plane libration motion of the tether.

8. An apparatus as in claim 1 wherein the current control means includes force optimization means for orienting the tether direction to maximize the electrodynamic force acting on the tether while maintaining tether stability.

9. An apparatus as in claim 8 wherein the force optimization means includes:

an in plane libration sensing means for sensing when the in plane libration motion of the tether is in the same direction as said force acting on the tether, and the current control means includes current decreasing means responsive to said in plane libration sensing means for decreasing the current flowing in the conductive portion of the tether when the in plane tether libration motion is in the same direction as the force acting on said tether.

10. An apparatus as in claim 8 wherein the in plane libration controlling means includes:

an in plane libration sensing means for sensing when the in plane libration motion of the tether is in the opposite direction from said force acting on the tether, and the current control means includes current increasing means responsive to said in plane libration sensing means for increasing the current flowing in the conductive portion of the tether when the in plane tether libration motion is in the opposite direction from the force acting on said tether.

11. An apparatus as in claim 8 wherein the in plane libration controlling means includes:

an in plane libration sensing means for sensing when the in plane libration motion of the tether is in the same direction as and in the opposite direction from said force acting on the tether, and the current control means includes current increasing and decreasing means responsive to said in plane libration sensing means for decreasing the current flowing in the conductive portion of the tether when the in plane tether libration motion is in the same direction as the force acting on said tether and increasing the current flowing in the conductive portion of the tether when the in plane tether libration motion is in the same direction as the force on the tether.

12. An apparatus as in claim 11 wherein the in plane libration control means changes the current flowing in the conductive portion of the tether by between 5 and 20 percent.

13. An apparatus as in claim 1 wherein said current control means includes transverse wave oscillation and skip rope oscillation control means for controlling transverse wave oscillation and skip rope oscillations of the tether.

14. An apparatus as in claim 1 wherein the space object and attached tether are rotating with respect to the magnetic field lines so centrifugal force produces tension on the tether.

15. An apparatus as in claim 14 including a plurality of electrodynamic tethers attached to the space object and the current control means includes a multiple tether current control means for controlling the current flowing in each of the plurality of tethers as the tethers and the space object rotate with respect to the magnetic field lines to maintain the stability of each of the plurality of tethers.

16. An apparatus as in claim 1 wherein the electrodynamic tether is curved.

17. An apparatus as in claim 1 wherein the space object is in orbit about a celestial body having a magnetic field that produces the magnetic field lines such that a local vertical line is established between the electrodynamic tether and the center of the celestial body.

18. An apparatus as in claim 17 wherein the means for controlling the flow of electric current in the conductive portion of said tether includes an in plane libration control means for controlling the in plane libration motion of said tether.

19. An apparatus as in claim 18 wherein the in plane libration controlling means includes:

an in plane libration sensing means for sensing when the in plane libration motion of the tether is in the same direction as said force acting on the tether, and the current control means includes current decreasing means responsive to said in plane libration sensing means for decreasing the current flowing in the conductive portion of the tether when the in plane tether libration motion is in the same direction as the force acting on said tether.

20. An apparatus as in claim 18 wherein the in plane libration controlling means includes:

an in plane libration sensing means for sensing when the in plane libration motion of the tether is in the opposite direction from said force acting on the tether, and the current control means includes current increasing means responsive to said in plane libration sensing means for increasing the current flowing in the conductive portion of the tether when the in plane tether libration motion is in the opposite direction from the force acting on said tether.

21. An apparatus as in claim 18 wherein the in plane libration controlling means includes:

an in plane libration sensing means for sensing when the in plane libration motion of the tether is in the same direction as and in the opposite direction from said force acting on the tether, and the current control means includes current increasing and decreasing means responsive to said in plane libration sensing means for decreasing the current flowing in the conductive portion of the tether when the in plane tether libration motion is in the same direction as the force acting on said tether and increasing the current flowing in the conductive portion of the tether when the in plane tether libration motion is in the same direction as the force on the tether.

22. An apparatus as in claim 21 wherein the in plane libration control means changes the current flowing in the conductive portion of the tether by between 5 and 20 percent.

23. An apparatus as in claim 21 wherein the current control means includes out of plane libration control means for maintaining feedback control on the out of plane libration motion of the tether.

24. An apparatus as in claim 17 wherein the current control means includes force optimization means for orienting the tether direction to maximize the electrodynamic force acting on the tether while maintaining tether stability.

25. An apparatus as in claim 24 where the current control means maintains the electrodynamic tether at a 35.26 degree angle between the tether and the local vertical line.

26. An apparatus as in claim 25 wherein the force optimization means includes:
an in plane libration sensing means for sensing when the in plane libration motion of the tether is in the same direction as said force acting on the tether,
and the current control means includes current decreasing means responsive to said in plane libration sensing means for decreasing the current flowing in the conductive portion of the tether when the in plane tether libration motion is in the same direction as the force acting on said tether.

27. An apparatus as in claim 25 wherein the in plane libration controlling means includes:
an in plane libration sensing means for sensing when the in plane libration motion of the tether is in the opposite direction from said force acting on the tether,
and the current control means includes current increasing means responsive to said in plane libration sensing means for increasing the current flowing in the conductive portion of the tether when the in plane tether libration motion is in the opposite direction from the force acting on said tether.

28. An apparatus as in claim 25 wherein the in plane libration controlling means includes:
an in plane libration sensing means for sensing when the in plane libration motion of the tether is in the same direction as and in the opposite direction from said force acting on the tether,
and the current control means includes current increasing and decreasing means responsive to said in plane libration sensing means for decreasing the current flowing in the conductive portion of the tether when the in plane tether libration motion is in the same direction as the force acting on said tether and increasing the current flowing in the conductive portion of the tether when the in plane tether libration motion is in the same direction as the force on the tether.

29. An apparatus as in claim 28 wherein the in plane libration control means changes the current flowing in the conductive portion of the tether by between 5 and 20 percent.

30. An apparatus as in claim 17 wherein said current control means includes transverse wave oscillation and skip rope oscillation control means for controlling transverse wave oscillation and skip rope oscillations of the tether.

31. An apparatus as in claim 30 wherein the includes transverse wave oscillation and skip rope oscillation control means includes sensing means for sensing the relative velocity of the tether at a plurality of points along the length of the tether.

32. An apparatus as in claim 30 wherein the sensing means is lidar and the tether is equipped with a plurality of reflection enhancing means along the length of the tether for enhancing the ability of the tether position to be sensed by lidar.

33. An apparatus as in claim 30 wherein the sensing means is radar and the tether is equipped with a plurality of reflection enhancing means along the length of the tether for enhancing the ability of the tether position to be sensed by radar.

34. An apparatus as in claim 17 wherein the space object and attached tether are rotating with respect to the magnetic field lines so centrifugal force produces tension on the tether.

35. An apparatus as in claim 17 including a plurality of electrodynamic tethers attached to the space object and the current control means includes a multiple tether current control means for controlling the current flowing in each of the plurality of tethers as the tethers and the space object rotate with respect to the magnetic field lines to maintain the stability of each of the plurality of tethers.

36. An apparatus as in claim 17 wherein the electrodynamic tether is curved and the current control means maintains the optimum angle of 35.26 degrees between the local vertical line through the space object center of mass and the line between the space object center of mass and the total tether center of mass.

37. An apparatus as in claim 1 wherein the electrodynamic tether includes at least one plasma contactor to increase an electrical connection between the conducting portion of the tether and the space plasma.

38. An apparatus as in claim 1 including an end mass on the far end of the electrodynamic tether.

39. An apparatus as in claim 38 wherein a tether deployer is the end mass.

40. An apparatus as in claim 1 wherein tension is maintained on the tether by a gravity gradient.

41. An apparatus as in claim 1 wherein the current control means includes electric power supply means for causing a controllable electric current to flow in the conducting portion of said the electrodynamic tether.

42. An apparatus as in claim 1 wherein the conductive portion of the tether is electrically connected to the space object and the space object is at least partially electrically conductive.

43. A method of controlling a deployed conducting electrodynamic tether moving across magnetic field lines in a space plasma to produce an electrodynamic force on the tether comprising controlling the magnitude of the electric current flowing in the conducting tether to control tether instability and optimize the electrodynamic force on the tether.

44. A method as in claim 43 comprising:
Sensing the in plane libration motion of the tether,
Sensing the direction of the electrodynamic force on the tether,
Increasing the magnitude of the electric current flowing in the tether when the in plane libration motion of the tether is opposite direction from the force on the tether.

45. A method as in claim 43 comprising:
Sensing the in plane libration motion of the tether,
Sensing the direction of the electrodynamic force on the tether, decreasing the magnitude of the electric current flowing in the tether when the in plane libration motion of the tether is in the same direction as the force on the tether.

46. A method as in claim 43 comprising:

Sensing the in plane libration motion of the tether,

Sensing the direction of the electrodynamic force on the tether, decreasing the magnitude of the electric current flowing in the tether when the in plane libration motion of the tether is in the same direction as the force on the tether and increasing the magnitude of the electric current flowing in the tether when the in plane libration motion of the tether is in the opposite direction as the force on the tether.

47. A method as in claim 46 including controlling the out of plane libration of the tether.

48. A method as in claim 43 for controlling the transverse and skip rope modes of gravity gradient tensioned electrodynamic tether instability comprising:

sensing the velocity of tether relative to the system's center-of-mass for N points distributed along the length of the tether, measures or compute the direction of the magnetic field at each sensed point on the tether, calculate the summation $$\Omega = \sum_{i=1}^{i=N} a_i \vec{F}_i \cdot \vec{v}_i,$$

where $\vec{F}_i$ is the electrodynamic force on the tether at position i, $\vec{v}_i$ is the velocity of the tether at point i and $a_i$ is a weighting function, if $\Omega>0$, then reducing the tether current flowing in the tether.

49. A method as in claim 48 wherein the tether current is increased when $\Omega<0$.

50. A method as in claim 43 comprising:

sensing of the velocity of tether relative to the tether system's center-of-mass for N points distributed along the length of the tether, computing the direction of the magnetic field at each sensed position on the tether, calculating the summation $$\Omega = \sum_{k=1}^{k=K} a_k f_k [F_{1\ldots n}, \vec{v}_{1\ldots n}],$$

where $\vec{F}_i$ is the electrodynamic force vector on the tether at position i, $\vec{v}_i$ is the velocity of the tether at point i and $f_k[\ ]$ is a function that evaluates the work done by the forces $\vec{F}_i$ on the kth mode, for modes numbered 1 . . . K, and $a_i$ is a weighting function that adjusts for the relative importance or instability of the kth mode, if $\Omega>0$, then reducing the tether current.

51. A method as in claim 50 wherein the tether current is increased when $\Omega<0$.

* * * * *